(12) United States Patent
Gooch et al.

(10) Patent No.: US 11,814,190 B2
(45) Date of Patent: Nov. 14, 2023

(54) SYSTEM AND METHOD OF PROVIDING A PROJECTILE MODULE HAVING A NET WITH A DRAWSTRING

(71) Applicant: Fortem Technologies, Inc., Pleasant Grove, UT (US)

(72) Inventors: Robert Edmund Gooch, Orem, UT (US); Devin Donald Lebaron, Saratoga Springs, UT (US); Adam Eugene Robertson, Provo, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 0 days.

(21) Appl. No.: 18/111,758

(22) Filed: Feb. 20, 2023

(65) Prior Publication Data
US 2023/0192298 A1 Jun. 22, 2023

Related U.S. Application Data

(63) Continuation of application No. 17/411,414, filed on Aug. 25, 2021, now Pat. No. 11,584,527, which is a
(Continued)

(51) Int. Cl.
*B64D 7/06* (2006.01)
*F41A 19/59* (2006.01)
(Continued)

(52) U.S. Cl.
CPC .............. *B64D 7/06* (2013.01); *B64C 39/024* (2013.01); *F41A 19/59* (2013.01); *F41B 11/62* (2013.01); *F41B 11/723* (2013.01); *F41B 11/80* (2013.01); *F41H 13/0006* (2013.01); *F41H 13/0012* (2013.01); *F41H 13/0025* (2013.01); *B64U 2101/15* (2023.01)

(58) Field of Classification Search
CPC ........... F41H 13/0006; B64C 2201/182; F41B 11/00; F41B 11/80; B64F 1/027
See application file for complete search history.

(56) References Cited

U.S. PATENT DOCUMENTS

| | | | |
|---|---|---|---|
| 4,234,142 A | 11/1980 | Yost | |
| 5,102,065 A | 4/1992 | Couderc | |

(Continued)

OTHER PUBLICATIONS

PCT/US19/58443, Outgoing Written Opinion of the ISA, dated Jan. 16, 2020 (Year: 2020).
(Continued)

*Primary Examiner* — Joshua E Freeman

(57) ABSTRACT

A projectile cartridge that can be removably attached to a flying vehicle is disclosed. A system can include a first flying vehicle, a projectile attachment mechanism configured with the first flying vehicle, a projectile cartridge that contains a projectile, the projectile cartridge being removably attachable to the projectile attachment mechanism, a weight attached to the projectile, the weight being configured in a releasable configuration in the projectile cartridge and a drawstring configured with the projectile. After firing the projectile, when tension is applied to the drawstring as the projectile approaches or envelops a second flying vehicle, the tension can cause the drawstring to close the projectile down to secure the second flying vehicle.

18 Claims, 32 Drawing Sheets

Related U.S. Application Data continuation of application No. 17/316,433, filed on May 10, 2021, now Pat. No. 11,498,679, which is a continuation-in-part of application No. 16/914,640, filed on Jun. 29, 2020, now Pat. No. 11,001,381, which is a continuation of application No. 16/176,688, filed on Oct. 31, 2018, now Pat. No. 10,696,402.

(51) Int. Cl.
| | |
|---|---|
| *F41B 11/80* | (2013.01) |
| *F41B 11/62* | (2013.01) |
| *F41H 13/00* | (2006.01) |
| *B64C 39/02* | (2023.01) |
| *F41B 11/723* | (2013.01) |
| *B64U 101/15* | (2023.01) |

(56) References Cited

U.S. PATENT DOCUMENTS

| | | |
|---|---|---|
| 5,379,966 A | 1/1995 | Simeone |
| 5,436,832 A | 7/1995 | Bessacini et al. |
| 5,436,966 A | 7/1995 | Barrett |
| 5,503,137 A | 4/1996 | Fusco |
| 5,637,826 A | 6/1997 | Bessacini |
| 5,831,199 A | 11/1998 | McNulty, Jr. |
| 5,898,125 A | 4/1999 | Mangolds |
| 6,120,337 A | 9/2000 | Bautista |
| 6,626,077 B1 * | 9/2003 | Gilbert ............... F41H 13/0006 102/504 |
| 6,643,972 B2 | 11/2003 | Prokaski |
| 6,796,213 B1 | 9/2004 | McKendree |
| 6,854,374 B1 | 2/2005 | Breazeale |
| 8,146,193 B1 | 4/2012 | Franzino |
| 8,176,834 B1 | 5/2012 | Arevalo |
| 8,267,000 B1 | 9/2012 | Larson |
| 8,669,505 B2 | 3/2014 | Guibout |
| 8,710,411 B1 | 4/2014 | LaPat |
| 8,991,793 B1 | 3/2015 | Bernhardt |
| 9,134,099 B2 | 9/2015 | Tseng |
| 9,435,619 B1 | 9/2016 | Park |
| 9,581,417 B2 | 2/2017 | Tseng |
| 9,989,336 B2 | 6/2018 | Purvis |
| 10,036,615 B2 | 7/2018 | Norris |
| 10,107,599 B2 | 10/2018 | Norris |
| 10,113,839 B2 | 10/2018 | Sekiya |
| 10,197,365 B1 | 2/2019 | Blyskal |
| 10,399,674 B2 | 9/2019 | Goodrich |
| 10,401,129 B2 | 9/2019 | Armstrong |
| 10,435,153 B2 | 10/2019 | Klein |
| 10,634,461 B2 | 4/2020 | Norris |
| 10,689,112 B2 | 6/2020 | Naito |
| 10,852,114 B2 | 12/2020 | Norris |
| 10,926,875 B2 | 2/2021 | Klein |
| 2002/0134365 A1 | 9/2002 | Gray |
| 2003/0150961 A1 | 8/2003 | Boelitz |
| 2006/0187610 A1 | 8/2006 | Su |
| 2006/0207466 A1 | 9/2006 | McNulty |
| 2006/0225333 A1 | 10/2006 | Park |
| 2007/0019358 A1 | 1/2007 | Kroll |
| 2007/0012270 A1 | 5/2007 | Swensen |
| 2010/0314487 A1 | 12/2010 | Boelitz |
| 2010/0315755 A1 | 12/2010 | Gavin |
| 2011/0011347 A1 | 1/2011 | Ohlman |
| 2011/0102964 A1 | 5/2011 | Bass |
| 2011/0220087 A1 | 9/2011 | Gerwig |
| 2011/0303613 A1 | 12/2011 | Crouse |
| 2012/0170167 A1 | 7/2012 | Beechey |
| 2013/0239937 A1 | 9/2013 | Macri |
| 2014/0045146 A1 | 2/2014 | Otte |
| 2014/0331984 A1 | 11/2014 | Brahler, II |
| 2015/0002981 A1 | 1/2015 | Klug |
| 2015/0168107 A1 | 6/2015 | Tseng |
| 2016/0010956 A1 | 1/2016 | Hanchett |
| 2016/0161225 A1 | 6/2016 | Searle |
| 2016/0251088 A1 | 9/2016 | Melish |
| 2016/0293015 A1 | 10/2016 | Bragin |
| 2016/0376029 A1 | 12/2016 | Sekiya |
| 2017/0144756 A1 | 5/2017 | Rastgaar Aagaah |
| 2017/0225784 A1 | 8/2017 | Hayes |
| 2017/0261292 A1 | 9/2017 | Armstrong |
| 2017/0276460 A1 | 9/2017 | Norris |
| 2017/0355461 A1 | 12/2017 | Naito |
| 2017/0356726 A1 * | 12/2017 | Theiss ................ F41H 13/0006 |
| 2018/0094908 A1 | 4/2018 | Down |
| 2018/0162530 A1 | 6/2018 | Klein |
| 2018/0335779 A1 | 11/2018 | Fisher |
| 2018/0353316 A1 | 12/2018 | Anderson |
| 2019/0063881 A1 | 2/2019 | Abramov |
| 2019/0068953 A1 | 2/2019 | Choi |
| 2019/0088156 A1 * | 3/2019 | Choi .................... F41G 7/2293 |
| 2019/0112045 A1 | 4/2019 | Zhang |
| 2019/0129427 A1 | 5/2019 | Sugaki |

OTHER PUBLICATIONS

PCT/US19/58443, Outgoing ISA 210 International Search Report, dated Jan. 16, 2020 (Year: 2020).

* cited by examiner

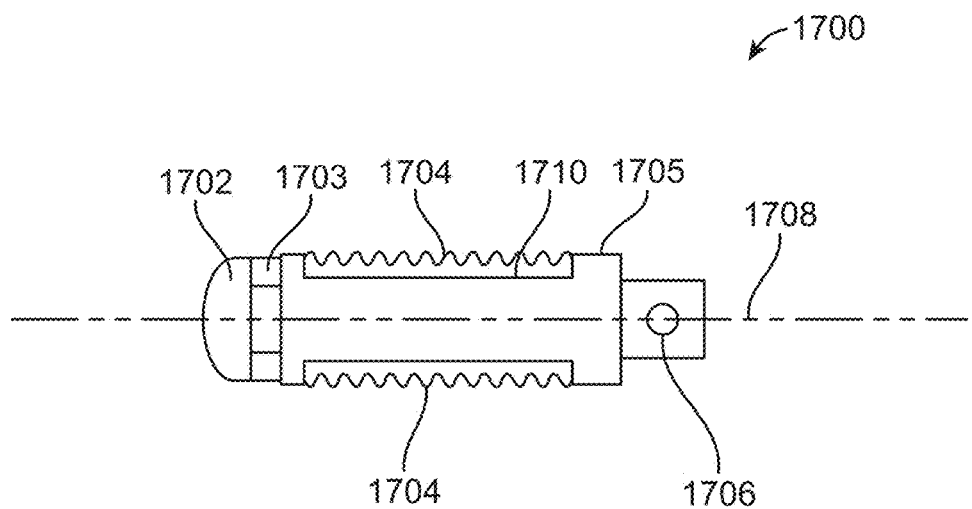
FIG. 17A
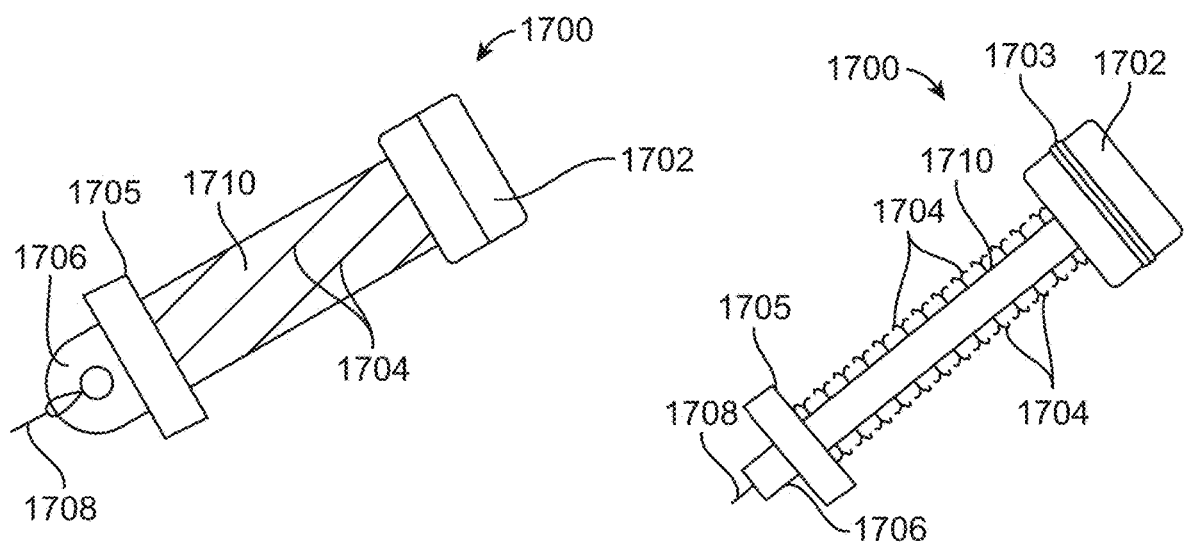
FIG. 17B
FIG. 17C

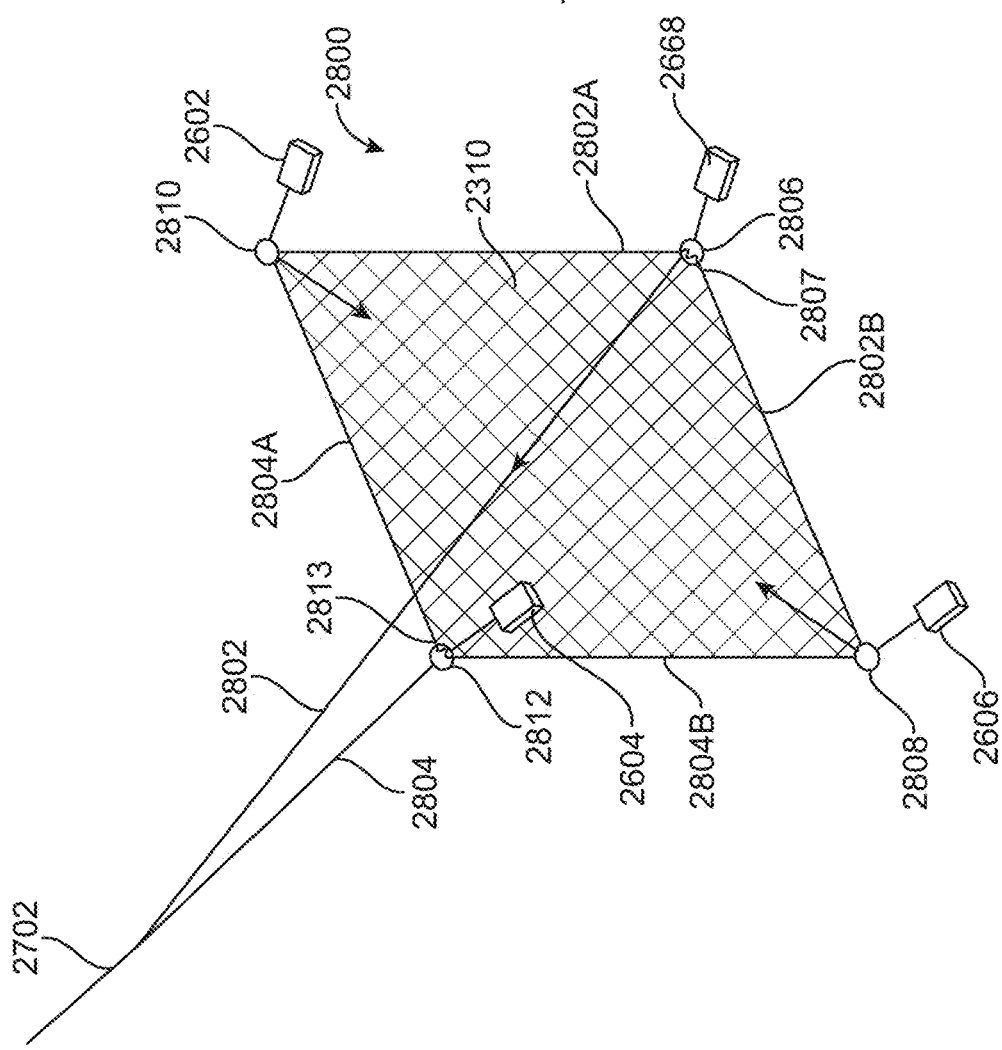
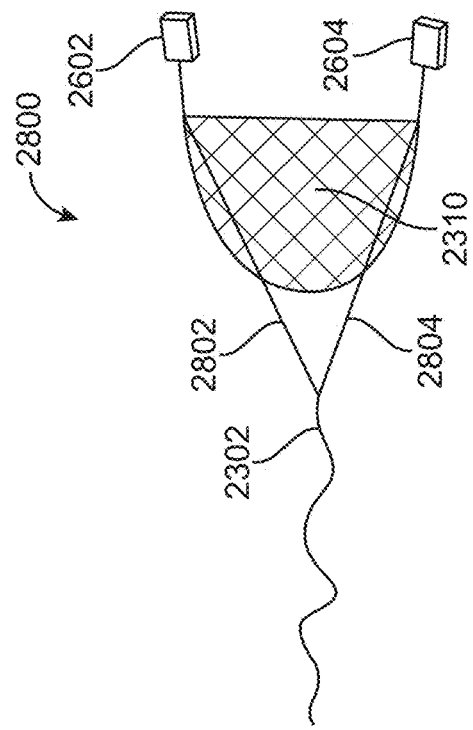
FIG. 28A
FIG. 28B

SYSTEM AND METHOD OF PROVIDING A PROJECTILE MODULE HAVING A NET WITH A DRAWSTRING

PRIORITY CLAIM

The present application is a continuation of U.S. patent application Ser. No. 17/411,414, filed Aug. 25, 2021, which is a continuation of U.S. patent application Ser. No. 17/316,433, filed May 10, 2021, now U.S. Pat. No. 11,498,679, issued Nov. 15, 2022, which is a continuation-in-part application and claims priority to application Ser. No. 16/914,640, filed Jun. 29, 2020, now U.S. Pat. No. 11,001,381, issued May 11, 2021, which is a continuation of U.S. patent application Ser. No. 16/176,688, filed Oct. 31, 2018, now U.S. Pat. No. 10,696,402, issued Jun. 30, 2020, the contents of which are incorporated herein by reference.

The present application is related to U.S. patent application Ser. No. 16/812,699, filed Mar. 9, 2020, now U.S. Pat. No. 10,894,603, issued Jan. 19, 2021, the contents of which are incorporated herein by reference in its entirety.

TECHNICAL FIELD

The present disclosure relates to a new structure of a projectile net that is shot from a detachable projectile module configured on a drone. The projectile net includes a drawstring in a particular configuration. When the net interacts with a target drone, the drawstring can be drawn in a number of different ways to ensure that the target drone is captured and the net does not slip from the target drone.

BACKGROUND

Although drone technology has been around for half a century, high production costs and older technology limited owners of large and bulky drones to include mostly that of military or special interest groups. Advancements in drone technology reduced the price and size of drones, eventually making them more readily available to individual consumers. With an increase in consumer drones, problems began to surface regarding privacy, trespassing and security issues.

As drones are able to fly at high altitudes, it is extremely difficult to remove an unwanted drone from a designated property. Also, many drones are able to carry a payload, which raises security issues concerning hostile applications such as carrying and deploying an explosive or harmful chemical agent. Not being able to remove or eliminate potentially threatening drones can be a major problem for governments, event planners, or any land owner.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 17A-17C illustrate a weight having a cocklebur configured thereon;

FIGS. 28A-28B illustrate a further drawstring and net embodiment;

DESCRIPTION OF EXAMPLE EMBODIMENTS

Brief Introduction

Figure 1:
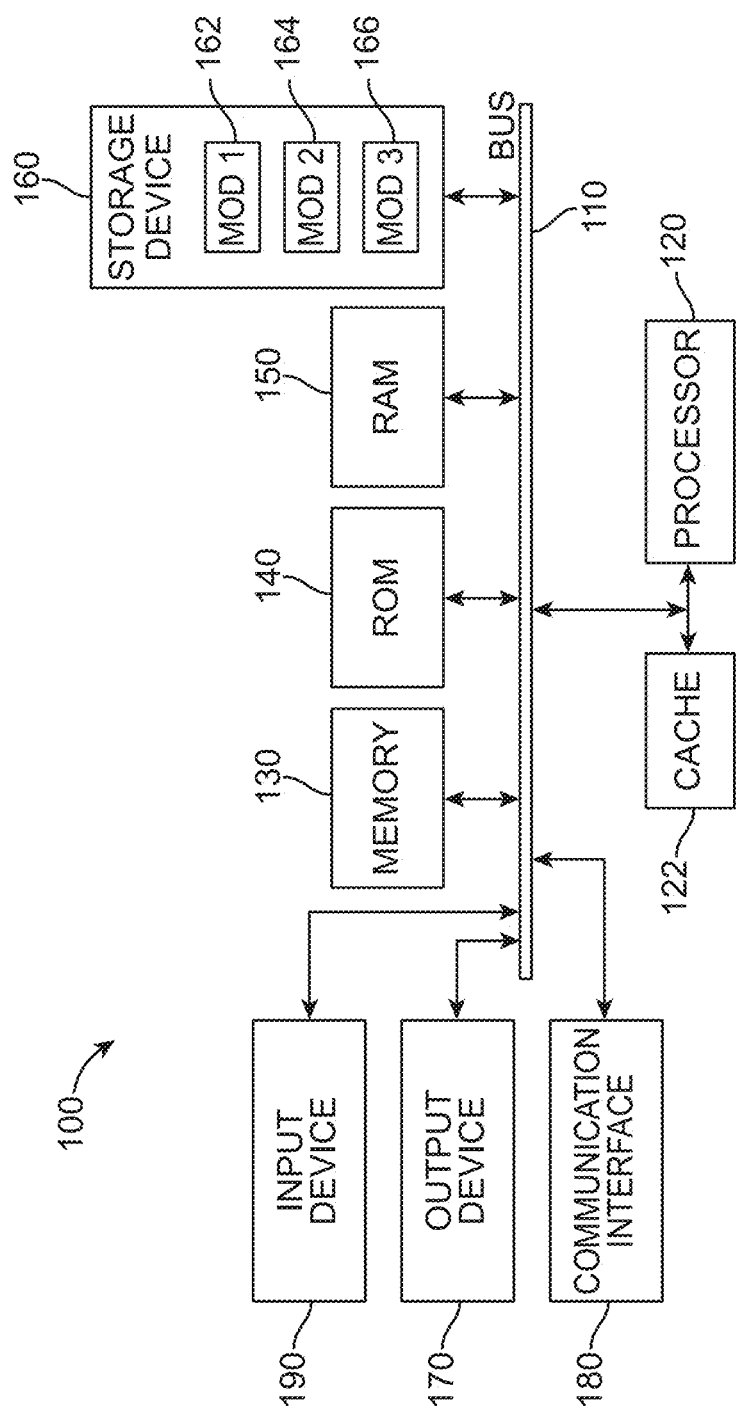
FIG. 1 illustrates an example system configuration.

Disclosed are a flying vehicle, system and method associated with managing a projectile deployment component. The present disclosure introduces a number of technologies associated with the projectile module configured on a flying vehicle, such as a drone. The technologies improve the reliability and the repeatability of utilizing a projectile from a drone to capture or immobilize another dangerous drone. Some of the improvements described herein represent innovations necessary to achieve reliable and repeatable operation over typical commercial guns. For example, when the projectile is a net, the net size, gas pressure, and release mechanisms of typical off-the-shelf net guns were not satisfactory for a drone application. In one aspect, a net can have problems in terms of slipping off of a target drone and not properly envelop the target drone. While there are many features described herein, the present application will focus on an improvement to the projectile when the projectile is a net such that there is an improved probability of capturing the target drone using the net. Specifically, there are various embodiments of the net system that include cockleburs which are integrated in various ways into the net and which, upon the net engaging with a target drone, become entangled with the net to ensure capture. The net system can include not just the net, but the weights and the new advancements that make it capture fixed wing targets better. There are other combinations of the hook portion of a hook-and-loop fastener coupled with a type of grappling barb that become entangles with the net to ensure capture. Other embodiments relate to the use of a drawstring to ensure that the net opening closes up like a bag and envelopes the target drone. The present application includes a number of different improvements to solving the problem of a projectile net slipping from a target drone and thus enabling the target drone to escape.

Cocklebur Embodiment

The use of cockleburs as one improvement to the use of a projectile net is described next. In the wild, a spiny cocklebur is an annual plant that blooms in the summer. The female plant has burs that include a beak and hooked bristles that enable the seeds of the plant that are in the burs to be disbursed by becoming entangled in animal fur or human clothing. In a similar manner, as defined herein, a cocklebur is a component that has hooked bristles or Velcro-like small hooks or projections from a base component that are designed to become entangled with portions of the net upon contact. One or more cockleburs will be integrated into the projectile net or strings attached to the projectile net as will be disclosed herein.

One aspect can include a flying vehicle having a processor, a projectile component, a net configured in the projectile component, the net including a cocklebur (attached thereto) and a computer-readable storage medium. The storage medium can store instructions which, when executed by the processor, cause the processor to perform operations including receiving an identification of a target flying device and firing the net from the projectile component, wherein the cocklebur is configured to become entangled with the net upon interaction of the net with the target flying device. The computer-readable storage medium can store additional instructions which, when executed by the processor, cause the processor to perform operations further including applying a projectile model which generates a determination which indicates whether the net, if fired from the projectile component, will hit the target flying device, the projectile model taking into account one or more of a wind modeling in an area around the flying vehicle based on an inference of wind due to a tilt of the flying vehicle and a projected movement of the target flying device based on the identification of the target flying device. When the determination indicates that the net will hit the targeted device according to a threshold value, the operations can include firing the net at the targeted flying device.

The cocklebur can include a first cocklebur and wherein the net further can include a first weight attached to a first location of the net via a first string. A first cocklebur is configured on the first string that attaches the first weight to the first location of the net. A second weight can be attached to a second location of the net via a second string and a second cocklebur can be configured on the second string that attaches the second weight to the second location of the net. In one aspect, the net further can include a third weight attached to a third location of the net via a third string, a third cocklebur configured on the third string that attaches the third weight to the third location of the net. A fourth weight can be attached to a fourth location of the net via a fourth string and a fourth cocklebur can be configured on the fourth string that attaches the fourth weight to the fourth location of the net.

In another aspect, the net further can include a fifth cocklebur on a fifth string, the fifth string being attached to a first side of the net, a sixth cocklebur on a sixth string, the sixth string being attached to a second side of the net, a seventh cocklebur on a seventh string, the seventh string being attached to a third side of the net and an eighth cocklebur on an eighth string, the eighth string being attached to a fourth side of the net. The flying vehicle can further include a weight connected to the net, wherein the projectile component includes a first receiving cavity that receives the weight in preparation for firing the net. A tether can connect the net to the flying vehicle. The cocklebur can also be configured on a weight that is attached to the net and thus rather than a separate component from the one or more weights, the weights themselves can include cockleburs.

The cocklebur could be attached in other ways besides a string between the weight and the net at a particular location such as a corner. The cocklebur can be attached to the weight or the net itself at some strategic location, which can be at any location on the net. One example location is a corner of the net but other locations can be used as well, such as the net perimeter.

The flying vehicle can include a first weight connected to the net, the first weight being associated with the cocklebur, a second weight connected to the net, the second weight being associated with a second cocklebur, a third weight connected to the net, the third weight being associated with a third cocklebur and a fourth weight connected to the net, the fourth weight being associated with a fourth cocklebur. Each of the first weight, the second weight, the third weight and the fourth weight can be configured in a respective receiving cavity of the projectile component in preparation for firing the net.

The cocklebur, the second cocklebur, the third cocklebur and the fourth cocklebur can each be configured, in preparation for firing, in one of the respective receiving cavity with its associated respective weight or on an exterior surface of a breakable covering configured over the net in the projective component. The cocklebur can be connected to the first weight, the second cocklebur can be connected to the second weight, the third cocklebur can be connected to the third weight and the fourth cocklebur can be connected to the fourth weight. The flying vehicle can further include a first weight connected to a location of the net via a string, wherein the cocklebur is configured on the string, a second weight connected to the location of the net via a second string and a second cocklebur configured on the second string. The flying vehicle can further include a third weight connected to the location of the net via a third string and a third cocklebur configured on the third string. In one aspect, the cocklebur is attached to one of the weights and the weight(s) can be attached to the net via a string.

The flying vehicle can further include a grappling hook configured with the weight and a spring configured with the grappling hook to deploy the grappling hook from the weight upon the projectile component firing the net. Cockleburs can also be connected to the weight that has the grappling hook configured thereon.

In another aspect, a projectile component can be claimed that is configured to be removably attached to a flying vehicle. The projectile component can include a net configured in the projectile component, a receiving cavity configured in the projectile component, a weight attached to the net via a string, the weight being configured in the receiving cavity in preparing for firing the net from the projectile component and a cocklebur associated with the weight. Upon firing the net from the projectile component, and upon the net engaging with a target device, the cocklebur can become entangled with the net to secure the target device.

The cocklebur can be stored in one of the receiving cavities or an exterior surface of the projectile component or any other appropriate storage cavity prior to firing the net. The cocklebur can be configured on one of the weights, the string that connects the weight to the net, or a second string connecting a second weight to the net. The cocklebur can be connected to the weight, wherein the weight further includes a grappling hook that is configured to spring from a stowed configuration to a deployed configuration upon firing the net.

This disclosure also introduces a projectile component configured to be removably attached to a flying vehicle, the projectile component including a net configured in the projectile component, a first weight connected to the net, the first weight being associated with a first cocklebur, a second weight connected to the net, the second weight being associated with a second cocklebur, a third weight connected to the net, the third weight being associated with a third cocklebur and a fourth weight connected to the net, the fourth weight being associated with a fourth cocklebur. Each of the first weight, the second weight, the third weight and the fourth weight are configured either in a respective receiving cavity of the projectile component in preparation for firing the net or on an exterior surface of the projectile component in preparation for firing the net. The exterior surface can include a first storage cavity for the first cocklebur, a second storage cavity for the second cocklebur, a third storage cavity for the third cocklebur and a fourth storage cavity for the fourth cocklebur.

In one aspect, a projectile cartridge can be configured to be removably attached to a first flying vehicle. The projectile cartridge can include a net, a weight and a cocklebur attached to the net. The weight and/or the cocklebur can be configured in a receiving cavity in the projectile cartridge that enables a projection of the weight upon firing via a control system on the first flying vehicle to seek to capture as second flying vehicle. A tether can be attached to a parachute, wherein the second flying vehicle, when it is captured in the net, can be disabled and brought to the ground due to a drag of the parachute.

Drawstring Embodiment

Next, another improvement to enabling a net to capture a target drone and not slip off is the use of a drawstring. With respect to a drawstring approach, disclosed is a system including a first flying vehicle, a projectile attachment mechanism configured with the first flying vehicle, a projectile cartridge that contains a projectile, the projectile cartridge being removably attachable to the projectile attachment mechanism, a weight attached to the projectile, the weight being configured in a releasable configuration in the projectile cartridge and a drawstring configured with the projectile. After firing the projectile, when tension is applied to the drawstring (especially when a target flying vehicle is in or against the net) the tension causes the drawstring to bring the corners or the perimeter of the net close together, thus creating a bag-like pouch with the opening sufficiently closed which secures the second flying vehicle. The projectile can include a net having four, six or eight corners or other number of corners. The projectile can also have other configurations such as hexagonal, octagonal, circular, triangular, random, or other shapes. The drawstring can be attached to at least two of the four (or other number of) corners of the net. The weight can include a first weight and wherein the four corners can include a first corner attached via a first string to the first weight, a second corner attached via a second string to a second weight, a third corner attached via a third string to a third weight, and a fourth corner attached via a fourth string to a fourth weight.

For example, the projectile can have a circular shape, a hexagonal shape, a rectangular shape, a square shape having four corners, a first shape having six corners or a second shape having eight corners.

In one aspect, at least two of the four corners have configured thereon a respective attachment guide member through which the drawstring is pulled to more rapidly close the projectile down to secure the second flying vehicle. A first attachment guide member can be configured at the first corner of the net and a second attachment guide member is configured at the second corner of the net.

A first portion of the drawstring can pass through the first attachment guide member and is attached at the second corner of the net, a second portion of the drawstring can pass through the first attachment guide member and is attached to the third corner of the net, a third portion of the drawstring can pass through the second attachment guide member and is attached to the second corner of the net and a fourth portion of the drawstring can pass through the second attachment guide member and is attached to the third corner.

A first portion of the drawstring can pass through a first attachment guide member at a first corner of the net, the first portion of the drawstring extending across a center portion of the net to a second corner opposite the first corner. A second portion of the drawstring can pass through a second attachment guide member at a third corner of the net, the second portion of the drawstring extending across the center portion of the net to a fourth corner opposite the third corner.

In another aspect, a first portion of the drawstring can pass through a first attachment guide member at a first corner of the net, the first portion of the drawstring extending down a first side of the net to a second corner adjacent to the first corner. A second portion of the drawstring can pass through a second attachment guide member at a third corner of the net, the second portion of the drawstring extending down a second side of the net to a fourth corner adjacent to the third corner.

In another aspect, the drawstrings can just pass through a hole in the weight at the respective corners, as described above, instead of an attachment guide member.

In one aspect, the drawstring can include a first loop that can pass through a first attachment guide member at a first corner of the net, the first loop attached to a tether, a second loop that can pass through a second attachment guide member at a second corner of the net, the second loop attached to the tether, a third loop that can pass through a third attachment guide member at a third corner of the net, the third loop attached to the tether and a fourth loop that can pass through a fourth attachment guide member at a fourth corner of the net, the fourth loop attached to the tether.

The drawstring further can pass through at least a fifth attachment guide member configured at an edge of the net and between any two adjacent attachment guide members of the first attachment guide member, the second attachment guide member, the third attachment guide member and the fourth attachment guide member.

In another aspect, the drawstring having a first branch can be attached to a first corner of the net, a second branch can be attached to a second corner of the net, a third branch can be attached to a third corner of the net and a fourth branch can be attached to a fourth corner of the net.

In one aspect, the first branch, the second branch, the third branch and the fourth branch each can pass across the net and through a central location of the net and connect to a tether. In another aspect, the system further can include a tension-producing mechanism that provides the tension on the drawstring to cause the drawstring to draw together the corners of the net to close the projectile down. The tension-producing mechanism can include one or more of: a weight that is dropped, a bullet that is fired, a rewind spool for a tether attached to the drawstring, a parachute attached to the drawstring, a block and tackle structure attached to the drawstring, and a reversal of the first flying vehicle. The tension in the drawstring system can also be produced by the momentum of a moving target vehicle, pressing against the projectile net as it flies past the first vehicle and the end of the tether is reached. Once the end of the tether is reached, the corners of the net come together and encapsulate the target vehicle in a bag-like arrangement.

The drawstring can be attached to a tether which is attached to the first flying vehicle. A first branch of the drawstring can be connected to the a first corner of the net via a first mechanism that provides a first ratio of distance pulled to how much the drawstring draws and wherein a second branch of the drawstring is connected to a second corner of the net via a second mechanism that provides a second ratio of distance pulled to how much the drawstring draws. The first mechanism and the second mechanism each can include one of a pulley, a block and tackle and a loop.

In another aspect, a projectile cartridge that is removably attached to a first flying vehicle is disclosed, the projectile cartridge can include a net, a first weight attached to a first corner of the net, the first weight being configured in a first receiving cavity of the projectile cartridge, a second weight attached to a second corner of the net, the second weight being configured in a second receiving cavity of the projectile cartridge, a drawstring associated with the first corner and the second corner of the net and a tether that attaches the drawstring to the first flying vehicle. Upon firing the net, tension provided to the drawstring can cause the drawstring to close down the net and can cause the net to capture a second flying vehicle.

The projectile cartridge can include a drawstring mechanism to initiate tension on the drawstring to capture the second flying vehicle. The projectile cartridge can further include a third weight attached to the net, the third weight being configured in a third receiving cavity of the projectile cartridge that enables the net to capture the second flying vehicle and a fourth weight attached to the net, the fourth weight being configured in a fourth receiving cavity the projectile cartridge the net to capture the second flying vehicle.

In another aspect, a projectile cartridge configured to be removably attached to a first flying vehicle. The projectile cartridge includes a net, a weight attached to the net, the weight being configured in a receiving cavity in the projectile cartridge that enables a projection of the weight upon firing via a control system on the first flying vehicle and a drawstring configured with the net. The drawstring, after the net being fired to capture a second flying vehicle and upon implementation of a drawing operation, draws in to close the net to enable a capture of the second flying vehicle in the net. The weight can include a first weight attached to a first corner of the net, and wherein the projectile cartridge further can include a second weight attached to a second corner of the net, a third weight attached to a third corner of the net and a fourth weight attached to a fourth corner of the net. The drawstring is either attached directly to a respective corner of the net or slides by the respective corner of the net via a sliding mechanism.

Other Embodiments

Other features are also disclosed that can be related to the use of the net as a projectile. Features that are described herein that represent improvements include a configuration and O-ring design associated with weights attached to corners of a net, an approach to wrapping the net and preparing the net for the projectile module, the string material, replaceable head cartridges, a gun configuration and other approaches to net optimization for capturing drones, and so forth. These various improvements will be addressed in this disclosure and any combination of individual features can be combined and claimed in various embodiments.

For example, utilizing the proper size of the net, a proper hole size for a deployment structure to hold the weights, and string material can result in low drag as the net is deployed and expands. One aspect of this disclosure involves a projectile model which models the characteristics of the net as it flies with a given initial velocity through the air with various environmental conditions such as air density, altitude, wind direction, and so forth. Accordingly, seeking to optimize the physical characteristics of the net is also a factor in how a net model would be developed and used in an analysis of current conditions when determining whether a drone should fire the projectile at a target. Various computer models have been developed to take into account the number of different factors in an analysis to determine whether and when to deploy a projectile to properly capture a drone. These various computer models also involve various different capture strategies or modes of capture. The nets and advanced target envelopment concepts can be optimized for the specific capture modes.

In one example, there can be two completely different basic capture modes or strategies. One can be called the attack mode where the drone chases after the target drone and shoots the net if it can get close enough and aimed correctly. The other is mode can be called defense mode. In this case, the drone just moves laterally on a protection boundary and acts more like a goalie in soccer. The drone in this case tries to position itself in front of the oncoming target drone and if is in the correct location, fires the net at the correct time.

The net system configuration disclosed herein can be adjusted for each of these different modes of capture. Other modes of capture can be incorporated as well.

A drone having a projectile module can follow a target device and can be constantly modeling what would happen if the projectile were fired at a given time. The modeling predicts the path of the projectile, and includes a prediction of the movement in the future of the target device. Using a combination of projective path modeling, and the prediction of the target device path, the system will make timing determinations on when to fire the projectile and at what angle or vector direction.

An example method related to determining when to deploy the projectile includes receiving, at a flying vehicle, information associated with a target flying device, wherein the flying vehicle includes a projectile module containing a projectile. The method includes applying a projectile model which generates a probability value that the projectile, if fired from the projectile module, will hit the target flying device, the projectile model taking into account a wind modeling in an area around the flying vehicle based on an inference of wind due to a tilt of the flying vehicle, the wind modeling also considering one or more (1) how the projectile travels through air in which the air has a particular air density, (2) how the projectile travels through the air at a projectile deployment velocity and (3) a drag on the projectile as it travels through the air. When the probability value indicates that the projectile will hit the targeted device according to a threshold, the method includes firing the projectile at the target flying device. The projectile can include one or more of a net, a streamer, a pellet, a bean bag or an explosive. The projectile module can be attached to the flying vehicle in a fixed position or can have an adjustment component that can enable the projectile module to change its orientation relative to the flying vehicle. For example, the gun can be configured on a gimbal which enables controlled movement and pointing of the gun while attached to a drone.

The projectile model further can consider one or more of a flying vehicle position, a flying vehicle pitch, a flying vehicle yaw, a flying vehicle velocity, a target flying device manufactured specification, a target flying device current position, a target flying device velocity, a predicted path of the target flying device, and a wind velocity. Two, three or four or more of these features can also be included in the evaluation.

The projectile model can also evaluate an orientation of the flying vehicle or based on an orientation of the projectile module. In one aspect, the method can include applying the projectile model to generate a new orientation of the flying vehicle. The method can also include adjusting the orientation of the flying vehicle to the new orientation of the flying vehicle before firing the projectile from the projectile module. The method also can include reapplying the projectile model after adjusting the orientation of the flying vehicle.

In another aspect or example of the concepts disclosed herein, a method can include receiving, at a flying vehicle, an identification of a target flying device, wherein the flying vehicle comprises a projectile module containing a projectile and applying a projectile model which generates a determination which indicates whether, if fired from the projectile module, the projectile will hit the target flying device, the projectile model taking into account a wind modeling in an area around the flying vehicle based on an inference of wind due to a tilt of the flying vehicle. The approach takes into account drag and thrust on the motor and the equations can determine or infer the wind direction and speed based on the angle of the tilt. The wind can also be determined while the flying vehicle is moving, but in some cases not while it is turning. The system can also determine the wind speed as well as a direction of the wind based on evaluating the angle of the tilt and account for the drag and thrust of the motor as well. When the determination indicates that the projectile will hit the targeted device according to a threshold value, the method includes firing the projectile from the projectile module at the targeted flying device.

Another aspect includes a flying vehicle having a processor, a projectile component and a computer-readable storage medium storing instructions which, when executed by the processor, cause the processor to perform operations including receiving an identification of a target flying device and applying a projectile model which generates a determination which indicates whether a projectile, if fired from the projectile component, will hit the target flying device. The projectile model takes into account a wind modeling in an area around the flying vehicle based on an inference of wind due to a tilt of the flying vehicle. When the determination indicates that the projectile will hit the targeted device according to a threshold value, firing the projectile at the targeted flying device.

Another example includes the gun component and replaceable head cartridge as a combined system. The system in this regard includes a gun component configured to be removably and electro-mechanically attached to an object (such as a drone) in which the gun component has an attachment arm with a pin at a first end and an engagement flange at a second end. The gun component includes a cylindrical gas valve, a safety component configured on an exterior surface of the cylindrical gas valve, the safety component having an indented surface on a portion of the safety component, the indented surface complimentary to the engagement flange at the second end of the attachment arm, a splitter component configured adjacent to the cylindrical gas valve, the splitter component having an output opening for gas flow, typically through a plurality of openings, and an accumulation reservoir that communicates a gas from the accumulation reservoir to the cylindrical gas valve.

The system includes a removable projectile head cartridge configured with an engagement member for engaging with the attachment arm and the pin, wherein the removable projectile head cartridge includes a channel (open on both ends) that receives a weight at a first end of the channel such that the weight can be positioned for firing at a second end of the channel. A string connects the weight to a projectile contained within the removable projectile head cartridge. Upon attachment of the removable projectile head cartridge to the gun component, a channel opening (or a plurality of channel openings) in the channel aligns with the output opening(s) in the splitter component such that upon firing via an electrical signal from the object, gas is communicated from the accumulation reservoir, via the cylindrical gas valve, to the splitter component, through the output opening in the splitter component and to the channel opening to project the weight out the channel, causing the weight to accelerate and to pull the projectile out of the removable projectile head cartridge.

The safety component further includes a first arm and a second arm each attached to the portion of the safety component and a second portion of the safety component connected to the first arm and the second arm, the second portion having a safety flange positioned to block movement of an attachment component of the gun component in a first position of the safety component and an opening on the second portion for enabling the movement of the attachment component of the gun component in a second position.

The first position can coincide with the removable projectile head cartridge not being locked into engagement with the gun component. In one aspect, the first position coincides with the engagement flange not being aligned with the indented surface on the portion of the safety component. The second position can coincide with the removable projectile head cartridge being locked into engagement with the gun component. The second position can coincide with the engagement flange being aligned with the indented surface of the portion of the safety component.

The gun component further can include a first fixed member for engaging with a first receiving structure of the object and a second moveable member for engaging with a second receiving structure of the object, wherein the second moveable member is enabled to engage with the second receiving structure of the object according to a position of the safety component.

The position of the safety component can be variable as the safety component is rotated around the cylindrical gas valve. The removable projectile head cartridge can have an opening that is one of rectangular shaped, square shaped, or circular shaped. The projectile can include a net having four corners and wherein a respective string connects each respective corner to a respective weight of four weights.

The removable projectile head cartridge can include four channels, each receiving the respective weight of the four weights. A net head can have more or less than four channels as well, such as a six or eight channels in the net head. In one aspect, the channel has a rifled configuration, and wherein the weight includes a swivel such that at least a portion of the weight can twist independent of a connection component to which the string is tied.

Another aspect of this disclosure can include claims directed to the removable head cartridge. An example removable projectile head cartridge includes a cup structure having a channel configured in a wall of the cup structure, the channel having a first opening at a lip of the cup structure and a second opening at a base of the cup structure, wherein a weight having a string attached is inserted into the first opening at the lip of the cup structure for movement to the second opening at the base of the cup structure in preparation for firing, wherein the string is also attached to a projectile held within the cup structure. An engagement member can be configured on an outer surface of the cup structure for engaging with a gun component via an attachment arm with a pin, the attachment arm and pin being configured on the gun component, wherein upon attachment of the removable projectile head cartridge to the gun component, the second opening at the base of the cup structure aligns with an output opening in a splitter component of the gun component such that upon firing via a signal from an electrical signal from an object to which the gun component is attached, gas is communicated from an accumulation reservoir on the gun component, to an cylindrical gas valve on the gun component, to a splitter component on the gun component, through the output opening in the splitter component and to the second opening at the base of the cup structure to project the weight out the channel, causing the weight to pull the projectile out of the removable projectile head cartridge.

The cup structure can include 2, 3, 4 or more channels, each respective channel receiving a respective weight. The channel can be rifled and the weight in this scenario can include a swivel that causes a portion of the weight to twist independent of a connection component of the weight to which the string is attached. A cover can protect the projectile within the cup structure, wherein the cover breaks upon firing the projectile. The weight can have a first end that is rounded and a second end having a sharp edge. In one aspect, a string attachment component is connected to the second end of the weight. The first end of the weight that is rounded can be inserted into the channel in preparation for firing. The removable projectile head cartridge can be made by a 3D printer or through injection molding.

DETAILED DESCRIPTION

The present disclosure relates to a projectile system for configuration on a drone and in one example, contains a net that can be deployed for capturing an enemy drone. The net can be prepared and have a respective weight attached to each corner. Each weight can have an O-ring and be configured in a slot such that utilizing air pressure from a canister, and based on a modeling of the projectile and the environment around the enemy drone, a system operating on the drone will determine when to deploy the net to capture the enemy drone. The various details of this system are discussed herein. The general embodiments are disclosed first with respect to FIGS. 1-12. The cocklebur embodiments are introduced with respect to FIGS. 13A-23B and the drawstring embodiments are introduced with respect to FIGS. 24A-35.

The typical usage of the term "cocklebur" refers the item that grows on a bush that can stick to a person or animals clothing or hair. In one example, a "cocklebur" can consist of any type of material or object that has a multiplicity of small projections each with a single hook or multiple hooks configured near the distal end of the respective projection so as to facilitate hooking into other appropriate materials, such as fibrous materials like the net disclosed herein by way of example.

As the system disclosed herein requires computing components, a general example computing system shall be disclosed in FIG. 1, which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different The processor 110 can include any general purpose processor and a hardware module or software module/service, such as service 1 132, service 2 134, and service 3

136 stored in storage device 130, configured to control the processor 110 as well as a special-purpose processor where software instructions are incorporated into the actual processor design. The processor 110 may be a self-contained computing system, for example, containing multiple cores or processors, a bus (connector), memory controller, cache, etc. A multi-core processor may be symmetric or asymmetric.

To enable user interaction with the computing device 100, an input device 145 can represent a variety of input mechanisms, such as a microphone for speech, a touch-sensitive screen for gesture or graphical input, a keyboard and/or mouse, e.g., for motion input and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and/or hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

It is noted that in one aspect, a computer or computers can be deployed upon a flying vehicle, such as a drone, or as part of a projectile module that is removably attached to a drone in which interfaces with the control system of the drone. The computer or computer devices may also be deployed as a separate control system which can communicate with a drone and/or a projectile module and/or projectile itself. Any wireless protocol is contemplated as being utilized for such communication.

Figure 2:
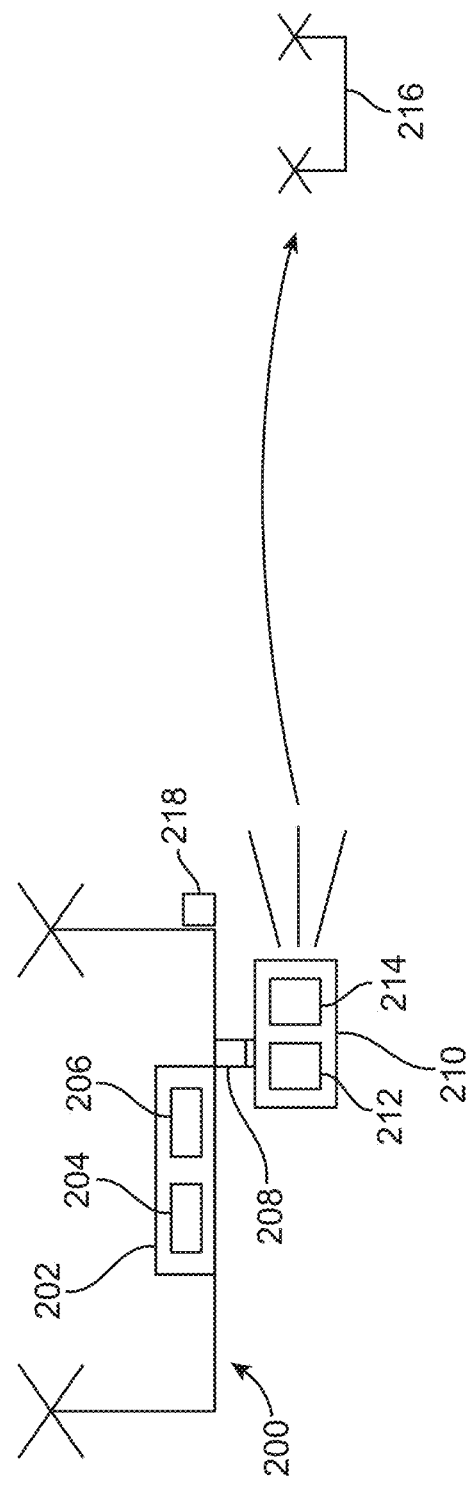
FIG. 2 illustrates an example flying vehicle having a projectile module.

FIG. 2 illustrates the overall system design is disclosed herein. The system includes a flying vehicle 200, such as a drone. The particular configuration of the drone can vary. While the term drone may be used herein, any flying vehicle that has the components disclosed herein, and performs the functions described herein can apply.

A control system 202 can be included on the flying vehicle 200 to control its operation. Control module 204, 206 can represent the various functions performed by the control system 202. For example, feature 218 can represent a radar or detection system that can identify a target device 216 that the drone 200 desires to engage with. The control system 202 can provide movement instructions, and receive feedback from various components 218 on the flying device 200. The flying device 200 also includes a projectile module 210 which is attached to the flying device 200 via an attachment module 208. The projectile module can be snapped into the attachment module 208 in a single connecting motion. For example, spring-loaded arms with steel dowels that can be perpendicular to an access of the launching direction and attached to ends can be utilized to ramp on the projectile module 210 as it is connected and to hook it on when it is in place. A locking attachment guide member can be twisted in place to make sure that connecting arms cannot release the projectile until a attachment guide member is unlocked. The entire projectile module 210 can be attached to the drone and quickly detached as well. In one example, the projectile module 210 is held in a pistol grip and a trigger is squeezed to release the device from its amounts. Pogo pins can be used to quickly attach the gun electrically to the mount so that it is at once physically connected. It can also be configured to be electronically commanded to fire as described herein.

In one aspect, the projectile module 210 can include some or all of the computing capability necessary for running an algorithm to determine when to fire a projectile from the module. In one aspect, some computing can occur on the projectile module and some computing can occur on the flying vehicle. Wireless communication can occur between the flying vehicle and the projectile module 210 to communicate firing instructions according to any wireless protocol such as Near Field Communication or Bluetooth. The projectile model can include a battery which can operate the electrical components including the solenoid which can cause the compressed gas to flow and project the projectile from the projectile module.

According to the present disclosure, any number of different mechanisms can be utilized to attach the projectile module 210 to the flying vehicle 200. The projectile module 210 includes a number of components 212, 214. These can represent multiple projectiles that can be contained within the projectile container new tab 210, or they can include a control mechanism, compressed gas, and so forth, which are more fully described herein and which embody the various features of the projectile module.

Figure 8:
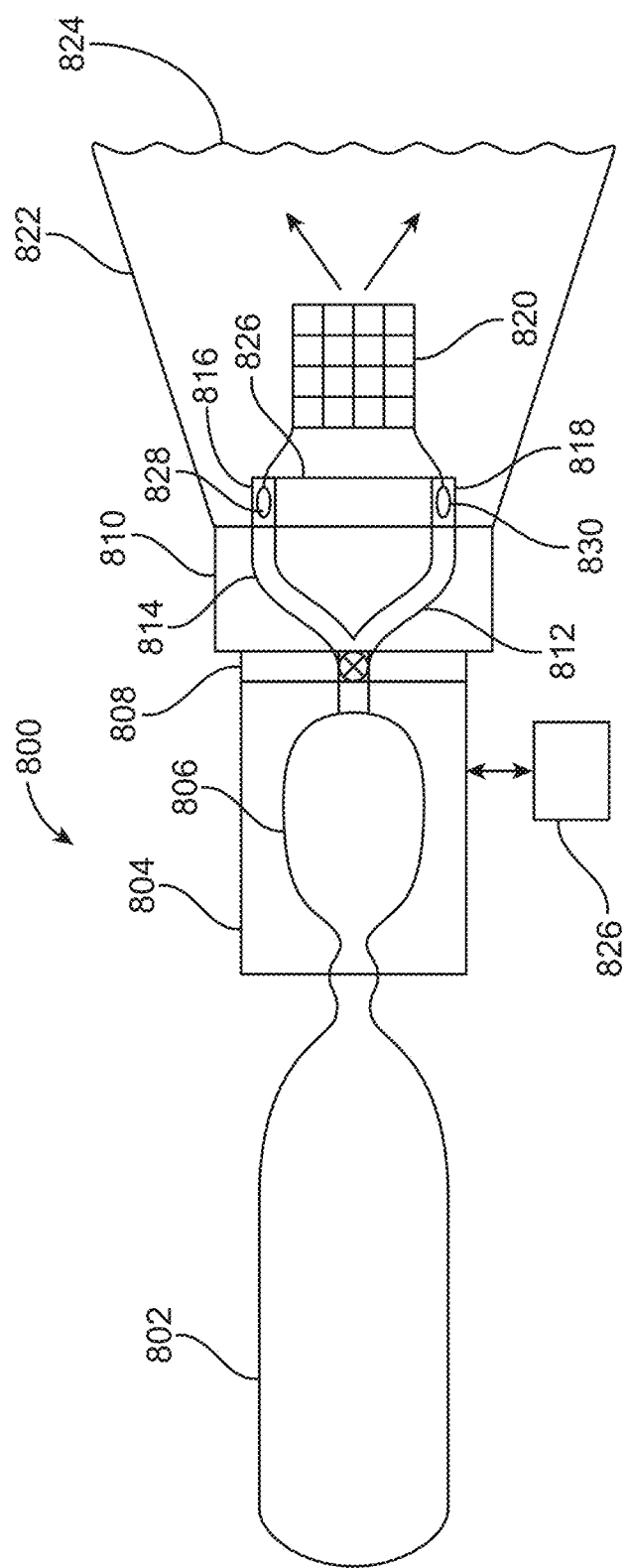
FIG. 8 illustrates the use of a compressed gas in the projectile module.

The flying vehicle or system 200 can also encompass the following features. The flying vehicle can include a processor 204 that is part of a computing device or control system 202. The flying vehicle can include a projectile component 210 and a computer-readable storage medium storing instructions 206 which, when executed by the processor, cause the processor to perform operations. The system 200 can include electrical communications between the control system 202 and the projectile module 210. These can be wired or wireless communications. For example, any wireless protocol such as Bluetooth can be utilized to communicate a triggering command from a control module 202 on the flying vehicle 202 to a projectile module 210. The triggering command is sent based on an evaluation model that takes into account the various components and factors described herein to determine when an appropriate time exists to fire the projectile. The latency associated with firing the projectile has to be low and custom electronics for high-speed electromechanical interactions are useful for reducing the latency between the determination by the computing model to fire the projectile and the actual firing of the projectile. The triggering command can cause various components to deploy the projectile. FIG. 8 shows some of these components. A solenoid 808 to cause gas to flow from a reservoir 806 through channels 814, 812, into barrels 816, 818, which can cause the weights to travel from the projectile module 822 and at the target device.

The operations can include one or more of receiving an identification of a target flying device, applying a projectile model which generates a determination which indicates whether a projectile, if fired from the projectile component, will hit the target flying device. The projectile model takes into account one or more of a wind modeling in an area around the flying vehicle based on an inference of wind due to a tilt of the flying vehicle and a projected movement of the target flying device based on the identification of the target flying device. When the determination indicates that the projectile will hit the targeted device according to a threshold value, the system will fire the projectile at the targeted flying device.

Figure 3A:
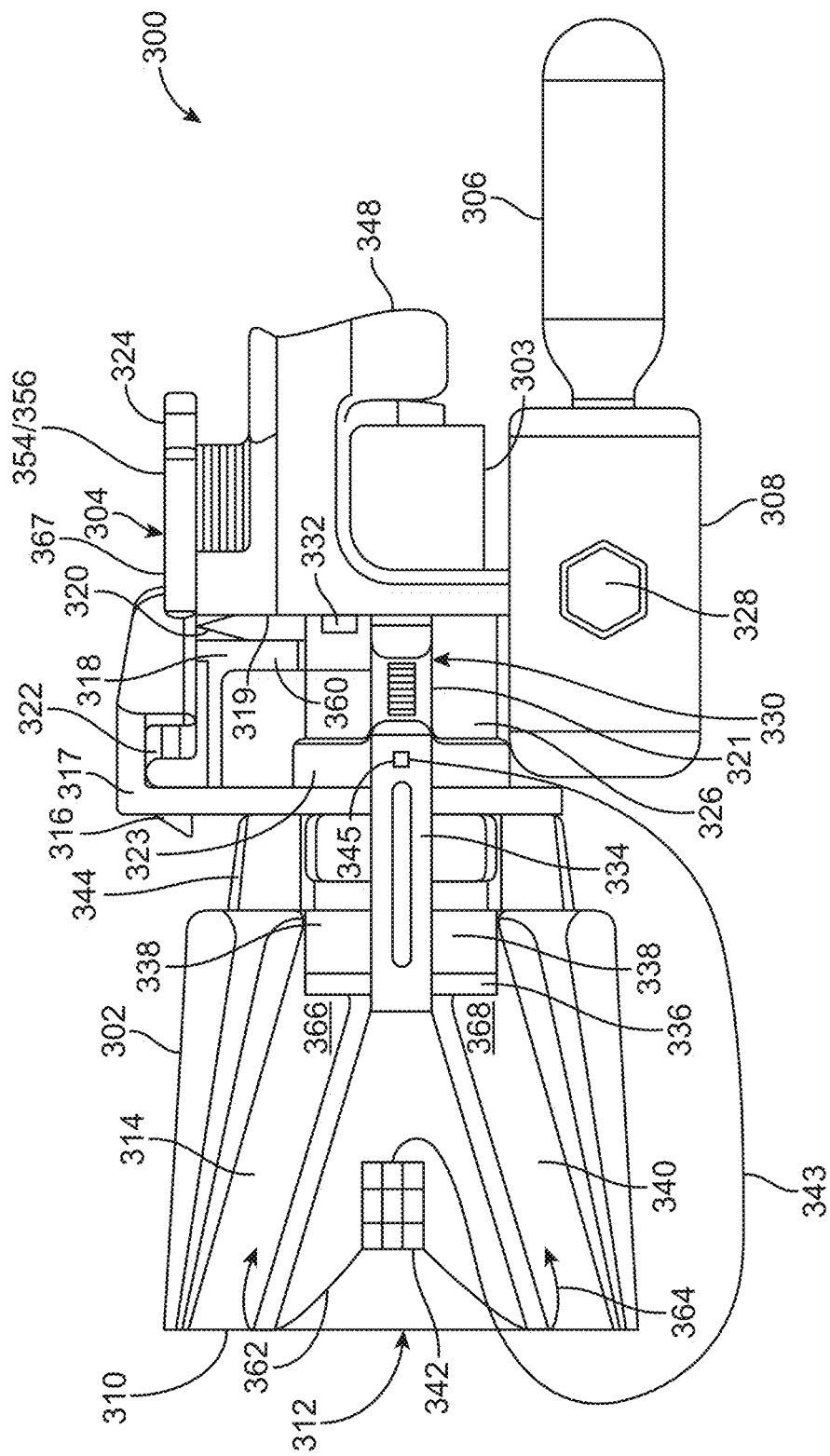
FIG. 3A illustrates an example projectile module attached to a gun base.
Figure 6:
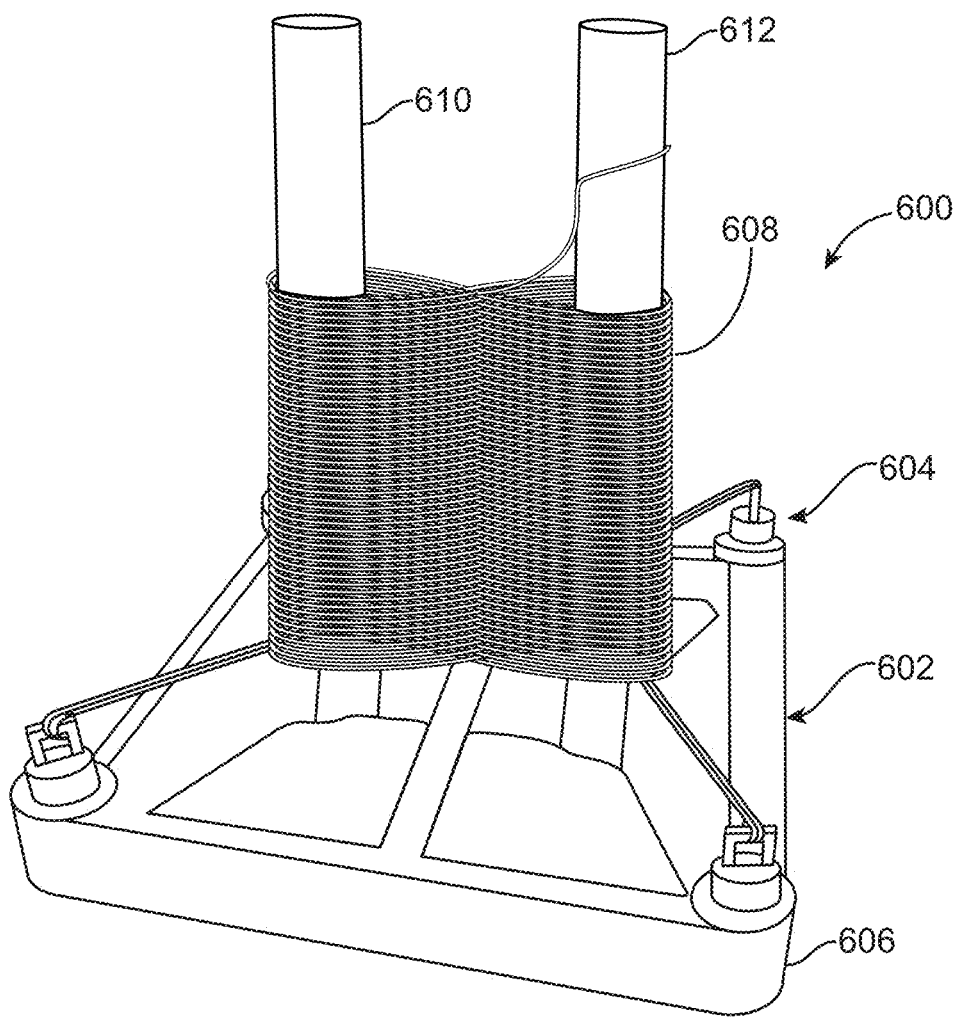
FIG. 6 illustrates a jig used to pack the net into the projectile module.

FIG. 3A illustrates an example structure associated with the projectile module 210 and which can include components of the attachment module or gun 208/304. This can be called a gun component 304. Components 300 can include a first component 302 including a disposable net container that is prepared with a net or projectile using a tool or jig such as is shown in FIG. 6. One way of characterizing the first component is a cup structure in that there is an interior portion which receives the projectile and walls on all sides generally like a cup. The channels disclosed herein are configured in the walls of the cup in this characterization.

Figure 3B:
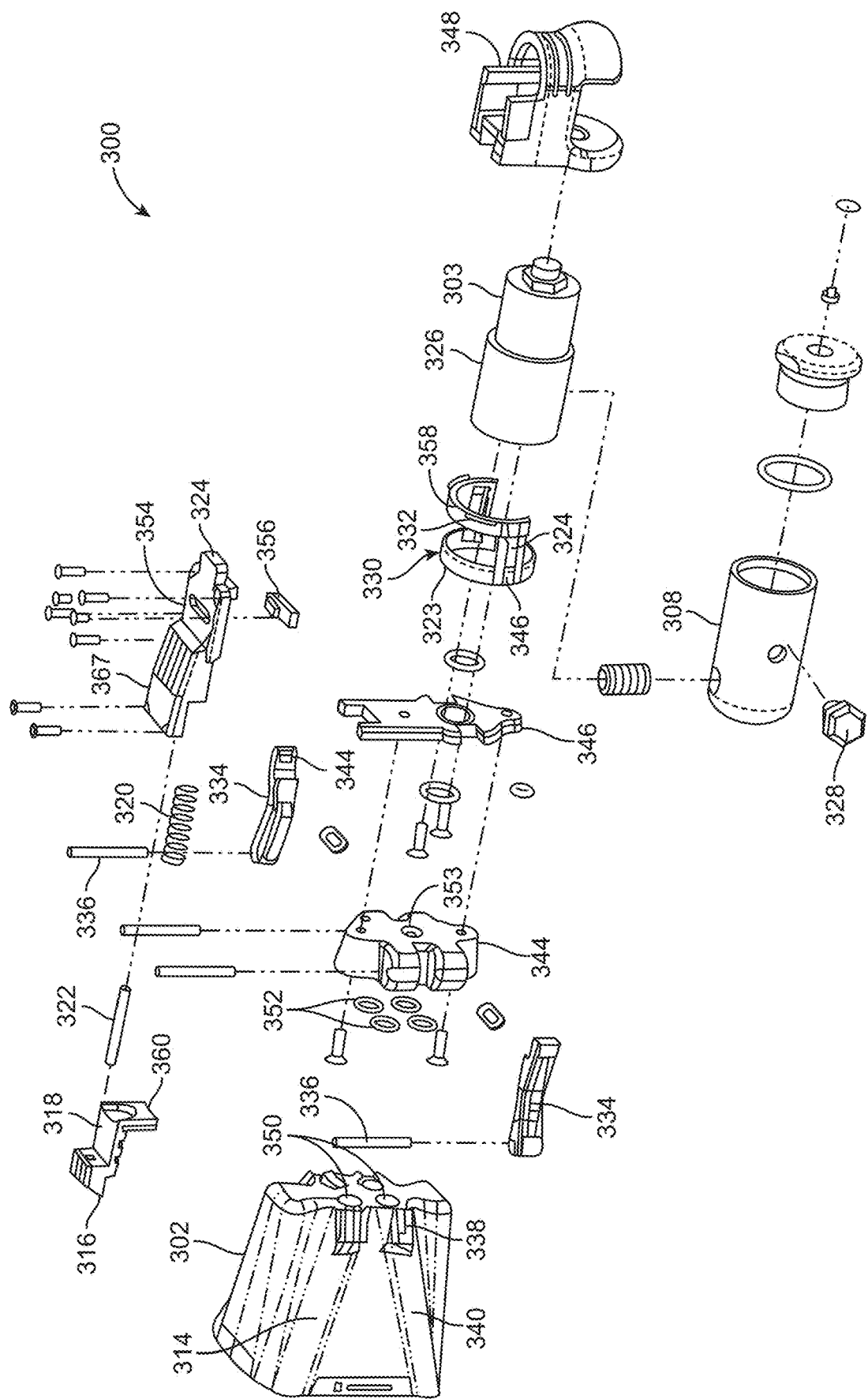
FIG. 3B illustrates an expanded view of the projectile module and gun base.

The first component 302 can also be characterized as a clip-on net head cartridge. It can be a single use cartridge or a multi-use cartridge. The overall system includes a gun portion 304 which is attachable to an object such as a drone and a removable/replaceable projectile module 302. The gun portion 304 includes a number of different components. The gun portion 304 can be attached to a structure configured under another object, such as a drone. To enable such attachment, a movable attachment component 318 is configured within a framework 317 on the gun portion 304. The attachment component 318 as well as other specific components discussed below are shown in FIG. 3A and FIG. 3B. A spring 320 is positioned between a portion 360 of the attachment component 318 and a top structure 366 of the gun portion 304. A rod 322 is also configured in connection with the attachment component 318 and the top structure 366 to guide the movement of the attachment component to enable a user to attach the gun to the object or detach the gun portion 304 from the object. To attach the gun portion 304 to an object, a person would move the attachment component 318 by using their finger to pull on the extension portion 360 so as to compress the spring 320. This would cause the attachment component 318 to move such that a securing member 316 moves to the right (according to the configuration in FIG. 3A) to a retracted position. With the securing member 316 in the retracted position, the user could engage the extending member 324 into a receiving opening on the object (drone, etc.) and then move the gun 304 upward into a locking position such that releasing the attachment component 318 causes the spring 320 to extend the securing member 316 to the left such that the gun 304 is locked into position.

In a locked position, the top component 367 will include an opening 354 and an electrical component 356, which can engage with an electrical connector on the object such that the object can trigger the firing of the projectile 342. An electro-mechanical connection between the gun 304 and the object 702 enables an easy approach of providing both the mechanical attachment as well as the ability to electrically communicate and control the gun 304 and projectile component 302 from the object. The electrical connection and mechanical attachment are achieved simultaneously in the single attachment motion disclosed herein utilizing, for example, spring-loaded pogo pins. A wireless communication could also be deployed using Bluetooth, a near-field communication protocol, or any other electronic means or protocol.

One aspect of the structure of the gun portion 304 is the ability to control when the user is able to move the attachment component 318. For example, it is preferable that the user be able to attach or detach the gun portion 304 only when the removable projectile module 302 is in a locked position. If the user is able to detach or attach the gun 304 to the object when the head cartridge 302 is not secure, it could fall or detach accidently due to the movement of the gun portion 304. To control the ability to remove the gun portion 304 from the object, a rotatable safety member 330 is included. The safety member 330 is configured to be positioned on the cylindrically shaped gas valve component 326. The safety member 330 has several characteristics which ensure that the user can only attach or detach the gun portion 304 when the projectile module 302 is locked in place or in certain other configurations.

The safety member 330 includes an indented portion 346 (shown in FIG. 3B) which is configured on one or both sides of the safety member 330. The indented portion 346 has a complementary shape to a flange 344 (shown in FIG. 3B) configured on the inner end of one or more securing arms 334. The securing arms 334 are configured to be biased in a closed position such that the pins 336 engage with engagement members 338 on the projectile module 302. The user will attach the projectile module 302 by engaging with the securing arms 334, and compressing an end of the securing arms having the flange 344 such that the removable projectile module 302 can be positioned as shown in FIG. 3A. To lock the projectile module 302 into place, the user releases the securing arms 334 and the pins 336 will engage with the engagement members 338 on the head cartridge 302.

The safety member 330 and its indented portion 346 will then engage with the flange 344 to lock the projectile module 302 into place. In this position, an opening 358 on the safety member 330 will coincide with the position of the member 360 such that when the user pulls on the member 360, the attachment component 318 can move so as to compress the spring 320 and enable the user to attach or detach the gun portion 304. As can be appreciated, when the safety member 330 is rotated around the cylinder 326 such that the indentation 346 is not engaged with the flange 344 such that the user can attach or remove the projectile module 302 by manipulating the attachment arms 334, a safety flange 332 is rotated into a position between the member 360 and a position 319 on the gun portion 304, so as to prevent the user from manipulating or moving the attachment component 318. This is because the component 360 will butt up against the safety flange 332, preventing the attachment component 318 from moving the attachment member 316 into a position of enabling attachment or detachment of the gun 304. It is noted that there may be two or more flanges 332 configured on the safety member 330.

Without the ability to move the attachment component 318, a user could not attach or detach the gun portion 304 from the object because the person would not be able to retract the member 316. As is shown in FIG. 3B, the safety member 330 can include in one aspect, a ring-shaped component 323 and a first extension member 321 and a second extension member in opposite positions on the attachment guide member such that a semicircular component or portion of the safety member can attach to the first extension member 321 and the second extension member. Note that the semicircular component can include one or more of the flange 332, an opening portion 358 and another flange not shown. The semicircular shape shown in FIG. 3B is by way of example. The portion of the safety member 330 containing the flange 332 could also be circular as well. In another aspect, the portion of the safety component having the flange 332 could be ring-shaped, and the portion having the indentation 346 could be semi-circular. The functionality of the safety component 330 is that it is configured to rotate on the cylindrical valve 326 from a locked position to an unlocked position for the head cartridge 302. There are a number of different structures which can be implemented to enable this functionality and one example structure is provided.

The first extension member 321 is thicker than the ring-shaped component 323 for the following functionality. When in a locked position as shown in FIG. 3A, the first extension member 321 and the second extension member (not shown) are thick enough to prevent the user from being able to manipulate the attachment arms 334 to attach or detach the projectile module 302. However, when the safety member 330 is rotated such that the thinner portion of the ring-shaped component 323 coincides with the ends of the attachment arms 334, there is enough space between the ends of the attachment arms 334 and the ring-shaped component 323 such that the user can manipulate the attachment arms 334 and either attach or detach the projectile module 302.

The safety component 330 therefore operates in the following manner. The gun 304 can be attached to the object either (1) when a head cartridge 302 is attached to the gun 304 and the safety component 330 is locked in the position shown in FIG. 3A such that the structure 358 enables the component 360 to be moveable to attach or detach the gun 304; or (2) when there is no head cartridge 302 attached and the safety component 330 is also in the same position shown in FIG. 3A. If the head cartridge 302 is attached but the safety component is not locked into the proper position, such that the head cartridge 302 could be removable or could fall off, then the user cannot attach or detach the gun 304 due to the flange 332 preventing the movement of the component 360 against the spring 320. A sticker or an indication can be positioned on the cylinder 326 to inform the user regarding whether the head cartridge 302 is locked in position or not. The sticker/indication would be placed typically on the cylinder 326 behind the position of the arm 321 shown in FIG. 3A. The indication could be paint, ink, or any kind of marking to illustrate or inform the user regarding the status of the head cartridge 302. Thus, if the safety component 330 is rotated such that the arm 321 is either above or below the location shown in FIG. 3A, the configuration of the safety component 330 would reveal the notification (like a red dot) that the head cartridge 302 is not locked into position.

Other components of the gun portion 304 include a compression chamber, accumulation reservoir, or gas reservoir 308, having a pressure indicator or dial pressure gauge 328. A canister 306 of compressed air or $CO_2$ can be attached to the compression chamber 308. An intermediate chamber or gas valve 326 can receive the compressed air as controlled by the gun portion 304 such that, upon firing, the gas can flow into a splitter component 344 that splits the flow of gas from an intake portion 353 into two or more output channels represented by O-rings 352. The O-rings 352 or a rubber component for each opening is used to seal an opening on the splitter 344 with the respective opening 350 on the head cartridge 302. In other words, the other side of the splitter component 344 has two or more openings that are configured to coincide with the openings 350 on the projectile module 302. In a locked position in which the pins 336 lock with the engagement members 358, the O-rings 352 will provide an airtight channel between the exit openings on the splitter component 344 and the input openings 350 on the projectile module 302.

While separate O-rings 352 are shown as providing a seal between the component 344 and the openings 350, in another aspect, a single gasket can be used to seal the interface between the removable head cartridge 302 and the gas splitter 344. In some cases, individual O-rings can be susceptible to fall out. The single gasket can have four openings in a scenario where there are four channels for gas to flow. In another aspect, the gasket could be configured for a different number of openings as well. A single gasket which provides the sealing function can insure a more stable seal and the more simple manufacturing process then individual O-rings.

The gas reservoir 308 is used to ensure that there is a repeatable and consistent gas pressure at which the projectile is fired. When making the calculations regarding when to fire the projectile, the system needs to have a high confidence level in the gas pressure at which the projectile is fired. Otherwise, the speed at which the projectile exits the barrel can vary or be inconsistent.

A component 348 can be attached to the gun portion 304 to protect some features of the gun 304 such as the gas valve component 326.

Figure 5:
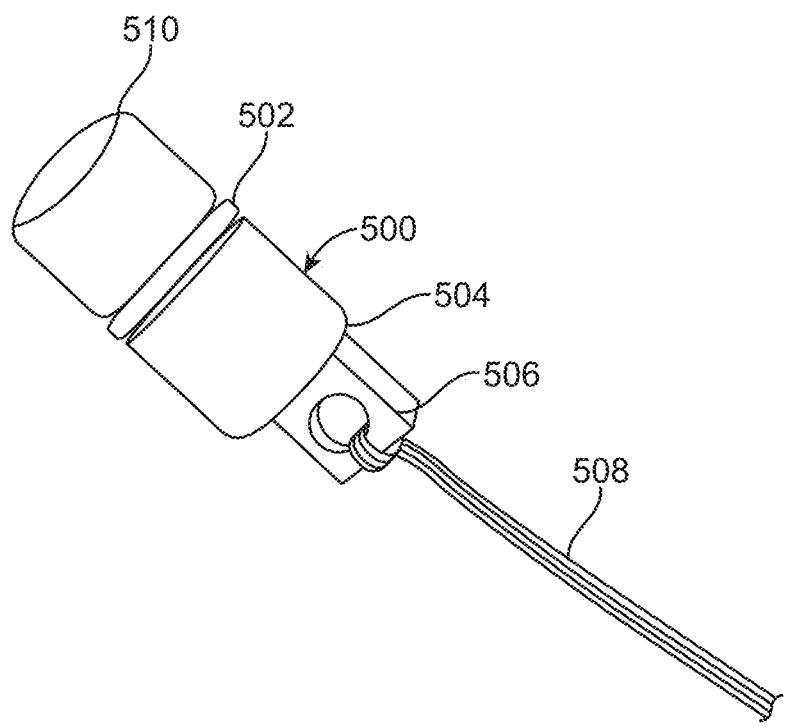
FIG. 5 illustrates an example weight associated with the projectile.

The projectile module or cup structure 302 includes a number of channels 314, 340, configured in the walls of the structure which receive weights as shown in FIG. 5. Each respective channel 314, 340 receives a weight such that a rounded end of each respective weight can be seen in the opening 350. The channels are configured within the walls of the cup or head cartridge 302 and each channel has openings at both ends. A first opening of the respective channel is used to receive the weight for insertion into the channel and to enable the weight to be shot or projected out of the channel. A second opening of the respective channel is used to enable the pressurized gas into the channel to push or force the weight through the channel and out the first opening. Feature 350 represents the respective second openings of each of the channels in the head cartridge 302. The respective weights will be positioned at locations 366, 368 shown in FIG. 3A. Each respective weight will have a line 362, 364 attached to it that is also attached on the other end to the projectile 342. When the system fires, the compressed gas will flow from the compression chamber 308 and a threaded inert gas bottle or canister 306 into into the solenoid component 303 actuated gas valve 326 and through an opening in the brackets 346 to the opening 353 in the splitting component 344 such that each opening 350 (which can include one, two, three, four, or more openings) will experience a high enough air pressure to cause the respective weights to travel quickly through the channels 314, 340, such that they break out of a breakable seal 310 on the projectile module 302 and exit at a high enough velocity to carry the projectile outward. An electrical signal can be provided from the object to the electrical component 356, which can cause the solenoid 303 to activate and cause the firing of the projectile. The moving weights will then pull the projectile 342 out of the opening 312 and towards the respective target. The solenoid 303 can be a coil wound into a tightly packed helix which can produce a uniform magnetic field in a volume of space when the electrical current is passed through it. This component can also be characterized as a solenoid valve which, when integrated with the component 326, will actuate the valve 326 to cause the gas to flow from the accumulation reservoir 308 through the valve 326 and the splitter component 344 the fire the projectile.

The weights that are used will fit within the channels 314, 340 at their position 366, 368 in a manner such that upon the application of the gas pressure from the component 344 and other components that the pressure will cause the weights to accelerate down the respective channels 314, 340 and exit at a predictable speed. The channels have respective openings at both ends. The O-rings 502 (see FIG. 5) around the weights can also provide the air seal to ensure the compressed gas acts to accelerate the weight without leaking past the weight during the firing process. The material of the weights can be metal such as stainless steel but it can also be other materials as well such that the proper weight of each of the weights can be configured.

The firing direction 312 is shown and a sealing 310 can exist at an opening of the projectile module 302, which can be used to seal the first component for dirt or water ingress protection. For example, aluminum foil, or other suitable material, 310 can be used to cover the opening, which can easily be broken upon firing. Not shown is an optional string or line that can be attached to the projectile 342 at a first end and which can have a connector at a second end, which can be attached to the object or the drone. The optional string can then be used to retrieve the target object rather than merely causing the target object to fall to the ground.

It is noted that FIGS. 3A and 3B illustrate the projectile module 302. Another term for the projectile module 302 can be a single head cartridge. The cartridge could be 3D printed on site. For example, a customer could receive a drone and a gun component 304 with computer-readable configuration instructions for printing projectile modules or single head cartridges in the field using a 3D printer. Thus, in terms of a product-by-process embodiment, the product of the gun 304 having an attached projectile module 302 can include receiving a physical gun 304, as described herein, and receiving computer-readable instructions for instructing a 3D printer to create the projectile module 302 configured to receive the projectile and respective weights as described herein, and configurable to be removably attached to the gun. The cartridge could also be injection molded as well.

Other example configurations could include a dual launcher in which multiple gun components 304 can receive multiple head cartridges 302. In this configuration, the object to which the multiple components are attached can be configured to provide an electrical signal to each respective unit so that multiple shots can be available. The overall system can also be configured to have more than two units such that three or more projectiles can be fired.

Figure 4:
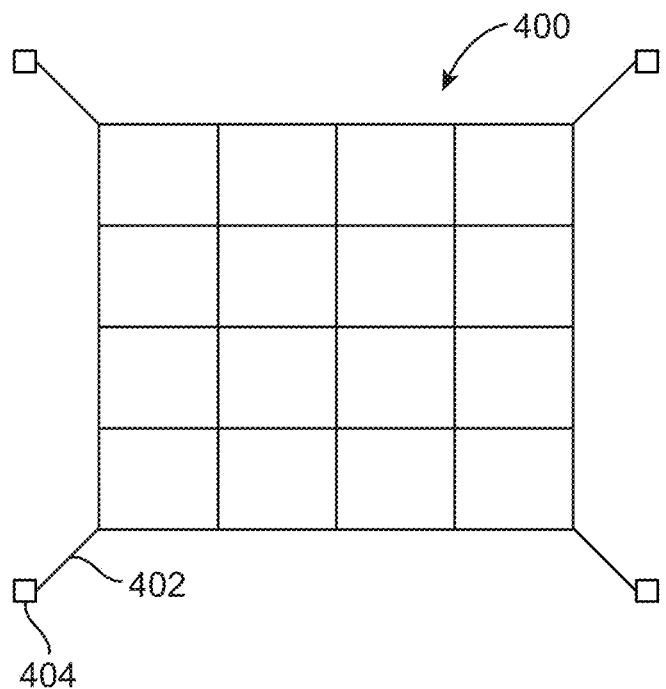
FIG. 4 illustrates an example projectile.

FIG. 4 illustrates a net 400 which can be used as a projectile. An example net is 3.2 m by 3.2 m square with approximately 40 cm spacing between the strings. Of course this represents only an example net configuration and this disclosure contemplates a number of different configurations. For example, the nets might be hexagonal, octagonal, circular, oval, rectangular, or have a random or more complicated shape. The net in FIG. 4 includes corner component 402 are each attached to a weight 44. Each weight at a corner of the net has a certain configuration that will be discussed in FIG. 5.

An example net material is a 0.6 mm diameter Dyneema string. Other diameters and string material are also contemplated as well. In one example, each corner of the net has a tail that is used to attach a respective weight 404. The component 302 is configured to accept a variety of net sizes. For example, feature 212 can be of one size and feature 214 can represent another size. The net size described above with the 3.2 m×3.2 m square shape is considered one size that can catch a majority of target devices.

The number of weights also can vary. For example, if the net shape is circular, the system may deploy the net with three weights or five weights. More or less weights are also contemplated and can be included in the overall projectile design. The weights may be of the same weight and configuration or may be different weights or different configurations depending on the projectile model. For example, heavier weights on some edges can cause the net to travel through the air differently.

In another example, a projectile cartridge can be configured to be removably attached to a first flying vehicle. The projectile cartridge can include a net and a weight attached to the net. The weight can be configured in a receiving cavity in the projectile cartridge that enables a projection of the weight upon firing via a control system on the first flying vehicle. The cartridge can include a drawstring configured with the net, the drawstring connected to a tether which is anchored to the first flying vehicle. The momentum of a second flying vehicle upon impacting with the net can cause the tether to pull the drawstring and close the net on the second flying vehicle thus capturing the second flying vehicle In another aspect, a projectile cartridge can be configured to be removably attached to a first flying vehicle. The projectile cartridge can include a net and a weight attached to the net, the weight being configured in a receiving cavity in the projectile cartridge that enables a projection of the weight upon firing via a control system on the first flying vehicle.

The cartridge can include a drawstring configured with the net, the drawstring connected to a tether which is attached to a parachute. In one scenario, a momentum of a second flying vehicle upon impacting with the net can cause the tether being resisted by the parachute to pull the drawstring and close the net around the second flying vehicle thus capturing and disabling the second flying vehicle due to the drag of the parachute.

FIG. 5 illustrates an example weight 500. In one example, the weights are made of stainless steel, but other materials are also contemplated. An example weight is cylindrical in shape and has an O-ring groove 502 and a string attachment point 506. A distal end 510 of the weight has a preferable configuration of being rounded but could also be squared off as well. An O-ring 502 on the weight 500 is positioned to allow the weight to sit snugly in a respective channel 314, 340 at the proper position 366, 368. Having the respective weight fit within the net head cartridge 302 at the proper position provides a more powerful deployment of the projectile. Each respective weight's leading edge 504 is configured with a sharp corner or edge which lessons a likelihood of jamming the string (connected to the net or projectile) as the weight 500 travels through the channel 314, 340. A tail 508 attaches the weight 500 to a corner or a component of the net 400. A width of the string attachment point 506 is typically less than a width or diameter of the weight at point 504. The difference in width of these two portions of the weight 500 is purposefully designed to enable the deployment or the transition of the weight from point 366, 368 through the respective channel 314, 340 without the string 508 getting caught between the weight 500 and an interior surface or channel wall as the weight moves through the channel 314, 340. Having a rounded end 510 of the weight, with an O-ring 502 located somewhere along the weight, and a sharp edge 504 at the other end of the weight 500 enables an improved process of firing the weight through the barrel or channel 314, 340 without the string 508 being tangled or fouled in the process.

There are a number of benefits of using an O-ring on the weight 500. For example, using the O-ring simplifies the manufacture of the weight 500 because it reduces the precision required. The O-ring can seal the gas upon firing to conserve the potential energy in the compressed gas and can physically retain the weight 500 in place so that it does not slide or move out of position. The O-ring is configured within a channel or groove that is in the outer surface of the weight 500 and which is configured to receive and retain the O-ring in place.

While the shape shown in FIG. 5 it is preferable for the weight, other configurations are contemplated as well. For example, a square or rectangular shape could also be applied. A swivel point for a rifled configuration could be between the weight at position 504 and the string attachment component 506. A swivel point could also be near a middle region such as where the O-ring 502 is configured. The weight could also be spherical in shape with an attachment component 506 configured at a location on the sphere.

One purpose of the O-ring 502 is to maintain the respective weight at its proper position 366, 368. If the weights are in different positions within a respective channel 314, 340, each respective weight could deploy at different speeds or different velocities, which can be problematic in that the system is determining a prediction of the path and speed of the projectile which includes an expectation of a consistent or expected speed of the weights as they deploy. Accordingly, the use of the O-rings 502 helps to ensure that the weights are in their proper and expected position 366, 368 within the projectile cartridge 302 prior to deployment.

In another aspect, the diameter of the weight 500, relative to the channel interior diameter 314, 340 can be close enough to prevent a respective weight from shifting or moving within the channel prior to firing. Accordingly, while the use of the O-ring 502 is beneficial, it is not considered an essential feature.

In one aspect, the channels 314, 340 can be rifled such that helical grooves can be provided in a round bore. Any kind of rifling configuration of the barrels 314, 340 can be applied. In this aspect, the weights 500 can also be made to match the shape of the bore so that the respective weights would grip the rifle bore and spin in a certain direction. In one aspect, the weights 500 could include a swivel such that the string attachment point 506 can twist independent of the weight 500.

FIG. 6 illustrates a tool or jig used to prepare a net for insertion in the net head cartridge 302. Preparing a net (when a net is the projectile) involves configuring the net to be inserted into the cartridge 302 with the respective weights being pushed down the barrels 314, 340 into the proper respective position 366, 368 such that the net 342 deploys properly. This is not an easy process. Therefore, FIG. 6 shows an example tool for preparing the net for insertion into a head cartridge 302. Turning to FIG. 6, the net 608 rests in a container that has four barrels 606, one barrel being positioned at each corner of the net container 600. The barrel 606 is a hole or opening for a respective weight 604 attached to the net. The container 600 is removable from the projectile module 210. Each respective weight 604 is loaded into a respective barrel 606 and the net 608 is placed in between them in the container 600. Shafts 610, 612 can be used to position the net 608 in such a configuration that prevents the net from jamming as it is deployed. A shape of the net container 600 is shown to be square 602 in FIG. 6. But this is not an essential characteristic of the net container 600. For example, if the net were to have a circular configuration or triangular configuration, and three weights were used for a deployment, a shape 602 of the net, container 600 might be circular or triangular. The shape may also be circular if, for example, five weights were used. Thus, the particular shape of the net container 602 can vary depending on the shape of the net to be deployed or other factors.

The net 342 with the weight(s) attached and the head cartridge 302 can together be considered a removable or disposable single net shot. They can be traded out each time the device is used. For example, a disposable net head cartridge 302 can be used once or a number of times. Packing the nets to ensure that they deploy correctly and accurately is favorable. One reason to provide a removable or disposable single net shot is that customers who utilize the projectile modules will not want to pack them themselves and will want single shot disposable net containers that make it more simple to utilize the technology.

Figure 7:
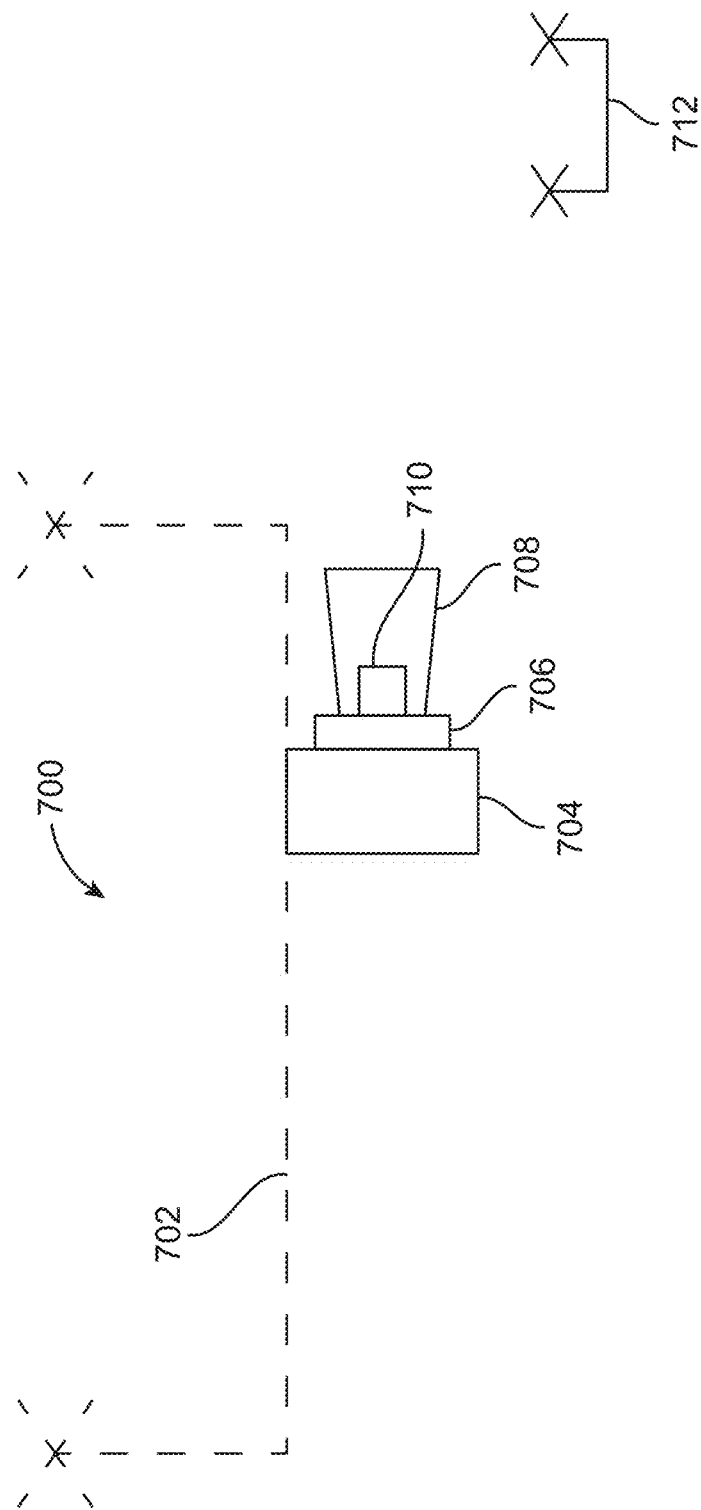
FIG. 7 illustrates the detachable nature of the projectile module.

The head cartridge 302 can also have a number of different configurations. The example shown in FIGS. 3A and 3B are generally rectangular in configuration with four channels, each containing a single weight. The net head cartridge 302 could also have a square shape, or a circular shape or a nonsymmetric shape. Typically, the number of weights will be 4. However, in other configurations, the number of weights could be one, two, three, five, or more. The number of weights could depend on a shape of the projectile or other factors. For example, a triangular-shaped projectile could have 3 weights, wherein each point of the triangle has a respective weight. The channel configuration (314, 340) can also vary in number depending on the number of weights needed for a particular projectile configuration. For a 3 weight system, the head cartridge 302 can have 3 channels, and so forth.

Where the configuration of the head cartridge 302 changes, corresponding changes could be made to the gun 304. For example, the component 344 could be adjusted so that there are only 3 openings 352 if the configuration of the head cartridge 302 only had channels for 3 weights. In another example, the component 344 may have a fixed number of openings through which gas can flow and the head cartridge 302 may provide variable openings depending on its configuration. In this scenario, for example, the gun 304 may have a component with 5 openings with a respective O-ring 352 at each opening. Different head cartridge 302 configurations could be attached such that in one scenario, the head cartridge may have 5 openings with 5 weights in which each opening in the head cartridge 302 has a corresponding opening in the component 344. Another head cartridge 302 may have 3 or 4 weights and thus 3 or 4 openings. Such a head cartridge could be configured to align the 3 or 4 weights in their respective channels with appropriate corresponding holes in the component 344. A closed portion of the head cartridge 344 could seal off the other openings in the component 344 that do not have corresponding channels in the head cartridge 344 to maintain the necessary gas pressure in the system to fire the projectile. FIG. 7 illustrates another example of a system 700 with a drone 702 having an attachment component 704 with an interface 706 between a projectile module 708 and a replaceable projectile container 710. In the example described herein, in which the projectile (net) has weights which are contained within barrels 606 as part of a projectile container, compressed air is used to fire the net. In one aspect, when the projectile 710 is fired, as disclosed herein, a string can be maintained at the drone 702 and the target drone can be captured by the net. In other words, a tether can be established such that rather than merely surrounding a target device with a net such that it falls from the sky, a capturing operation with a tether can be implemented. The drone 702 can then capture and carry a target drone down from the sky rather than having the target drone fall from the sky after it is covered by the net. The component 704 attached to the drone can also include mechanisms, such as a release mechanism so that the drone 702 could lower the captured drone down and release the tether at a safe elevation or the safe location. In this regard, a computer model that would be implemented to determine when to fire the net can take into account an identification of the target drone which can gather such features as its weight to determine whether the flying device 702 can capture and carry the target drone or not. In this regard, the computer model could also include a release mechanism in which it determines whether to capture the target drone and carry it to the ground via a tether or whether not to utilize the tether and simply fire the net at the target drone to take it out of the sky. Factors which can be taken into account include a weight of the target device, a perceived danger of the target device, whether the target device has a payload, and so forth. For example, if the target device is determined to have an explosive on board, the flying device 702 can, based on that determination, capture the target drone with the tether and carry it to a safe location for disposal or destruction. There can be a tether 343 for capturing the object (target drone) and a release mechanism 345 as well for releasing the captured object from the drone. The tether release mechanism 345 is shown at a particular location on the gun base 304 but can be located at any location in the overall system. The tether 343 can be connected to the projectile 342 at a first end and the tether release mechanism 345 at a second end. After capturing a target object, the system can retrieve the target object and use the tether release mechanism 345 to controllably drop the target object. For example, the drone can capture the target object using the projectile 342 and having the tether 343 attached to the projectile 342, can controllably lower down to the ground and at an appropriate height, can initiate the tether release mechanism 345 for dropping the target object on the ground. The tether release object can be electrically controlled through the signals provided physically 354/356 or wirelessly. The system could include the projectile module 302 having the tether 343 attached to the projectile 342 at the first end and a second end could be attached to an attachment component at the second end which is taped temporarily to the outside surface of the projectile module 302. The user then attaches the projectile module 302 to the gun base 304 and uses the attachment component connected to the second end of the tether 343 to attach the tether to a tether release mechanism 345 located somewhere on the system.

The control system 202 can also manage, via its programming, the release of the target device via release of the tether 343. The tether 343 can be held or released programmatically based on one or more of various criteria. For example, the control system 202 can include a tether management mechanism that can sense the force on the tether and thus the weight of the captured device. If the weight is to large or meets a criteria or threshold, the tether can be released. Furthermore, the control system 202 could have the ability to sense the angle of the tether towing a captured target device. Such knowledge could be useful for the control system 202 to determine to release the tether 343 if the tether cord comes dangerously close to interfering with the flying vehicle's propellers, which would likely cause a crash. Other factors can include a timing factor, an energy parameter associated with battery power and a priority criteria. Other factors can be considered as well, such as weather, data associated with a geolocation (coming over a stadium, or an event about to start), and so forth.

Component 704 and/or 706 can also represent an adjustment module which can be utilized with just an orientation of the projectile module 708. For example, a target device 712 might be positioned at a certain angle relative to the drone 702. Computer algorithms operating on the drone 702 might determine that a particular orientation of the drone 702 is not optimal or preferable for firing the projectile 710 at the target drone 712. However, it might be preferable, given when conditions or other conditions, not to adjust the entire orientation of the drone 702, but only to adjust the orientation of the projectile module 708. In this scenario, adjustment components can be built into features 704 and/or 706 such that a command module on the drone 702 can utilize the determination or output from the computer algorithms associated with the various conditions as described herein, and instruct the component 704/706 to reorient the projectile module 708 in a more favorable orientation for the deployment of the projectile 710. After the reorientation, the computer models can take into account the new direction at which the projectile would leave the projectile module 708 and then make new determinations regarding when to fire the projectile at the target device 712.

FIG. 8 illustrates an example of how the component shown in FIG. 7 might be implemented in more detail. FIG. 8 illustrates a system 800, which can include some components that can be attached to a flying vehicle represented by feature 704 and/or 706 in FIG. 7 and other components which can be configured in a detachable way represented by features 708 and/or 710. In FIG. 8, a tank 802 contains compressed nitrogen for use in deploying the net 820. The tank is attached to feature 804 which enables nitrogen to be provided to a compressed gas storage chamber 806. The system requires the gas to be compressed to a certain pressure in order to adequately deploy the net. In one example, a separate chamber 806 is shown to ensure that the compressed gas is readily available to be quickly discharged through the valve without unnecessary restrictions. In another scenario, only the tank 802 is used in the pressure in the tank can be controlled by the system.

Feature 808 represents a solenoid valve or other valve that is used to trigger the launch of the projectile. The valve 808 can be attached to the reservoir 806 on the intake side and exits through the barrels 816, 818 in the projectile container 826. A distribution manifold 812, 814 exists between the solenoid valve 808 and the projectile container 826 to split the expanding gas into multiple channels and directly to the net barrels 816, 818. The O-rings 828, 830 are shown on the weights contained within the barrels 816, 818. The O-rings seal all the connections between the parts and enable the projection of the net 820. The solenoid 808 can receive an electrical signal from an operating computer 826. The operating computer 826 is typically deployed on the flying vehicle 702 and has an electrical connection to the projectile module for enabling the transmission of the signals to fire. In general, the control system on the flying vehicle will perform the analysis utilizing the models described herein to determine, based on the various factors, the moment at which to fire the projectile.

It is preferable to use compressed nitrogen in a disposable cartridge that can be used to launch the net from the gun. Feature 306 represents an example of the disposable cartridge. Typically, each shot uses 1 cartridge. An aluminum reservoir 806 is represented that can have a puncture insert that can be used to attach the cartridge 802 to the projectile module and store an appropriate amount of gas at the right pressure to deploy the net. Ideally, the reservoir 806 might have or might be a cartridge itself. One incentive to use the reservoir 806 which can maintain the nitrogen at the appropriate pressure is the existence of nitrogen cartridges for purchase that can easily be used. Another reason to use a reservoir is because there is a small opening in the end of the cartridge that significantly reduces the flowrate of the gas entering the respective barrels or channels.

Figure 9:
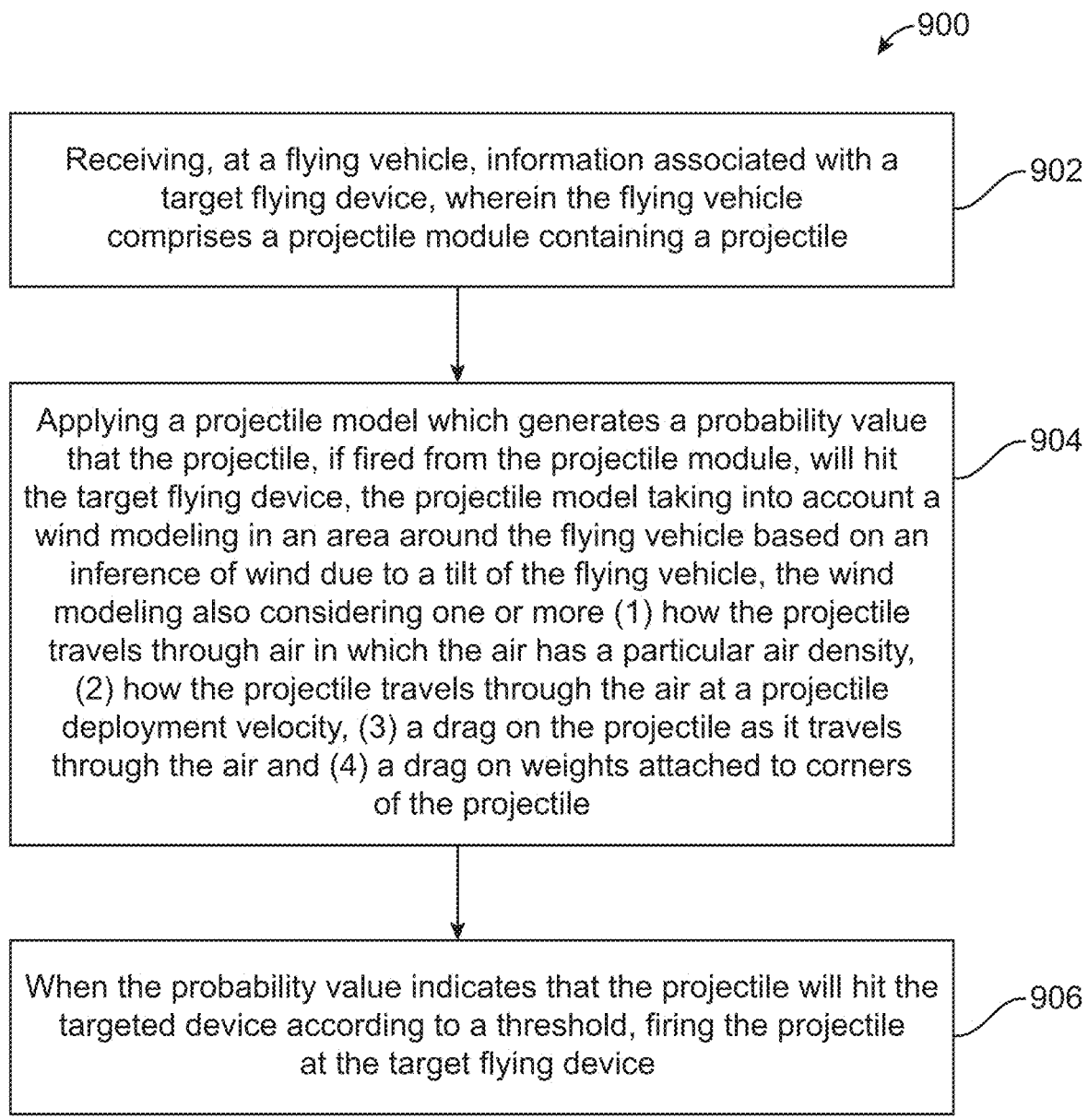
FIG. 9 illustrates a method embodiment.

This disclosure now turns to the method aspects and focuses on the computer models that have been developed to determine the timing associated with when to fire a projectile from a first flying device to a target device. FIG. 9 illustrates a method example 900. A method includes receiving, at a flying vehicle, information associated with a target flying device, wherein the flying vehicle comprises a projectile module containing a projectile (902), applying a projectile model which generates a probability value that the projectile, if fired from the projectile module, will hit the target flying device, the projectile model taking into account a wind modeling in an area around the flying vehicle based on an inference of wind due to a tilt of the flying vehicle, the wind modeling also considering one or more (1) how the projectile travels through air in which the air has a particular air density, (2) how the projectile travels through the air at a projectile deployment velocity, (3) a drag on the projectile as it travels through the air and (4) a drag on weights attached to corners of the projectile (904) and, when the probability value indicates that the projectile will hit the targeted device according to a threshold, firing the projectile at the target flying device (906).

The projectile can include one or more of a net, a streamer, a pellet, a bean bag, a weighted net having a weight attached to each corner, or an explosive, or various other devices. The projectile module can include one or more characteristics comprising: (1) being attached to the flying vehicle in a fixed position, (2) having a protective cover that is broken upon deploying the projectile, (3) containing two or more projectiles, and (4) having containers that store weights attached to the projectile. The projectile module may also include a tether component in which the projectile is fired, and a tether maintains a physical connection between the flying vehicle and the projectile. The projectile module can be attached to the flying vehicle and can include an adjustment component that enables the projectile module to change its orientation independent of a position of the flying. A control module can be configured on the flying device and have an electrical connection to the projectile module which adjusts an orientation of the projectile module. The projectile model can further consider one or more of a flying vehicle position, a flying vehicle pitch, a flying vehicle yaw, a flying vehicle velocity, a target flying device manufactured specification, a target flying device current position, a target flying device velocity, a geographically defined safe area, known flying capabilities of the target flying device and a wind velocity. The projectile model can also take into account a target flying device characteristic in terms of whether to deploy a projectile that is tethered to the flying vehicle or not. The flying device characteristic can include such features as a weight of the flying device, a payload associated with the flying device, a danger identified or associated with the target flying device, a geographic area over which the flying device currently is or where it may travel, and so forth.

For example, if the target flying device appears to be containing a payload which is identified as an explosive, and the target flying device is near a restricted geographic area, such as a stadium, the flying vehicle may deploy a projectile with a tether attached to the flying vehicle, such that the flying vehicle captures the target flying device and can carry it to a safe location. This is of course desirable to avoid the target flying device from simply being surrounded by, and fall from the sky over a populated area, such as a stadium. The flying vehicle can include components which will be controllable by a control system to either attach a tether to the projectile or detach a tether to the projectile prior to firing the projectile at the target flying device.

In one aspect, the model can take into account assumptions as well. For example, the computer model may assume that for one half of a second, the target device will fly in a straight line from its last known position and velocity. This assumption can be adjusted based on identification of the target device type, a determination of whether the target device is a danger and potentially likely to take evasive maneuvers, and so forth. In one example, the modeling of the predicted path can take into account the position, velocity and direction, and assumes that same direction for a small period of time. Of course, that time can vary from a fraction of a second to one or more seconds.

The projectile module can further consider one, two or more of the flying vehicle position, the flying vehicle pitch, the flying vehicle yaw, the flying vehicle velocity, the target flying device manufactured specification, the target flying device current position, the target flying device velocity, the geographically defined safe area, the known flying capabilities of the target flying device and the wind velocity.

Applying the projectile model can be performed based on an orientation of the flying vehicle. For example, the computing device or control system on the flying vehicle can determine, based on an orientation of the flying vehicle, what the wind speed is. For the flying vehicle to maintain a stable position in a wind, it must tilt into the wind in order to take into account the wind. The models disclosed herein can utilize the information about the wind speed inferred from the tilt of the flying vehicle in its evaluation of the flight path of the projectile and the location of the target device. Utilizing the wind speed that is determined from the tilt of the flying vehicle can improve the accuracy of the timing of when to fire the projectile and achieve a successful engagement of the project with the target device.

The method can further include applying the projectile model to generate a new orientation of the flying vehicle. Adjusting the orientation of the flying vehicle to the new orientation of the flying vehicle can occur before firing the projectile from the projectile module. The flying vehicle can further reapply the projectile model after adjusting the orientation of the flying vehicle. In another aspect, the orientation of the flying vehicle may remain the same, but an adjustment module can be configured to enable only a reorientation of the projectile module direction. Thus, if the flying vehicle is in a wind, for example, and is advantageous to the flying vehicle to maintain its orientation given the wind speed, the system can only adjust the orientation of the projectile module while maintaining the overall orientation of the flying vehicle and then fire the projectile. A gimbal can be configured between the flying vehicle and the projectile module.

Figure 10:
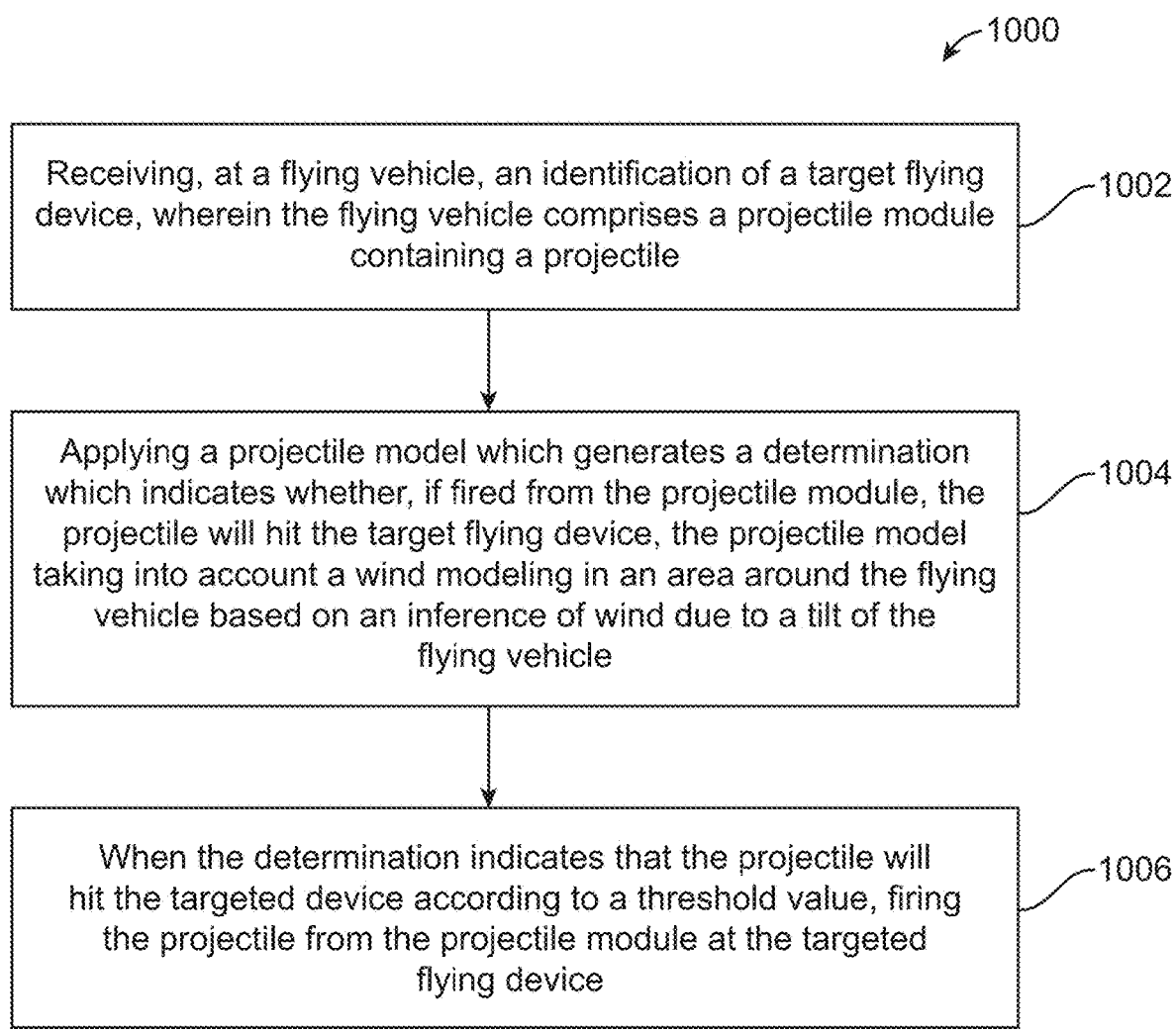
FIG. 10 illustrates another method embodiment.

FIG. 10 illustrates another example method embodiment 1000. A method in this regard includes receiving, at a flying vehicle, an identification of a target flying device, wherein the flying vehicle includes a projectile module containing a projectile (1002), applying a projectile model which generates a determination which indicates whether, if fired from the projectile module, the projectile will hit the target flying device. The projectile model can take into account a wind modeling in an area around the flying vehicle based on an inference of wind due to a tilt of the flying vehicle (1004).

When the determination indicates that the projectile will hit the targeted device according to a threshold value, the method includes firing the projectile from the projectile module at the targeted flying device (1006). The modeling can also include a combination of modeling of the projectile as well as a predictive algorithm regarding whether the projectile will interact with the target device.

The flying vehicle may have a first orientation. In this case, the method can further include, when the determination does not meet the threshold value at the first orientation, identifying a new orientation of the flying vehicle or a new orientation of only the projectile module attached to the flying vehicle at which the determination would meet the threshold value. The method can include reorienting the flying vehicle and/or the projectile module at the new orientation and firing the projectile from the projectile module on the flying vehicle at the new orientation. The method can include rerunning the projectile model at the new orientation to yield a new determination and when the new determination indicates that the projectile will hit the target flying vehicle within a second threshold value, firing the projectile from the projectile module. In this scenario, the threshold value can be one of the same as or different from the second threshold value.

The projectile model can take into account one or more of (1) how the projectile travels through air in which the air has a particular air density, (2) how the projectile travels through the air at a projectile deployment velocity and (3) a drag on the projectile as it travels through the air to yield the determination. It is noted that the drag on the projectile as it travels through the air can include an evaluation of both the material, size of material, and configuration of a net, for example, as well as the size and position of the weights attached to the net as described herein. The projectile can include one or more of a net or a weighted net having a respective weight attached to each corner of the net or in various locations on the net if the net is circular. The projectile model can include a model of drag associated with a net deployment expansion as well as relative to wind. The projectile model can also take into account one or more of a projected path of the target flying vehicle and known navigation capabilities of the target flying vehicle. The projectile model can also apply net model parameters including how fast the projectile exits the projectile module upon firing, an air density, and an amount of drag on the projectile.

In another aspect, a flying vehicle may be equipped with a system that includes several projectiles of different types or of different sizes. For example, the projectile module can include a packet of pellets, taser electrodes, and/or a net. The computer model which evaluates the various factors disclosed herein can yield a determination regarding which type of projectile to project or which size of projectile to project. For example, two different net sizes and configurations can be deployed on a flying vehicle. The system may run one model or two or more independent models which take into account the different net characteristics, and thus the differences in how the two nets will deploy and expand, and travel through the air. Having different net configurations would yield different probabilities of whether each independent net would capture the target device. The computer models to take into account a potential danger associated with the target device and make a determination regarding which projectile to project first. For example, the system may determine to deploy the net having a larger diameter which will have a greater probability of capturing the target device. Other considerations such as the geographic location may be taken into account. For example, if the target device is a danger, and yet not over a populated area, the system may determine that rather than deploying the net, that a series of pellets or streamers would be projected to interrupt the propeller system of the target device and cause it to fall.

Again, the system may determine information about the type or indication of the target device and include in the algorithm data regarding a geographic area that is to be defended. The algorithm can take into account these various factors and make a triggering decision not only on the timing of when to trigger a projectile at the target device, but also optionally a type of projectile or a size of projectile to project. An algorithm can be implemented as part of the modeling to determine the physical navigational and speed capabilities of the target device, whether it is a bad actor, and whether it is likely to be directed to an area or geographic space to be defended.

In one aspect, where multiple projectiles are configured on the flying vehicle, a spare projectile can be included as a backup. In one scenario, the computer model will include in its evaluation the fact that a primary projectile and a backup projectile are available on the device. The thresholds that can be established for determining when to fire a projectile can therefore be taken into account, and adjusted based on the fact that a backup projectile exists. For example, if only a single projectile is available on the device, the system may have a higher threshold or require a higher probability of successful engagement prior to triggering the firing of the projectile. However, if a backup projectile exists, then a lower threshold of probability of success can be established before firing the first projectile. Adjustments can be made for the different capabilities of a primary projectile and a secondary projectile with respect to their respective models for triggering their deployment.

In one aspect, the projectile module includes two projectiles, like two nets. The system can implement different thresholds for different projectiles having different sizes or other characteristics. The system may select which projectile to shoot. For example, one projectile may have a bigger profile or smaller profile, based on all the factors. In one case, a drone may have an identification that enables the system to know its capabilities for navigation. That knowledge can indicate that to take down the drone will require a larger sized net to capture in case it moves or tries to evade. The system can also run two models each for a different projectile. One projectile can be pellets and the other can be a net and the model(s) determines which type of projectile to deploy and when.

Figure 11:
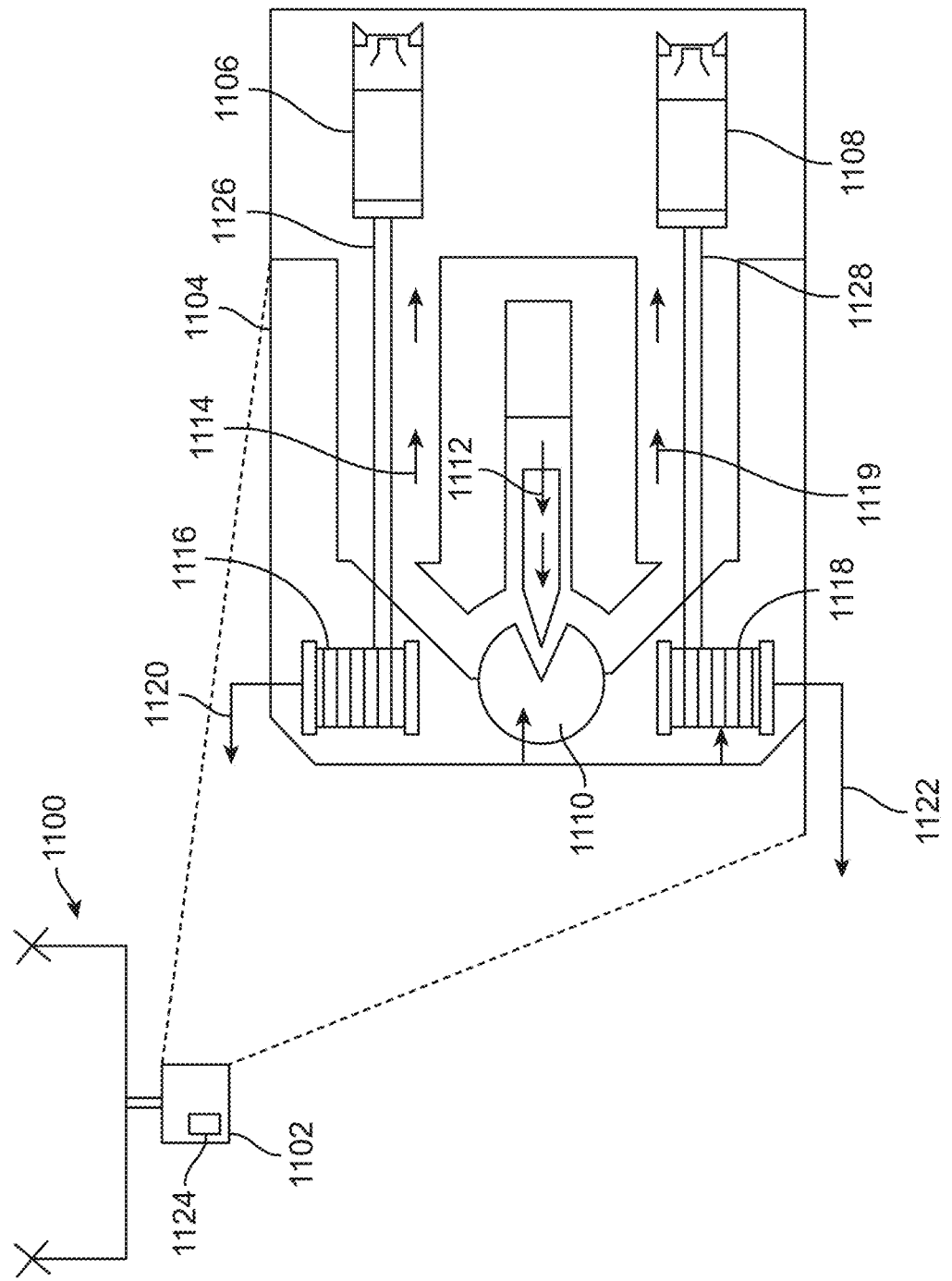
FIG. 11 illustrates a taser embodiment.

FIG. 11 illustrates a taser embodiment 1100. In this aspect, a system 1100 includes a flying object, such as a drone having an attached component 1102, which includes taser components for shooting projectiles at a target device. In this scenario, the weights 1106, 1108 are attached to conducting wires 1126, 1128. Spools 1116, 1118 are used to unwind or deploy the wires in a manner that they will deploy cleanly. The connecting wires are attached. 1120, 1122 to an electrical circuit 1124. When the system indicates or triggers the taser, a compressed gas cartridge 1110 can be broken or open 1112 such that the expanding gas can build pressure behind the weights 1106, 1108 launching them through the air. The weights 1106, 108 can be fixed with small barbs so that they can grab onto the target device. The weights in this scenario, act as electrodes attached to the target device. With the electrodes 1106, 10108 attached to the target device, the current travels from the circuit 1124 down the wires 1126, 1128 into the target object stunning or disabling it.

Just as the head cartridge 302 as described above, a replaceable taser cartridge could also be provided as well. A configuration could also include a net head cartridge 302, as well as a taser cartridge 1102 in the same overall system. The system could then include a determination algorithm regarding whether to fire and net or to fire a taser at a target object.

Figure 12:
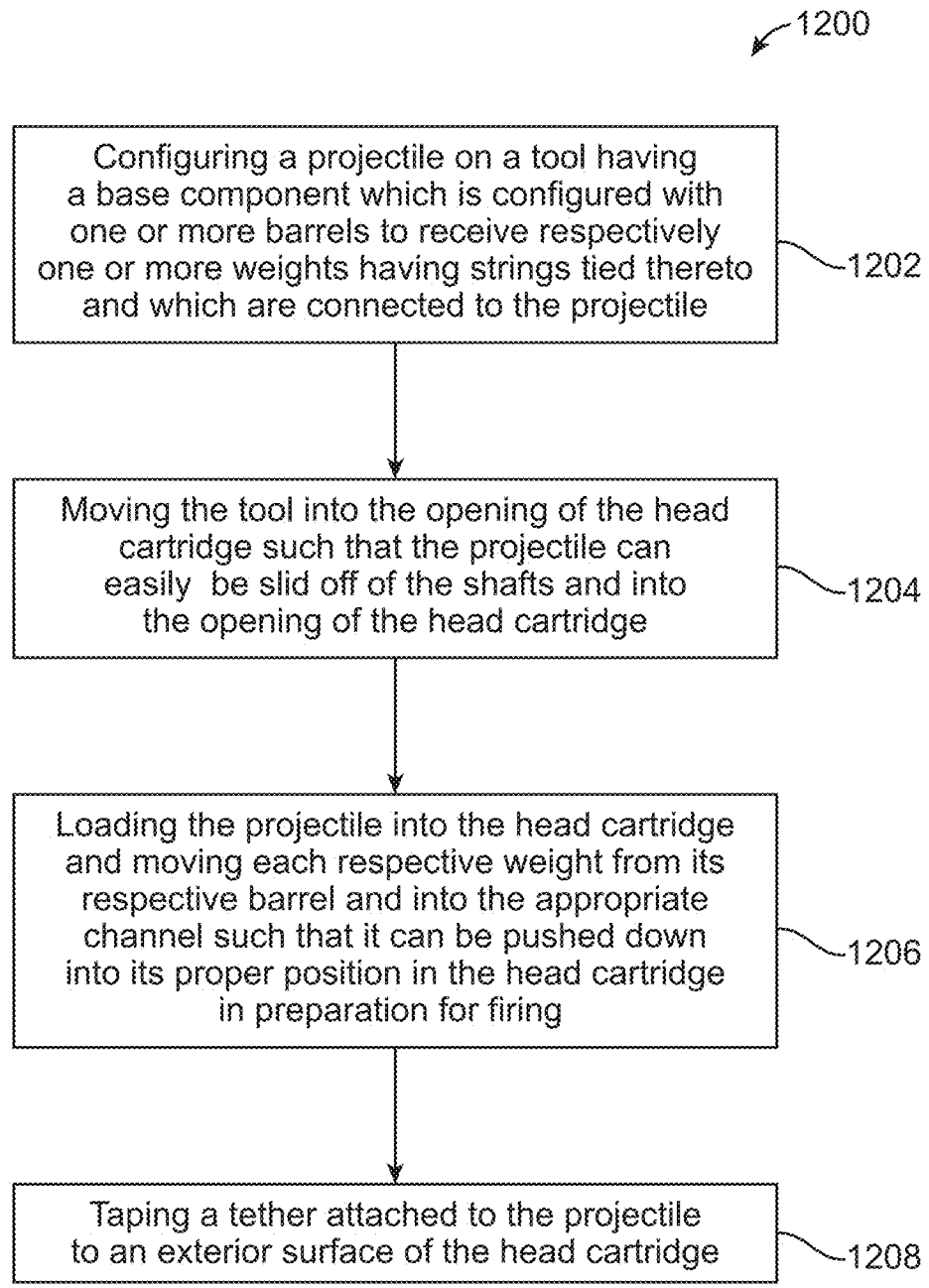
FIG. 12 illustrates another method embodiment.

FIG. 12 illustrates a method embodiment 1200 related to packing the head cartridge 302 with the projectile 342 using the tool or jig 600 shown in FIG. 6. The purpose of the tool 600 is to simplify the process of loading the projectile 608/342 into the head cartridge 302. The projectile 608/342, when it is a net, can easily become entangled and difficult to properly configure within the head cartridge 302. The tool 600 enables the user to easily prepare a configuration of the projectile 608/342 for inserting into the head cartridge 302. The method is as follows. A user configures a projectile 608 on a tool having a base component 602 which is configured with one or more barrels 606 arranged to receive respectively one or more weights having strings tied thereto and which are connected to the projectile 608 (1202). The barrels are like cups or openings that are configured to receive the respective weights for holding in a proper position while the user can configure the projectile on one or more shafts 610, 612. With the projectile 608 prepared on the tool 600, the user can then bring the tool 600 into or near the opening 312 of the head cartridge 302 such that the projectile 608 can easily be slid off of the shafts 610, 612 and into the opening of the head cartridge 302 (1204). This process maintains the organized configuration of the projectile 608 as it is loaded into the head cartridge 302. The user can then easily move each respective weight 604 from its respective barrel 606 and into the appropriate channel 314, 340 such that it can be pushed down into its proper position 366, 368 in preparation for firing (1206). Where a tether 343 is attached to the projectile 608, the tether can be prepared utilizing the shafts 610, 612. An end of the tether can have an attachment component tied to it such that it can be taped to an exterior surface of the head cartridge 302 (1208) or at some other location. The method can include any one or more of the steps outlined in FIG. 12. For example, step 1208 is optional in that some projectiles 608 will not have a tether attached thereto and thus that step is optional.

The tool 600 can be used to organize the projectile 608 as well as a tether 343 together. In other words, the projectile 608 configured in an organized fashion on the shafts 610, 612 can also include the tether 343 also configured or organized in connection with the shafts 610, 612 such that the entire package of the projectile and the tether can be easily slid into the opening of the head cartridge 302 in preparation for firing.

In some scenarios, a challenge can exist with respect to the shape of a target device in that a net that is deployed as a projectile out to capture the target device might slip off or not fully wrap around the target device. Some target devices might include propellers like a drone but others might be configured as a wing with a small propeller used to propel the device through the air. Depending on the configuration of the target device, some deployed nets might have more difficulty than others in wrapping around and securely capturing the device. The following figures and discussion introduces various new net configurations which include cockleburs in various places in a net configuration. A cocklebur as disclosed herein is a component that has prickly or Velcro-like extensions or projections which can be entangled with the net as the net engages with a target device. A cocklebur can be, for example, a square or rectangular structure with projections on each side. As shall be shown in the figures and discussion below, a respective cocklebur can be configured in various places such that they can improve the probability of a net engaging with a target device so that the target device can be captured.

Cocklebur Embodiments

As noted above, one issue when deploying a net as a projectile to capture a target drone is that some drone configurations cause or allow the net to easily slide off the drone and thus not complete the capture. In order to ensure that the target drone is captured by the net, several innovations are introduced. The first is the use of cockleburs in connection with the net to ensure that the net does not slip off the target drone. The cocklebur embodiments are introduced next section, followed by drawstring embodiments.

FIGS. 13A-D illustrate a net configuration with cockleburs 1300 to capture a target device 1322. Generally, the cockleburs 1310, 1312, 1314, 1316 are configured to become entangled with the net as the net envelopes the target device 1322. Each cocklebur 1310, 1312, 1314, 1316 has spiked projections, Velcro-like projections, or other projections that are configured, when they engage with the strings of a net 1324, to become entangled in the net 1324. The particular projections can vary but generally, the concept is that the cockleburs 1310, 1312, 1314, 1316 have a structure that causes them to hook the net strings to become entangled with the net and thus ensure that the net will remain covered over a target device rather than slipping off.

As shown in the figures, the net 1324 includes a number of additional components in this configuration. The net 1324 includes one or more of a first weight 1302, a second weight 1304, a third weight 1306, and a fourth weight 1308. The target device 1322 such as a target drone is shown as well. The net 1324 is deployed from a flying vehicle 1320 and includes a tether 1318 attached to the net 1324. Each weight 1302, 1304, 1306, 1308 is attached to a respective corner of the net 1324 via a respective connecting string. As shown, a respective connecting string is configured between each respective weight and a respective corner of the net 1324. One or more respective cockleburs can be attached to each respective connecting string. Other embodiments below show the cockleburs attached in different ways to the net as well.

Figure 13A:
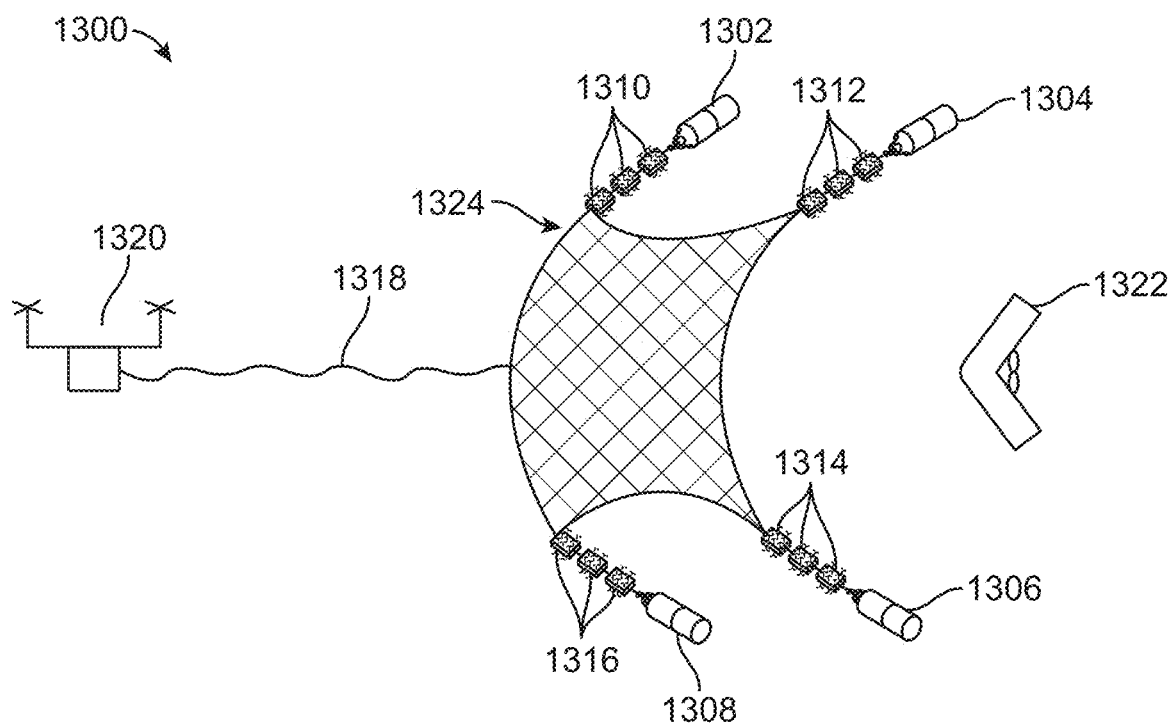
FIGS. 13A-D illustrate a net configuration with cockleburs to capture a target device.

As shown, a set of three cockleburs 1310 is attached to the string connecting the first weight 1302 to the net 1324. Another set of cockleburs 1312 is attached to the string connecting the second weight 1304 to the net 1324. Another set of cockleburs 1314 is attached to the string connecting the third weight 1306 to the net 1324. Another set of cockleburs 1316 is attached to the string connecting the fourth weight 1308 to the net 1324. The number of weights, and the position of where the weights are connected to the net 1324 can vary. The weights are shown as connected to corners of the net for convenience but the concept is broader than this example embodiment. The cockelburs can be connected at any location of the net and it is not limited to the corners. Any position along the edges of the net can be used to have a connecting string with cockleburs configured thereon. The cockleburs could be even connected to the net directly at various desired locations. A tether 1318 can be used to connect the net 1324 to the flying vehicle 1320. FIG. 13A illustrates the state of the deployment of the net 1324 early on in the process in which the net 1324 is opened and flying through the air and not yet engaged with the target device 1322.

There are other ways also to connect the tether to the net. For example, one way is a "Y" formation with the tether attached to the two bottom bullets directly and not the net. This approach can provide a stronger attachment and a bit of redundancy in case one leg of the Y part of the tether is cut by a propeller of the target device. In this case, the target drone will still be captured.

Figure 13B:
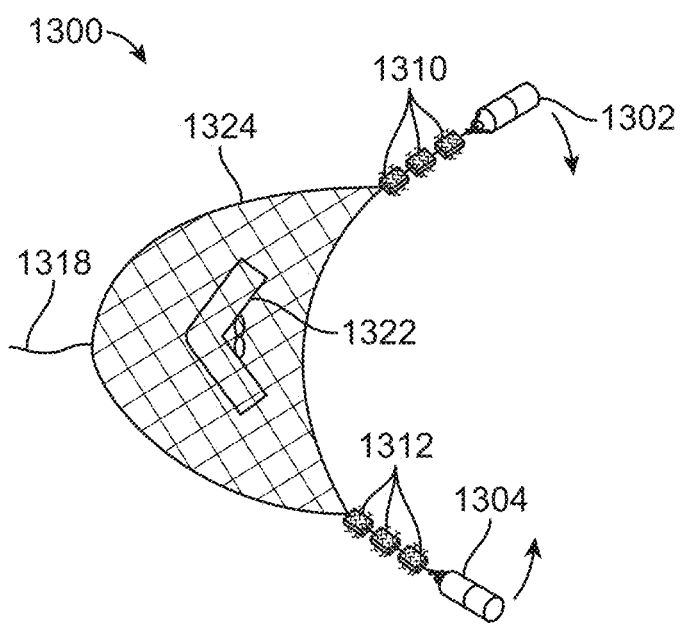

FIG. 13B illustrates the state in which the net 1324 is initially engaging with the target device 1322. At this stage, the four weights, represented as the first weight 1302 and the second weight 1304, are continuing to move in their current direction as the net begins to impact or interact with the target device 1322. As shown, the net is starting to close in on the target device 1322, but absent the cockleburs 1310, 1312, the net 1324 could slip off the target device 1322. As the net 1324 engages with the device, and weights 1302, 1304 start to move in the direction shown in FIG. 13B, the cockleburs 1310, 1312 will move into a position to become entangled with the net 1324.

Figure 13C:
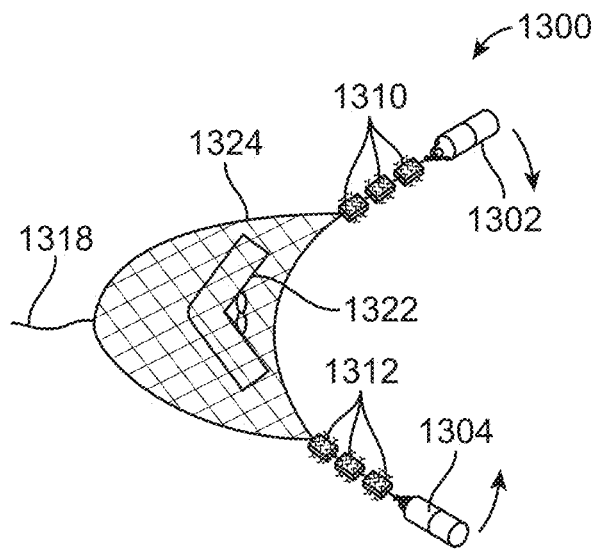
Figure 13D:
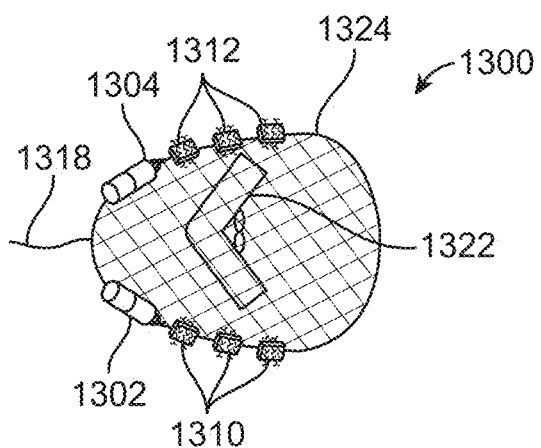

FIG. 13C illustrates another state in which generally, the target drone hits the back of the net causing the weights to swing around this new instantaneous axis of rotation, thus wrapping up the target drone and allowing the weights and cockleburs to finally swing right up against the net and hook it. Specifically, the first weight 1302 and the second weight 1304 (representing all the weights) begin, as the target drone hits the back of the net, to turn more inward and thereby to wrap around the target device 1322. At this stage, the cockleburs 1310, 1312 have not yet engaged with the net 1324 or become entangled with the net 1324. FIG. 13D illustrates the state in which the target device 1322 is wrapped up in the net, the cockleburs 1312, 1310 have become entangled with the net 1324, and the target device 1322 can be carried away using the tether 1318 by the flying vehicle 1320. As can be appreciated, the shown cockleburs 1310 and 1312, as the net is wrapped around the target device 1322, get entangled with the net 1324 and aid in ensuring that the net 1324 does not slip from the target device 1322. FIGS. 13A-13D illustrate the basic cocklebur concept as an example with the possibility of many variations on how to store the cockleburs, deploy them, arrange them on the net 1324, and so forth.

Figure 14:
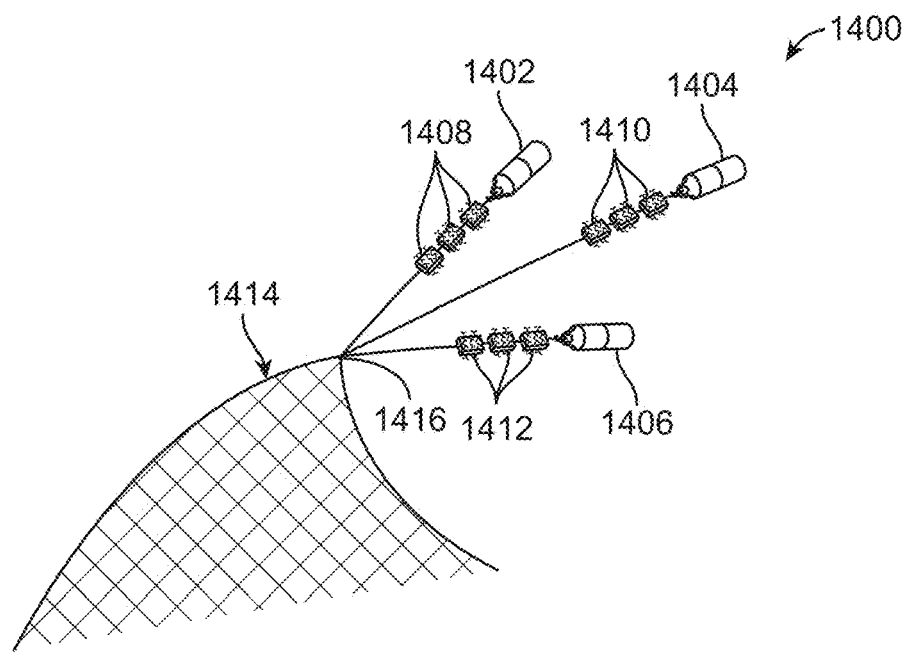
FIG. 14 illustrates a different configuration of a net with cockleburs.

FIG. 14 illustrates a different configuration 1400 of a net 1414 with cockleburs 1408, 1420, 1412 attached to various connecting strings to respective weights 1402, 1404, 1406. In FIG. 14, the configuration 1400 includes the net 1414, a first weight 1402, a second weight 1404 and third weight 1406. A corner 1416 of the next 1414 is shown by way of example. In this configuration, three different connecting strings are attached to the corner of the net 1416. Between the weight 1402 is a set of cockleburs 1408 attached to a connecting string between the weight 1402 and the corner of the net 1416. Between the weight 1404 is another set of cockleburs 1410 attached to the connecting string. Between the weight 1406 is a set of cockleburs 1412 attached to the connecting string. Each set of cockleburs can include one, two, three or more individual cockleburs. The cockleburs can be stapled to the respective connecting string or attached in some other fashion. Note that one corner 1416 of the net 1414 is shown. This feature of multiple weights being connected via a respective connecting string to a corner of the net 1416 can be replicated at other corners of the net (not shown) or at other locations of the net 1414.

Note as well that the net is generally shown as being square or rectangular such that there are corners to the net. However, there is no limitation or requirement that the net be in this configuration. The net could be round, elliptical, triangular, random, asymmetrical, or any other shape and connecting strings can be connected at any location on the net and include or have attached to each respective connecting string one or more cockleburs.

Figure 15:
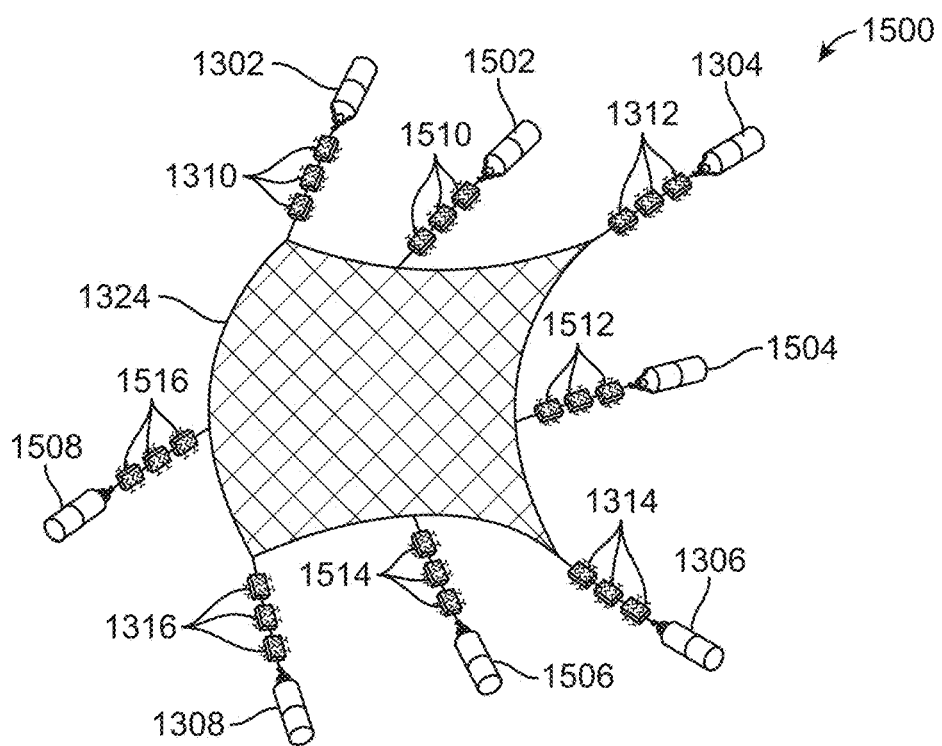
FIG. 15 illustrates a different configuration of a net with cockleburs.

FIG. 15 illustrates a different configuration 1500 of a net with cockleburs. In this figure, the first weight 1302 is connected to the net 1324 via a connecting string that has a set of cockleburs 1310. The second weight 1304 is connected to the net via a connecting string having another set of cockleburs 1312. The third weight 1306 is connected to the net via a connecting string having a set of cockleburs 1314. The fourth weight 1308 is connected to the net via a connecting string having a set of cockleburs 1316. In this example, additional strings and weights are added to the side portions of the net as well. For example, a fifth weight 1502 is connected to a first side of the net via a connecting string having a set of cockleburs 1510. A sixth weight 1504 is attached via a connecting string to a second side of the net and a set of cockleburs 1512 are attached to this connecting string. A seventh weight 1506 is attached via a connecting string to a third side of the net 1324. A set of cockleburs 1514 is attached to this connecting string. An eighth weight 1508 is attached via a string to a fourth side of the net 1324 and a set of cockleburs 1516 is attached to this connecting string. FIG. 15 provides an example of how additional strings, weights, and sets of cockleburs can be added to the net. This embodiment is not limited to the specific configuration shown as the shape of the net, the number of the weights, the number of associated connecting strings that attach each respective weight to the net, and the number of cockleburs configured on each respective string can vary.

Figure 16A:
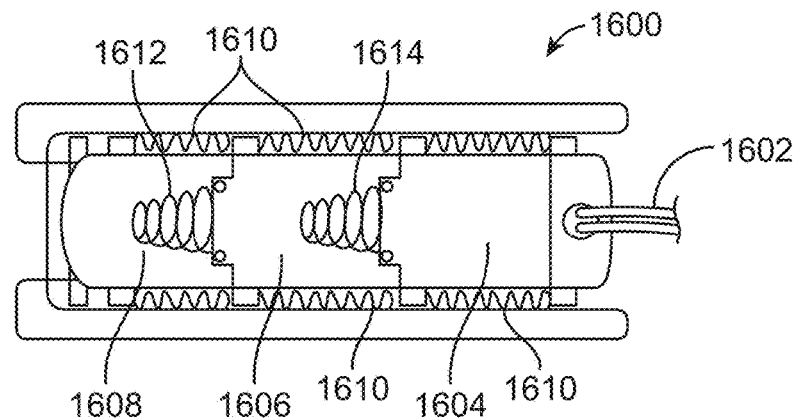
FIG. 16A illustrates a cocklebur arrangement in a receiving cavity of a projectile module.

FIG. 16A illustrates a cocklebur arrangement in a receiving cavity of a projectile module. In this example, a receiving cavity 1600 can be configured as part of a projectile module that is removably attached to a flying vehicle or another structure. For example, the receiving cavity 1600 can correspond to cavities 340, 314 shown in FIG. 3A that store the weights prior to deployment. Generally, a weight is configured inside of the receiving cavity 1600 that is attached to a net via a string 1602. One challenge with using cockleburs in these various examples is that they can become entangled with the net upon deployment, which is undesirable. The cocklebur should become entangled with the net as the net engages with a target device and not before. Premature entanglement will impact the trajectory of the net as it flies through the air towards the target device. The use of the cockleburs is meant to become entangled with the net as it envelops a target device rather than at an earlier stage of deployment. FIG. 16A illustrates the packing of three components 1604, 1606, 1608 within the receiving cavity 1600 in a manner that can help to prevent premature entanglement.

The components 1604, 1606, 1608 can include, for example, a weight 1608 and two cockleburs 1604, 1606. The feature 1610 represents the actual cockleburs on the respective component. While the weight 1608 is shown as having cockleburs 1610 attached thereto, the weight 1608 may or may not have cockleburs attached. In this scenario, these components can be stacked in the receiving cavity 1600 such that upon deployment of the net, the weight 1608 can be pushed out of the receiving cavity 1600 and carry with it the cockleburs 1604, 1606, which are attached to a string 1602. The string 1602 is also attached to the net (not shown). In this manner, the net is pulled out of the projectile module upon deployment. A first string 1614 can connect a first cocklebur 1604 to a second cocklebur 1606, and the second string 1612 can connect the second cocklebur 1606 to the weight 1608. The components 1604, 1606, 1608 can also each represent one of a cocklebur or a weight and these components are interchangeable such that upon deployment, either a weight or a cocklebur can be in front as the net is deployed. Typically, however, upon deployment, the weights will be out in front ahead of cockleburs as shown in FIGS. 13A, 13B.

Figure 16B:
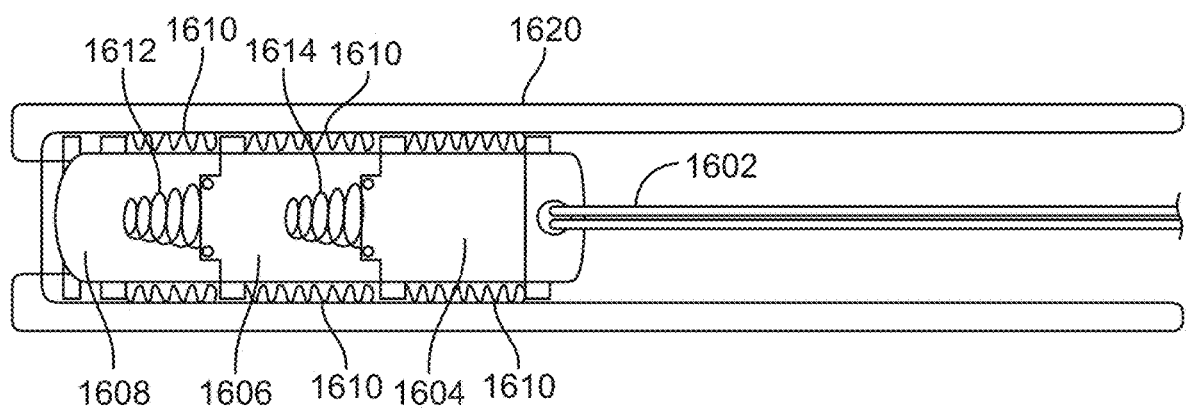
FIG. 16B illustrates an extended barrel of the receiving cavity of the projectile module.

FIG. 16B illustrates an extended barrel 1620 of the receiving cavity of the projectile module. In this case, the system can provide extra velocity and better aim if the barrel 1620 is extended beyond the length shown in FIG. 16A. The configuration of the components 1604, 1606, 1608 are similar to those discussed above for FIG. 16B.

FIGS. 17A-17C illustrate a weight 1700 having a cocklebur 1704 configured thereon. In one example embodiment, the cocklebur 1704 itself might be added to or built into the weight 1700. FIG. 17A illustrates the weight 1700 connected to a string 1708 via a connecting portion 1706. The weight 1700 includes a head portion 1702 which can include an o-ring 1703 which can be used to insure a tight fit and a pneumatic seal within a receiving cavity (as shown in FIG. 3A). A foot portion 1705 can also be provided having a similar diameter to the head portion 1702 and which can be used to stabilize the weight 1700 in the receiving cavity and upon deployment. The weight 1700 can include a flat portion 1710 in a middle region which can have configured thereon the cocklebur 1704. As shown in FIG. 17A, the middle region can include two sides each having a set of cockleburs 1704 thereon. The benefit of this approach is that the weight itself can include the cocklebur structure which is used to entangle the net upon interaction with a target device. In this scenario, there may not need to be a separate cocklebur structure attached to a connecting string that connects the weight 1700 to a net (not shown).

FIG. 17B illustrates another view of the weight and cocklebur combination 1700. Notably, the middle structure of the weight is not cylindrical as in other embodiments but has a narrower flat portion 1710 such that the cocklebur 1704 can be added thereto and still be configured within the receiving cavity for deployment. FIG. 17C illustrates a side view of the weight and cocklebur combination 1700 with the cocklebur projections 1704 configured on the flat portion 1710 of the that are used to entangle the net as the net closes around a target device. The o-ring 1703 is shown as well. The structure of the weight and cocklebur combination 1700 can vary as well. For example, the surface 1710 may not be flat but be cylindrical in shape with a smaller diameter than a diameter, for example, of the head portion 1702. The surface 1710 may also represent a central region having the cockleburs 1704 configured thereon that has a cross section of a pentagon, or elliptical, or some other cross-sectional shape.

Figure 18:
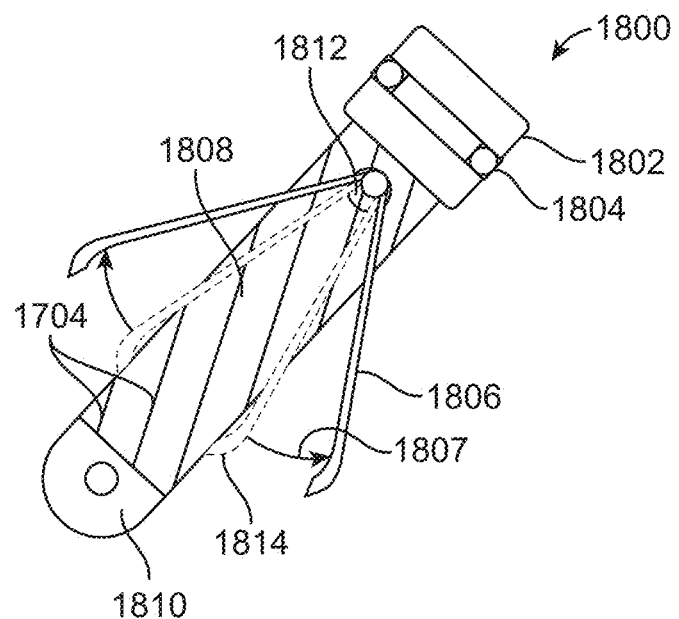
FIG. 18 illustrates a weight having a cocklebur thereon with a grappling hook.

The weight and cocklebur configuration 1700 can also vary in other ways. FIG. 18 illustrates a weight 1800 having a cocklebur 1704 configured on a flat portion 1808 of the weight 1800 and including a grappling hook 1806. An o-ring 1804 is shown as well. The grappling hook 1806 is connected to a spring 1812 which can cause the grappling hook 1806 to spring or spread out from the receiving cavity (such as the cavities 314, 340 in FIG. 3A) upon being launched. In the stowed state 1805, the grappling hook 1806 is closed down. Upon deployment, the grappling hook 1806 extends 1807 to a deployed state or position. The cocklebur material 1704 is shown as being configured adjacent to the grappling hook 1806. A connecting portion 1810 can have a string tied thereto.

Figure 19:
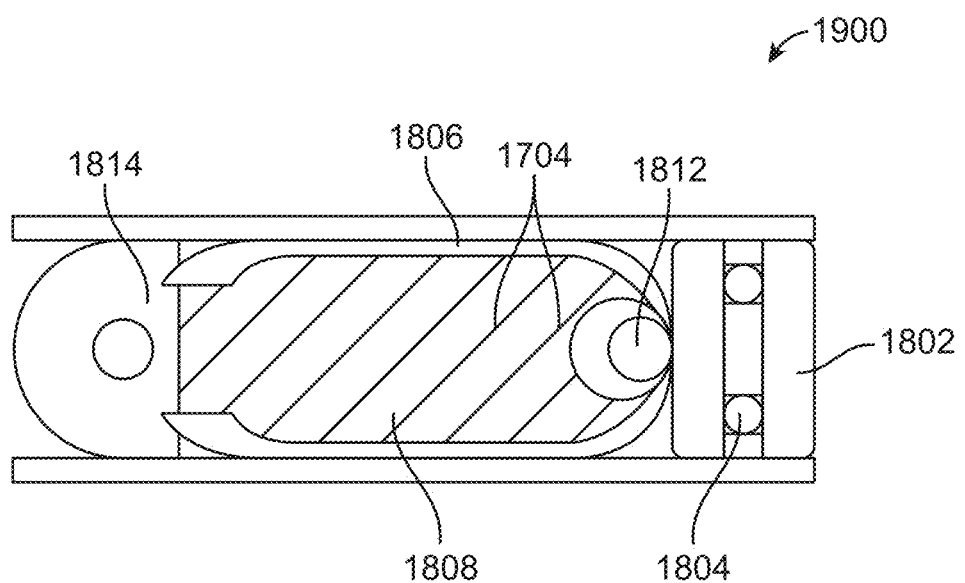
FIG. 19 illustrates the weight having the cocklebur thereon with the grappling hook in a stowed configuration.

FIG. 19 illustrates the weight 1900 having the cocklebur 1704 thereon with the grappling hook 1806 in a stowed configuration. The o-ring 1804 is shown as part of a head portion 1802 and a connecting portion 1810 is shown as well. The state of the weight 1900 is prior to deployment such that the grappling hook 1806 is in a compact state and not extended.

In other configurations, the grappling hook can include more than two legs and can further include three or four total legs. More legs can be included as well beyond four. The spring 1812 can be configured in various ways to force one or more grappling hook legs to extend as the weight 1800/1900 containing the grappling hook legs exits a receiving cavity of the projectile module. In this regard, the grappling hook 1806 can be referred to as an articulating grappling hook 1806.

Figure 20:
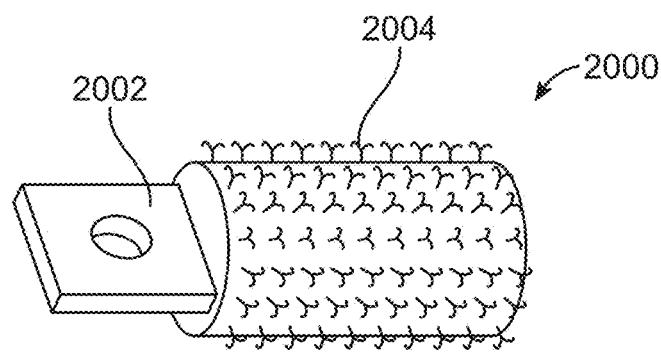
FIG. 20 illustrates another weight with a cocklebur configured thereon.

FIG. 20 illustrates another weight 2000 with a cocklebur 2004 configured thereon. In this example, the weight 2000 remains essentially cylindrical in shape and the cocklebur 2004 can be essentially wrapped around the cylindrically-shaped weight 2000. A connecting portion 2002 is shown for connecting a string to a net. The weight 2000 represents an alternative shape relative to previous examples given. The weight 2000 is cylindrical but represents all alternative shapes such as a box-shape, a random shape, a volume with a cross sectional area being a pentagon, hexagon, octagon, ellipse, etc.

Figure 21A:
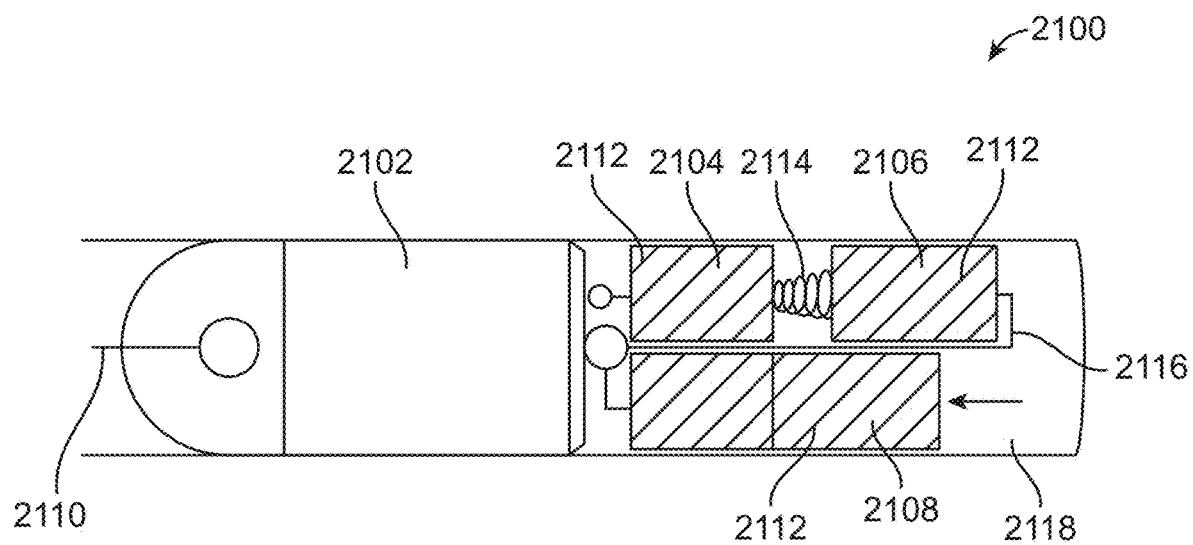
FIGS. 21A-21B illustrate another configuration of weights in a receiving cavity of the projectile module.
Figure 21B:
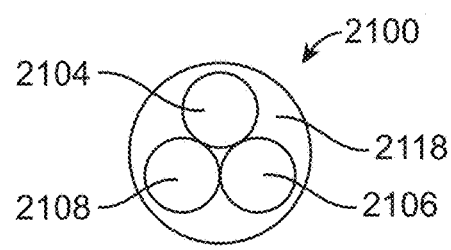

FIGS. 21A-21B illustrate another configuration of weights in a receiving cavity 2118 of the projectile module. For example, in FIG. 21A, a configuration 2100 is shown with a weight 2102 and a number of cockleburs 2104, 2106, 2108. In this configuration, a string 2110 attaches the weight 2102 to a net (not shown). In this example, the cocklebur arrangement is such that multiple cockleburs structures 2104, 2106, 2108 can be configured side-by-side in a receiving cavity rather than stacked one on top of another. Each respective structure can have cockleburs 2112 attached thereto. Strings 2114, 2116 can connect the cocklebur structures 2104, 206, 2108 together. Generally, the weight 2102 and the cockleburs 2104, 2106, 2108 are connected via a string to each other and to the net.

FIG. 21B illustrates cocklebur structures 2104, 2106, 2108 configured side-by-side in a receiving cavity 2118 of the projectile module. These figures illustrate the various ways in which one or more cockleburs can be configured or stowed in a receiving cavity in preparation for deployment from a projectile module.

Figure 22A:
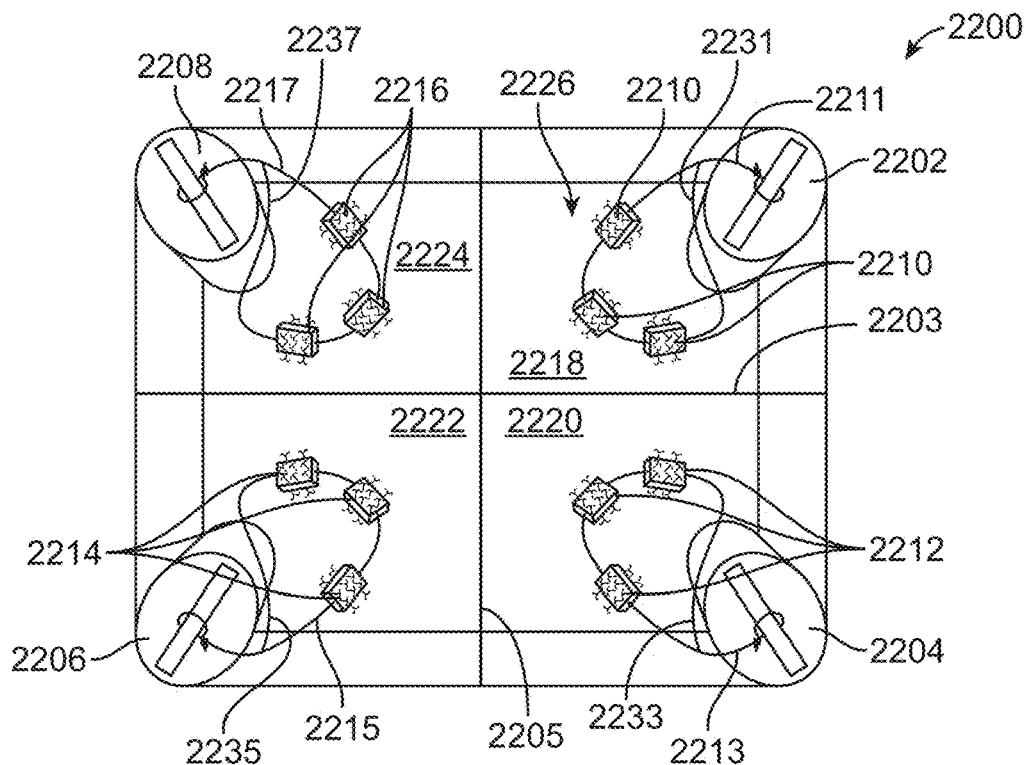
FIGS. 22A-22B illustrate another configuration of weights, cockleburs and the projectile module.
Figure 22B:
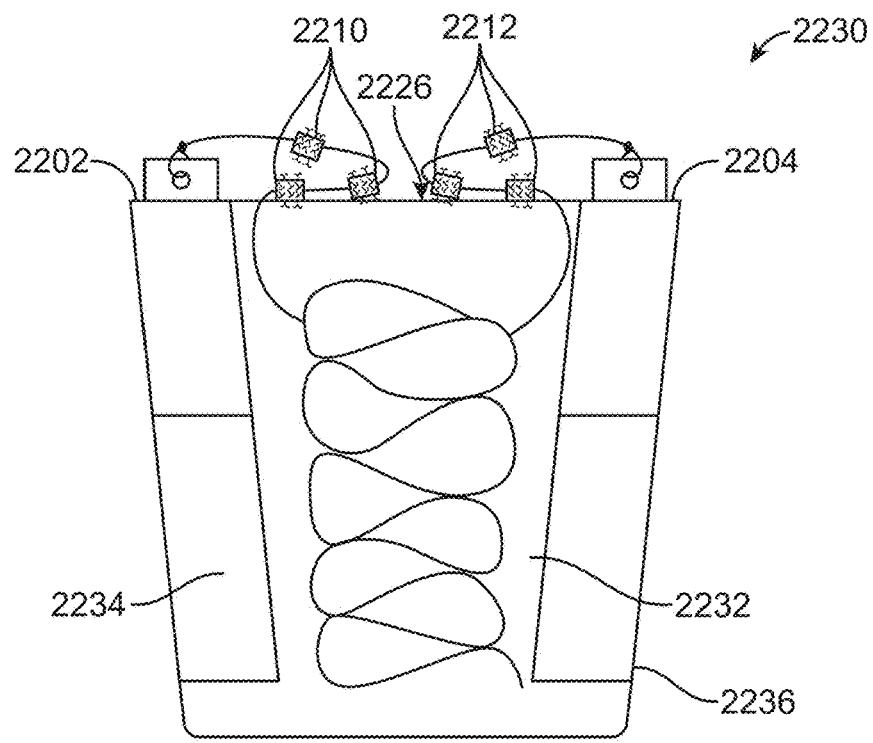

FIGS. 22A-22B illustrate another configuration of weights, cockleburs and the projectile module 2200. FIG. 22A illustrates a top view of a projectile module 2200. In this example, it is desirable to stow the various cockleburs in a position outside of or separate from the respective receiving cavity. In this scenario, a respective weight 2202, 2204, 2206, 2208 can be configured within a respective receiving cavity and the first respective set of cockleburs 2210 can be configured in a first storage cavity 2218 on a surface covering 2226 of the projectile module 2200. A connecting string 2211 connects the cockleburs 2210 to a first weight 2202. Another string 2231 can connect the cockleburs 2210 to the net (not shown) stowed in the projectile module 2200. A second set of cockleburs 2212 can be configured in a second storage cavity 2220 and connected to the second weight 2204 via a connecting string 2213. A string 2233 can connect the second set of cockleburs 2212 to the net. A third set of cockleburs 2214 can be configured in third storage cavity 2222 and can connect to a third weight 2206 via a connecting string 2215. A string 2235 can connect the third set of cockleburs 2214 to the net. A fourth set of cockleburs 2216 can be stowed in a fourth storage cavity 2224 and connect to the fourth weight 2208 via a connecting string 2217. A string 2237 can connect the fourth set of cockleburs 2216 to the net. In one example, the surface covering 2226 of the projectile module 2200 can be made from paper and designed to disintegrate or break apart upon deployment of the net which is contained beneath the surface covering 2226. Each of the storage cavities 2218, 2220, 2222, 2224 can be covered in paper (or other material) or defined by a paper wall or container surface that breaks or disintegrates upon deployment of the net.

FIG. 22B illustrates the projectile module 2230 having a net 2232 configured beneath the surface covering 2226 that separates the net 2232 from the various sets of cockleburs 2210, 2212. The purpose of the surface covering 2226 is to insure that upon deployment, the weights 2202, 2204, 2206, 2208 are projected first, followed by the sets of cockleburs 2210, 2212, 2214, 2216, after which the surface covering 2226 is broken open and the net then deploys. This process will ensure that the cockleburs do not prematurely entangle with the net 2232. In one aspect, the cavities 2218, 2220, 2222, 2224 can be configured such that breakable material like a paper surrounds each cavity with one side being the surface 2226 between the cavities and the net 2232 and a second side covering or enveloping each respective cavity. The respective sets of cockleburs 2210, 2212, 2214, 2216 can be configured within each respective cavity 2218, 2220, 2222, 2224 such that they will not entangle with each other in transit or prior to firing. A wall or surface 2203, 2205 can be used to define the respective cavities 2218, 2220, 2222, 2224 and which can be used to separate the different sets of cockleburs 2210, 2212, 2214, 2216 so that no premature entanglement occurs. The respective cockleburs can be configured so that they are not touching each other within each respective cavity 2218, 2220, 2222, 2224. For example, they can be secured (lightly) to the surface 2226 such that they do not move around in transit but that upon firing, can be separated from the surface 2226 with the ability to entangle with the net upon engagement with a target device. For example, a weak adhesive could be used to lightly secure each cocklebur to the surface 2226 with sufficient force to prevent them from moving around and becoming entangled with each other, but that is weak enough to release the cockleburs 2210, 2212, 2214, 2216 from the surface upon firing.

Figure 22C:
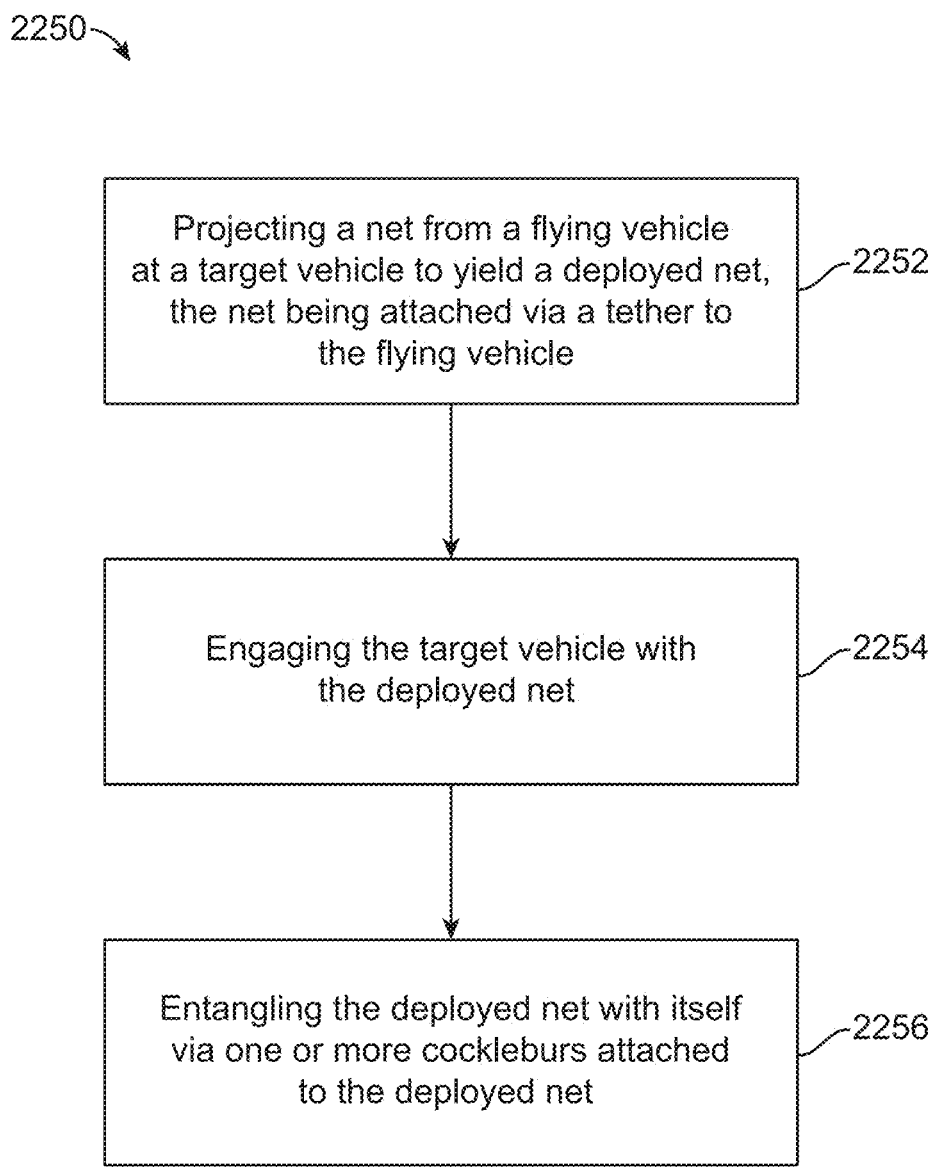
FIG. 22C illustrates a method embodiment related to the use of cockleburs.

FIG. 22C illustrates a method embodiment 2250 of this disclosure. An example method includes projecting a net from a flying vehicle at a target vehicle to yield a deployed net, the net being attached via a tether to the flying vehicle (2252), engaging the target vehicle with the deployed net (2254), entangling the deployed net with itself via one or more cockleburs attached to the deployed net (2256). The structure of the one or more cockleburs and the net can be any of the cocklebur and net structures disclosed herein.

Drawstring Embodiment

Figure 23A:
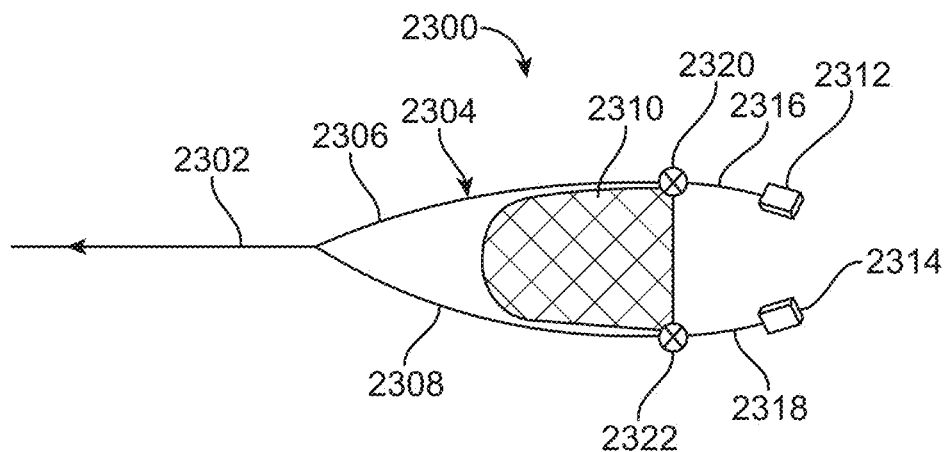
FIGS. 23A-23B illustrate a drawstring concept for the net.
Figure 23B:
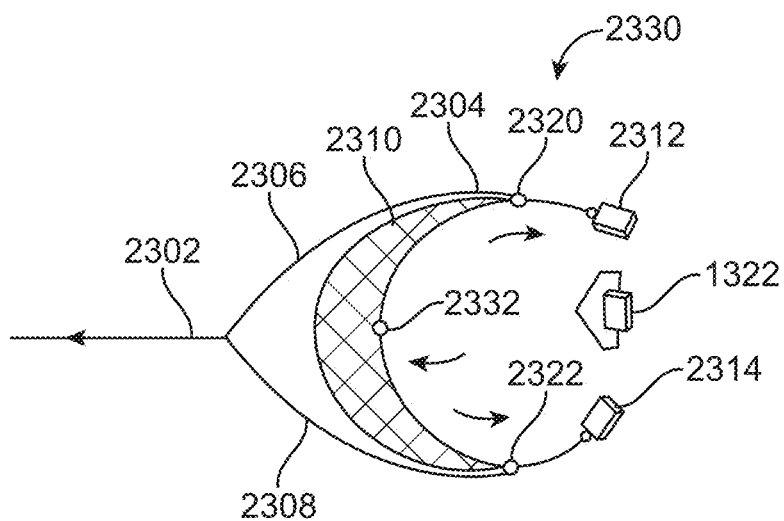

The cocklebur embodiment is discussed above for ensuring that the net gets entangled with a target device 1322 upon interaction with the device by the net. Next is discussed an alternative approach to ensuring that the target device 1322 does not slip from the net. This alternative approach is to use a drawstring in connection with the net. FIGS. 23A-23B illustrate a drawstring concept for the net. In one example, a system can include a first flying vehicle, a projectile attachment mechanism configured with the first flying vehicle and a projectile cartridge that contains a projectile. The projectile can be a net and the following description includes a net with a drawstring in various configurations.

The projectile cartridge can be removably attachable to the projectile attachment mechanism and a weight can be attached to the projectile, the weight being configured in a releasable configuration in the projectile cartridge. A drawstring can be configured with the projectile. After firing the projectile, when tension is applied to the drawstring as the projectile approaches a second flying vehicle, the tension causes the drawstring to close the projectile down to secure the second flying vehicle.

As shown in FIG. 23A, a system or projectile 2300 can include various components. The system can include a tether 2302 connected to the projectile 2310 and to a drawstring 2304. The other end of the tether can be connected to a flying vehicle (not shown). The drawstring 2304 can have a first branch or portion 2306 and a second branch or portion 2308 of the drawstring. The drawstring 2304 is associated with or connected to a net 2310 that is used to capture the target device (not shown). A first weight 2312 can be connected to a corner 2320 of the net 2310 via a first string 2316 or alternatively directly to a corner or portion of the net. A second string 2318 connects a second weight 2314 to a corner 2322 of the net 2310. What shall be described with respect to the use of a drawstring will be various embodiments in which various configurations can be deployed to cause, upon tension being applied to the drawstring, the net 2310 to close in various ways upon the target device. The particular choice of the type of drawstring to use can depend on the target device characteristics, characteristics of the flying device that stores the projectile module that holds the projectile 2310. The state of the projectile 2310 in FIG. 23A can be relatively early in the deployment phase before the projectile 2300 interacts with or is getting closer to the target device.

FIG. 23B illustrates the projectile 2330 closing in on the target device 1322. The net 2310 is folding over onto the target device as the drawstring 2304 is pulled via the tether 2302. A middle portion 2332 of the net 2310 can be moved in a direction away from the target device 1322 as the weights 2312, 2314 close in on the target device. The first corner 2320 of the net 2310 can include an attachment guide member through which the drawstring 2304 is threaded or it can represent a corner of the net 2310 to which the drawstring is tied. The net 2310 can be configured with four corners, or a different number of corners depending on the shape of the net 2310.

Similarly, the corner 2322 of the net 2310 can include either an attachment guide member or a location to which the drawstring 2304 is tied. The first weight 2312 is shown closing in on the target device 1322 as well as the second weight 2314. This illustration shows the motion of the net 2310 upon tension being provided to the drawstring 2304 via the tether 2302.

Figure 24A:
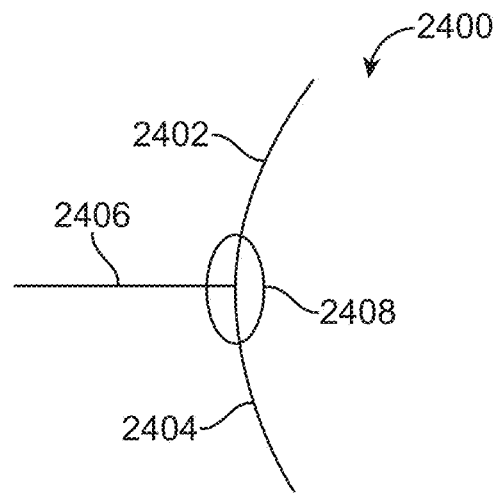
FIGS. 24A-24B illustrate a attachment guide member used for the drawstring used in connection with a net.
Figure 24B:
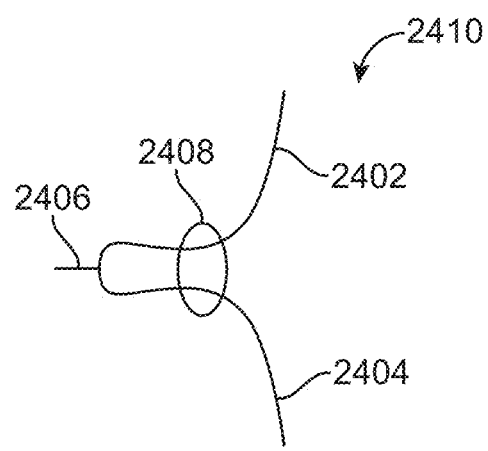

FIG. 24A illustrates an arrangement 2400 including a drawstring 2406 having a first branch 2402 and a second branch 2404. The first branch 2402 and the second branch 2404 are connected to the drawstring 2406 (which can be attached to the tether not shown). In one aspect, the drawstring 2406 can be described as the tether as well. An attachment guide member 2408 is shown in the configuration in which both the first branch 2402 the second branch 2404 are drawn through the attachment guide member 2408 when tension is provided on the string 2406. This is shown in FIG. 24B. In configuration 2410 shown in FIG. 24B, the tension on the drawstring 2406 causes the first branch of the drawstring 2402 and the second branch 2404 of the drawstring to be pulled through the attachment guide member 2408. The attachment guide member 2408 shown in FIGS. 24A, 24B is an example of the attachment guide member structure that can be used in any corner or position of the net 2310 shown in FIGS. 23A, 23B or other embodiments disclosed herein. For example, the attachment guide member can be a ring or other structure in the net. Its function is to allow the drawstring 2402 to stay anchored to the corners or perimeter of the net yet still allow the drawstring 2402 to easily slide through when pulled thus closing down the opening creating a bag. The attachment guide member 2408 could be a ring as shown or it could be any other feature that performs the same function. For example, a larger hole can be drilled thru the weight instead of using a ring. A corner of the net can be attached to this hole and the drawstring can be fed through the hole and the weight is free to easily slide along the drawstring 2402.

Figure 25:
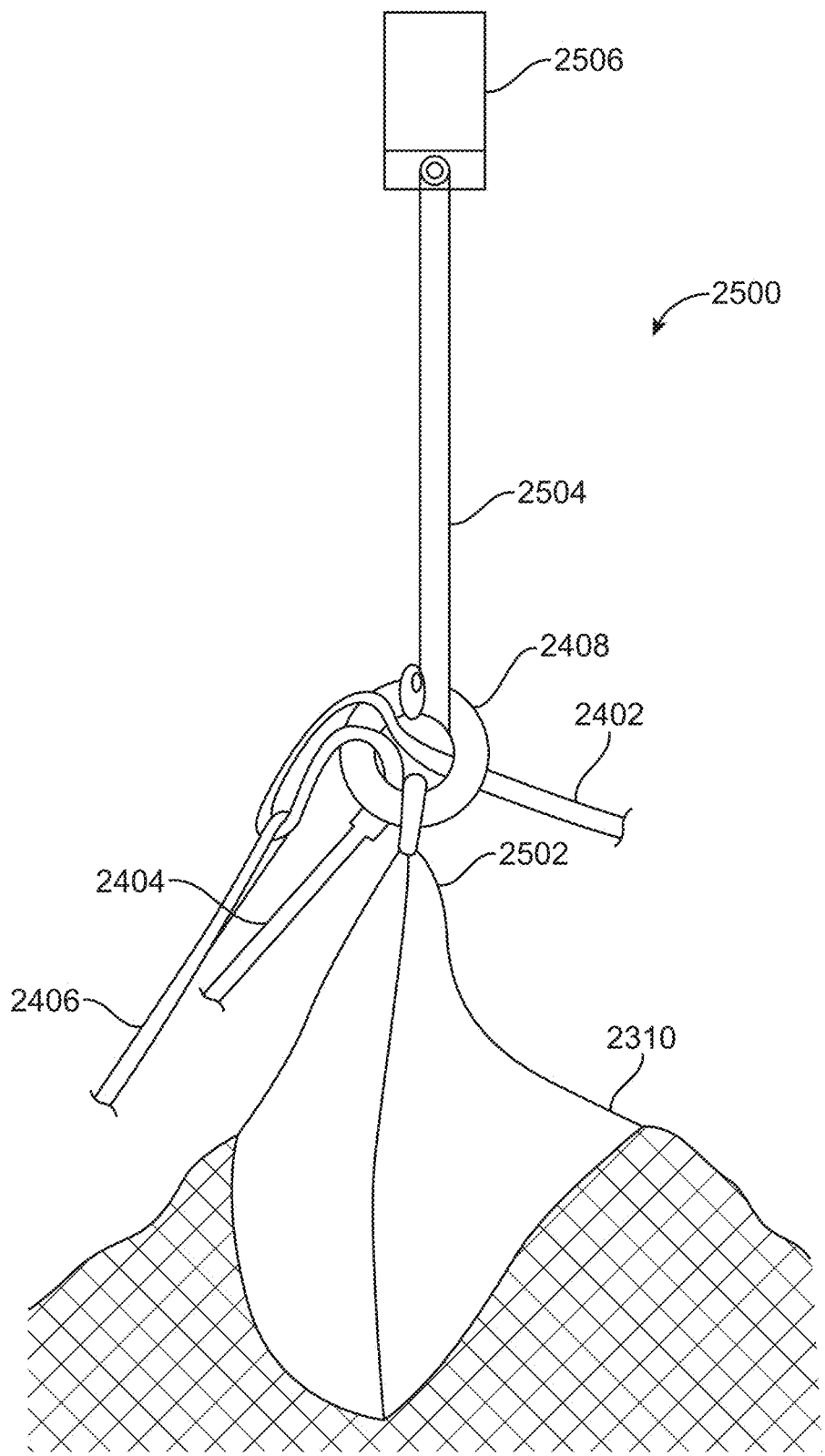
FIG. 25 illustrates the attachment guide member further connected to a location of the net.

FIG. 25 illustrates the attachment guide member 2408 further connected to a corner 2502 of the net 2310. In this illustration, a weight 2506 is connected to either the attachment guide member 2408 or the corner 2502 of the net 2310. The tether 2406 is shown as being attached to the first branch 2402 of the drawstring and the second branch 2404 of the drawstring. These two branches are pulled through the attachment guide member 2408 as shown to enable the net 2310 to be closed down or tightened around the target device 1322. The other end of the first branch 2402 and the second branch 2404 of the drawstring can be attached to other locations of the net such that upon pulling the tether 2406, the net closes down around the target device 1322. As shall be shown here, the first branch 2402 and the second branch 2404 of the drawstring can also cross the center of the net 2310, or can run along one or more edges of the net 2310 depending on the configuration.

Figures 26A, 26B:
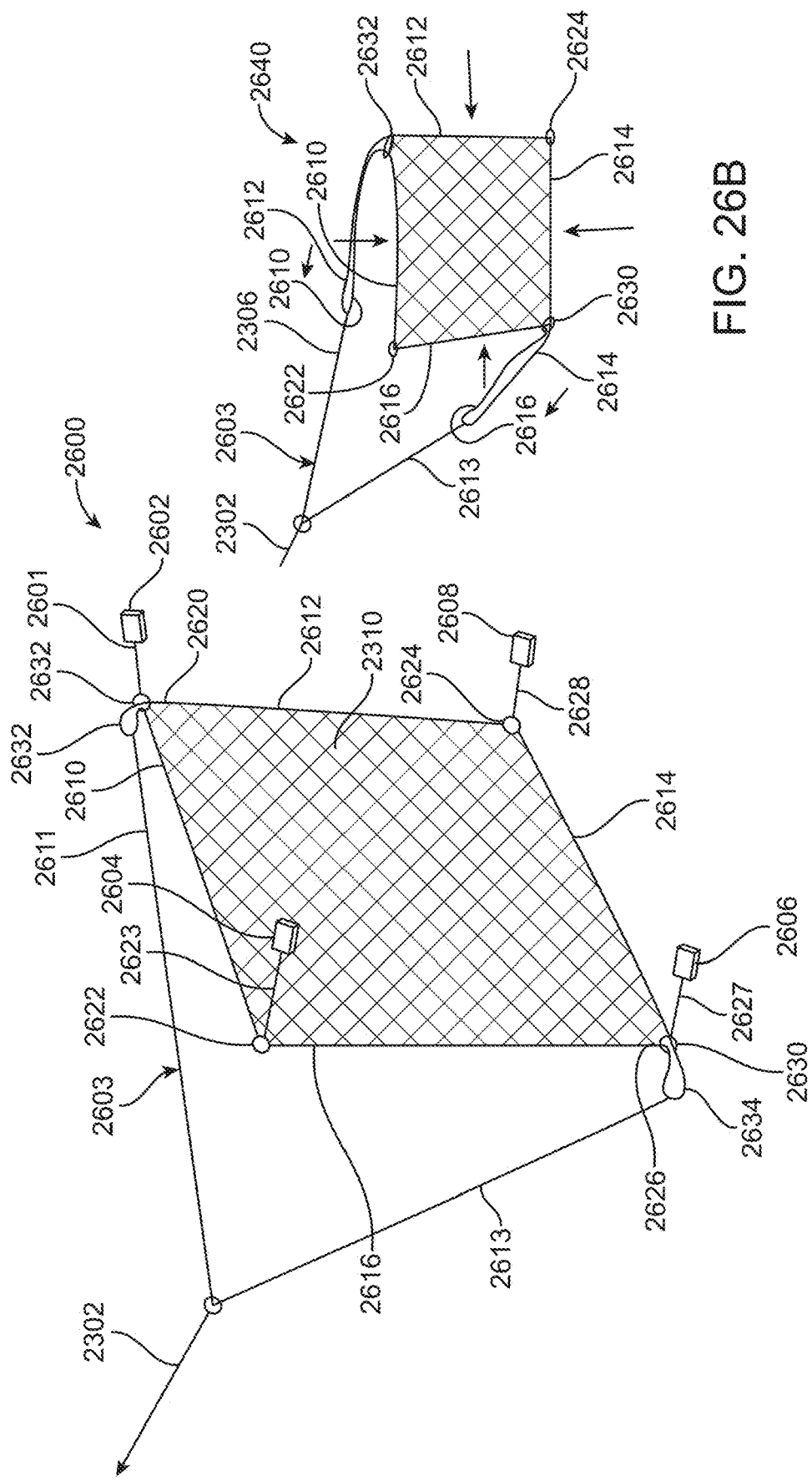
FIGS. 26A-26B illustrate a further drawstring and net embodiment.

FIGS. 26A-26B illustrate a further drawstring and net embodiment. In FIG. 24A, the tether 2302 is attached to both a first branch of the drawstring 2306 and the second branch of the drawstring 2308. The net 2310 is shown in an active deployment. The system of FIG. 26A includes the drawstring 2603 being attached to two of the four corners of the net 2310. A first weight 2602 is shown connected to the first corner 2620 of the net 2310 via a first connecting string 2601. The four corners 2620, 2622, 2624, 2626 of the net can include the first corner 2620 attached via the first string 2601 to the first weight 2602, a second corner 2622 attached via a second connecting string 2623 to a second weight 2604, a third corner 2624 attached via a third string 2628 to a third weight 2608, and a fourth corner 2626 attached via a fourth string 2627 to a fourth weight 2606.

At least two of the four corners can have configured thereon a respective attachment guide member through which the drawstring 2603 is pulled to close the projectile down to secure the second flying vehicle. For example, a first attachment guide member 2632 is shown at the first corner 2620 of the net 2310 and a second attachment guide member 2630 is configured at the fourth corner 2626 of the net 2310. While the opposite corners 2620, 2626 are shown in FIG. 26A as including the attachment guide members 2632, 2630, any configuration or sets of corners can have respective attachment guide members for implementing the drawstring concept disclosed herein.

Another embodiment of this concept would have an opening integral to the weight providing the attachment guide member functionality, eliminating the need for the attachment guide member. In this embodiment, the drawstring(s) would loop thru the holes in the appropriate weights and thus facilitate the function of closing up the net when the tether and thus the drawstrings are pulled.

In one aspect, a first portion 2610 of the drawstring 2603 passes through the first attachment guide member 2632 and is attached at the second corner 2622 of the net and a second portion 2612 of the drawstring 2603 passes through the first attachment guide member 2632 and is attached to the third corner 2624 of the net 2310. The first portion 2610 and the second portion 2612 are both attached to the first connecting portion 2611 of the drawstring 2603, which is also attached to the tether 2302. A third portion 2616 of the drawstring can pass through the second attachment guide member 2630 and is attached to the second corner 2622 of the net 2310 and a fourth portion 2614 of the drawstring can pass through the second attachment guide member 2630 and is attached to the third corner 2624 of the net 2310. The third portion 2616 and the fourth portion 2614 are both attached to the second connecting portion 2613 of the drawstring 2603, which is also attached to the tether 2302. FIG. 26B illustrates the motion 2640 of the net as the tether 2302 adds tension to the drawstrings 2603 and its first portion 2611 and second portion 2613. Note that drawstring 2603 connects to the first portion 2610 of the drawstring 260 3 and the second portion 2612 of the drawstring 2603. Note also that the first portion 2616 of the drawstring 2613 and the second portion 2614 of the drawstring are connected to the second connecting portion 2613 of the drawstring 2603, as shown in FIG. 26B.

Figure 27:
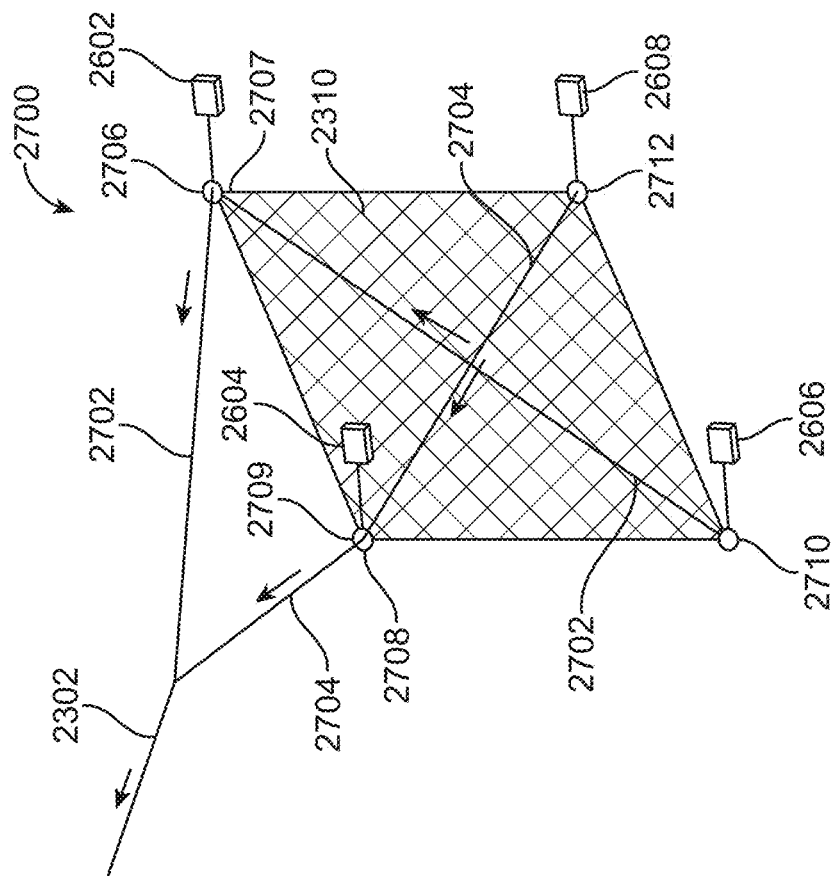
FIG. 27 illustrates a further drawstring and net embodiment.

FIG. 27 illustrates a further drawstring and net embodiment 2700 in which two attachment guide members are configured on the top adjacent corners of the net 2310 and the drawstring crosses across the net and each branch 2704, 2702 is attached at an adjacent corner 2710, 2712 across the bottom. In this embodiment, a tether 2302 attaches to a first portion of the drawstring 2702. The first portion 2702 passes through a first attachment guide member 2706 at a first corner 2707 of the net 2310. The first portion of the drawstring 2702 extends across a center portion of the net 2310 to a second corner 2710 opposite the first corner 2707. A second portion of the drawstring 2704 passes through a second attachment guide member 2708 at a third corner 2709 of the net 2310. The second portion of the drawstring 2704 can extend across the center portion of the net 2310 to attach at a fourth corner 2712 of the net that is opposite the third corner 2709. Any of the labels of first, second, third and fourth corners, attachment guide members, or weights can vary depending on what is being described. When the tether 2302 is pulled putting pressure on the drawstring portions 2702, 2704, the tension on the drawstring portions 2702, 2704 will cause the bottom corners 2710, 2712 to be drawn upward to meet the top corners 2707, 2709 that will be drawn downward and over a target device (not shown).

FIGS. 28A-28B illustrate a further drawstring and net embodiment 2800 in which two attachment guide members 2812, 2806 are configured on opposite corners 2807, 2813 across the net 2310. A first portion of the drawstring 2802 passes through a first attachment guide member 2806 at a first corner 2807 of the net 2310. A first weight 2668 is attached to the first corner 2807 or the net 2310. The first portion of the drawstring 2802 extends via a first subportion 2802A along a first side of the net 2310 to a second corner 2810 adjacent to the first corner 2807, where the first subportion 2802A is attached. A second weight 2602 is attached to the second corner 2810 of the net 2310. A second subportion 2802B of the first portion of the drawstring 2802 extends along a second side of the net to a third corner 2808 where the second subportion 2802B is attached. A third weight 2606 is attached to the third corner 2808.

A second portion of the drawstring 2804 passes through a second attachment guide member 2812 at a fourth corner 2813 of the net 2310. The second portion of the drawstring 2804 extends via a first subportion 2804A along a third side of the net 2310 to the second corner 2810 where it is attached. A second subportion 2804B of the second portion of the drawstring 2804 extends along a fourth side of the net 2310 to the third corner 2808 where it is attached. FIG. 28B illustrates a top view 2800 of the configuration of FIG. 28A with the tether 2302 attached to both portions 2802, 2804 of the drawstring. The weights 2602, 2604 are shown as well. Positioning the attachment guide members 2806, 2812 at opposite corners as shown causes the net 2310 to close in on the target device (not shown) in a certain way upon tension from the drawstring 2702.

Figure 29A:
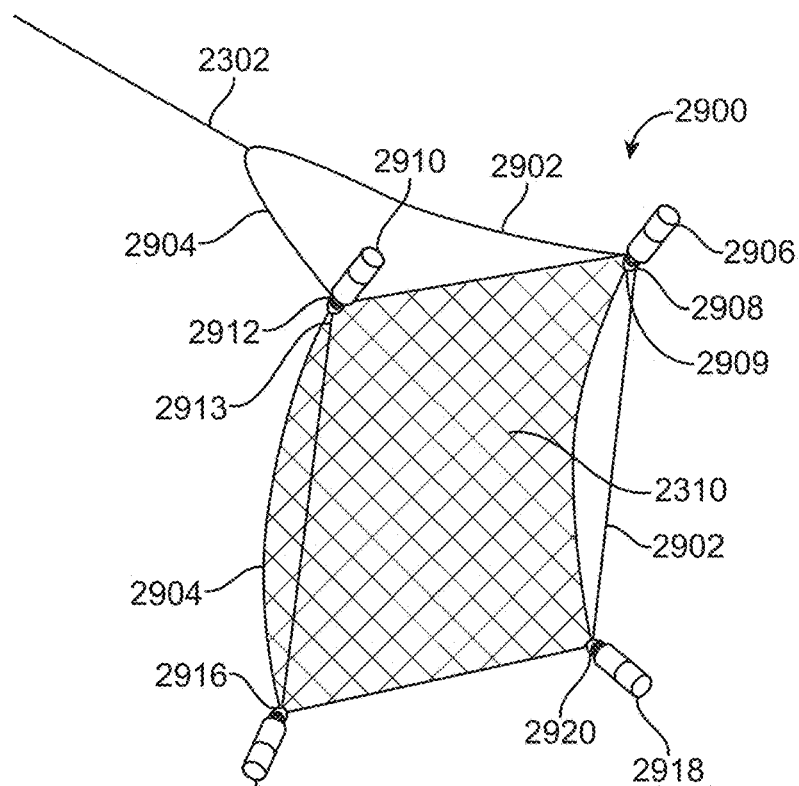
FIGS. 29A-29B illustrate a further drawstring and net embodiment.
Figure 29B:
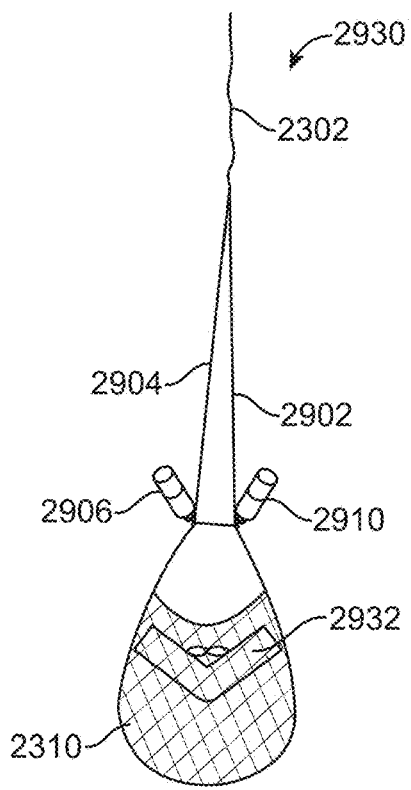

FIGS. 29A-29B illustrate a further drawstring and net embodiment 2900 in which the attachment guide members are positioned in adjacent corners. The tether 2302 is connected to both a first portion of the drawstring 2902 and a second portion of the drawstring 2904. The first portion 2902 passes through a first attachment guide member 2908 at a first corner 2909 of the net 2310. The first portion of the drawstring 2902 extends down a first side of the net 2310 to a second corner 2920 adjacent to the first corner 2909 where it is attached. In this embodiment, the attachment guide member 2908 can be separate from a weight 2906 or the attachment guide member 2908 can be configured within or integrated with a portion of the weight 2906. The second portion of the drawstring 2904 passes through a second attachment guide member 2912 at a third corner 2913 of the net 2310. The second portion of the drawstring 2904 extends down a second side of the net 2310 to a fourth corner 2916 adjacent to the third corner 2920. The second portion of the drawstring 2904 is attached at the fourth corner 2916 or to the weight 2914. A weight 2910 configured at the third corner 2913 can be attached to the net 2310 via a string and can include an opening through which the second portion of the drawstring 2904 can pass.

FIG. 29B illustrates a state 2930 in which the target device 2932 is captured in the net 2310 and is being carried by a flying vehicle (not shown) via the tether 2302. This is the result that is expected when the tether is activated and causes tension on the drawstring 2902, 2904.

Figure 30:
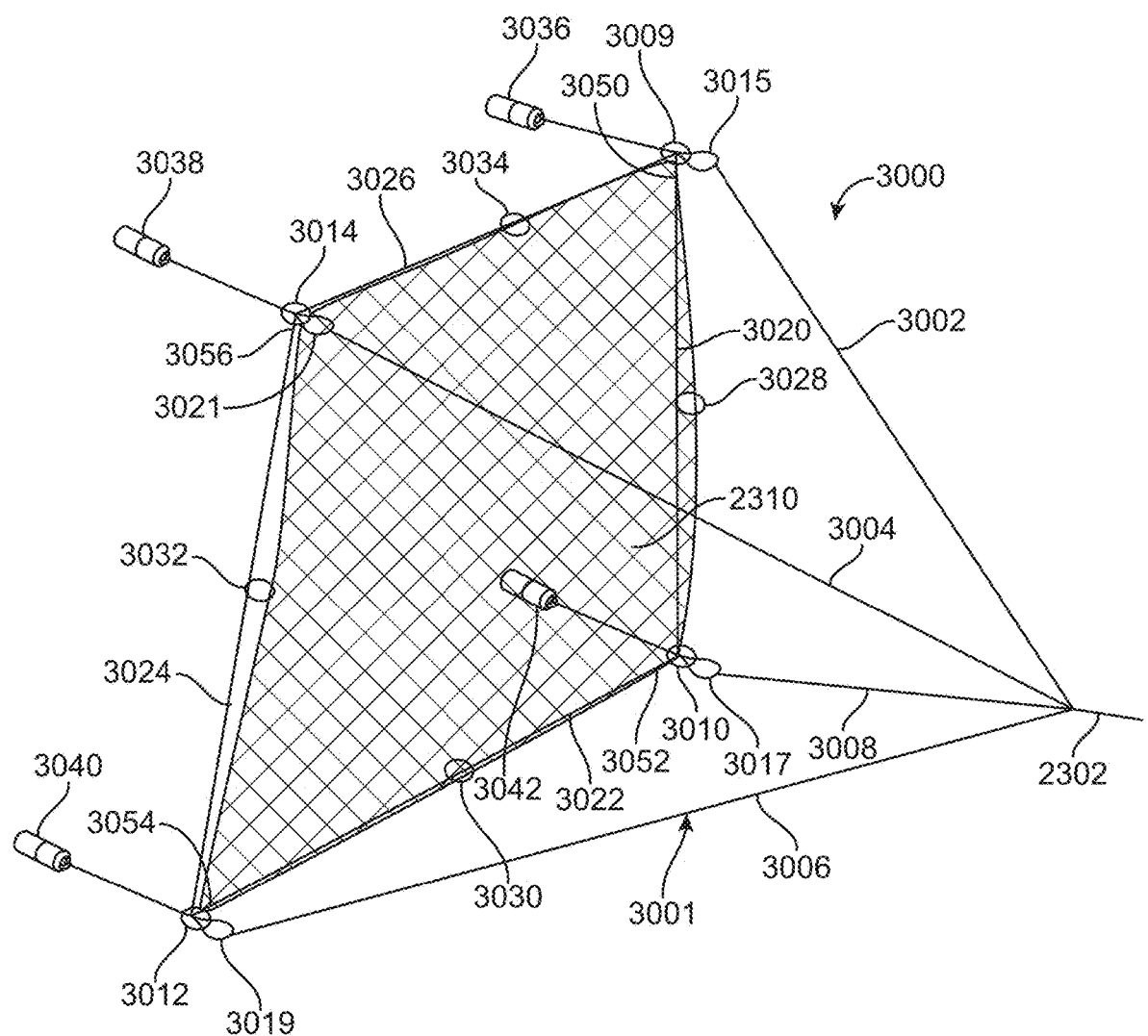
FIG. 30 illustrates a further drawstring and net embodiment.

FIG. 30 illustrates a further drawstring and net embodiment 3000 which uses four attachment guide members, one in each corner. The tether 2302 is attached to a first portion 3002, a second portion 3004, a third portion 3006 and a fourth portion 3008 of a drawstring 3001. A respective first corner 3050, second corner 3042, third corner 3054 and fourth corner 3056 of the net 2310 are shown. A first attachment guide member 3008 is configured at the first corner 3050, a second attachment guide member 3010 is configured at the second corner 3052, a third attachment guide member 3012 is configured at the third corner 3054 and a fourth attachment guide member 3014 is configured at the fourth corner 3056 of the net 2310.

The first portion 3002 of the drawstring 3001 is attached at a point 3015 near the first attachment guide member 3009 at the first corner 3050 of the net 2310 to a first subportion 3020 of the drawstring 3001. The first subportion 3020 of the drawstring is also attached at point 3017 to the fourth portion 3008 of the drawstring 3001 through the second attachment guide member 3010 at the second corner 3052. The first subportion 3020 of the drawstring is also attached at point 3017 to the second subportion 3022 of the drawstring 3001 through the second attachment guide member 3010 at the second corner 3052.

The first portion 3002 of the drawstring 3001 is attached at the point 3015 near the first attachment guide member 3009 at the first corner 3050 of the net 2310 to the fourth subportion 3026 of the drawstring 3001. The fourth subportion 3026 of the drawstring 3001 is also attached at a point 3021 to the second portion 3004 of the drawstring 3001 through the fourth attachment guide member 3014 at the fourth corner 3056. The fourth subportion 3026 of the drawstring 3001 is also attached at a point 3021 to the third subportion 3024 of the drawstring 3001 through the fourth attachment guide member 3014 at the fourth corner 3056. The fourth subportion 3026 of the drawstring 3001 is also attached at the point 3015 to the first subportion 3020 of the drawstring 3001.

The second portion 3004 of the drawstring 3001 is attached at the point 3021 near the fourth attachment guide member 3014 at the fourth corner 3056 of the net 2310 and to the third subportion 3024 of the drawstring 3001. The third subportion 3024 of the drawstring 3001 is also attached at the point 3019 near the third attachment guide member 3012 at the third corner 3054 of the net to the third portion 3006 of the drawstring 3001. The third subportion 3024 of the drawstring 3001 is also attached at the point 3019 near the third attachment guide member 3012 at the third corner 3054 of the net to the second subportion 3022 of the drawstring 3001.

The third portion 3006 of the drawstring 3001 is attached at the point 3019 near the third attachment guide member 3012 at the third corner 3054 of the net 2310 to the second subportion 3022 of the drawstring 3001. The second subportion 3022 of the drawstring 3001 is also attached at a point 3017 to the fourth portion 3008 of the drawstring 3001 through the second attachment guide member 3010 at the second corner 3052.

As can be appreciated, connecting points 3015, 3017, 3019 and 3021 each connect three different respective lines or strings as described above and in connection with the respective attachment guide members 3009, 3010, 3012, 3014 can be used to cause the net 2310 to close down over a target device upon tension being placed not the tether 2302.

In another aspect, the system shown in FIG. 30 can be defined by loops. For example, the drawstring 3001 can include a first loop defined at point 3015 and made from the first subportion 3020 and the fourth subportion 3026 that pass through the first attachment guide member 3009 at the first corner 3050 of the net 2310, the first loop attached to a tether 2302 through a first portion 3002 of the drawstring 3001. A second loop at point 3017 is defined by the first subportion 3020 and the second subportion 3022 that pass through the second attachment guide member 3010 at the second corner 3052 of the net 2310, the second loop attached to the tether 2302 through the fourth portion 3008 of the drawstring 3001.

A third loop at point 3019 includes the second subportion 3022 and the third subportion 3024 that pass through the third attachment guide member 3012 at the third corner 3054 of the net 2310, the third loop attached to the tether 2302 via the third portion 3006 of the drawstring 3001. A fourth loop at point 3021 is defined by the third subportion 3024 and the fourth subportion 3026 that pass through the fourth attachment guide member 3014 at the fourth corner 3056 of the net 2310, the fourth loop attached to the tether 2302 via the second portion 3004 of the drawstring 3001.

The drawstring 3001 can further pass through at least a fifth attachment guide member 3028 configured at an edge of the net 2310 and between any two adjacent attachment guide members of the first attachment guide member 3009, the second attachment guide member 3010, the third attachment guide member 3012 and the fourth attachment guide member 3014. Other attachment guide members 3030, 3032 and 3034 are shown at respective edges of the net 2310.

Figure 31A:
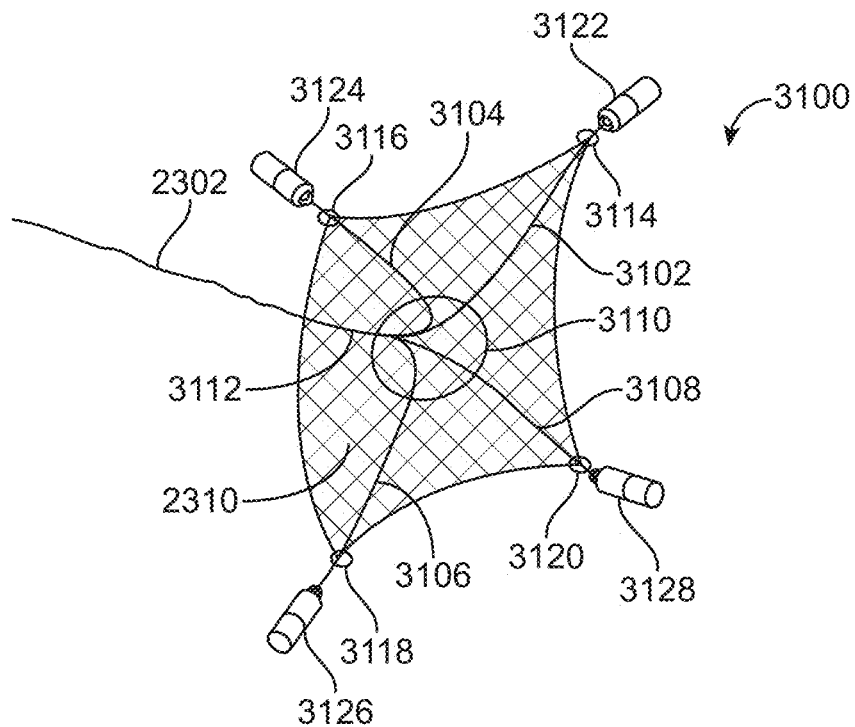
FIGS. 31A-31B illustrate a further drawstring and net embodiment.
Figure 31B:
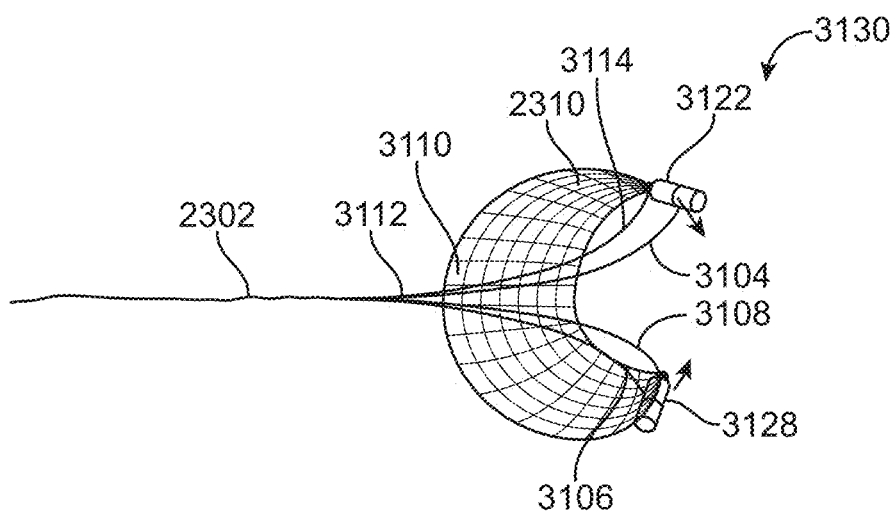

FIGS. 31A-31B illustrate a further drawstring and net embodiment 3100. In this embodiment, the tether 2302 is attached to a drawstring 3112 through a central portion 3110 of the net 2310. A first branch 3102 connects the drawstring 3112 to a first corner 3114 with an associated first weight 3122. A second branch 3104 connects the drawstring 3112 to a second corner 3116 with an associated second weight 3124. A third branch 3106 connects the drawstring 3112 to a third corner 3118 with an associated third weight 3126. A fourth branch 3108 connects the drawstring 3112 to a fourth corner 3120 with an associated fourth weight 3128. The state of the net 2310 in FIG. 31A is closer to initial deployment and prior to tension being place on the tether 2302. FIG. 31B illustrates a closing position 3130 of the projectile of FIG. 31A. This figure shows the closing net 2310 upon tension being applied to the tether 2302.

Figure 32:
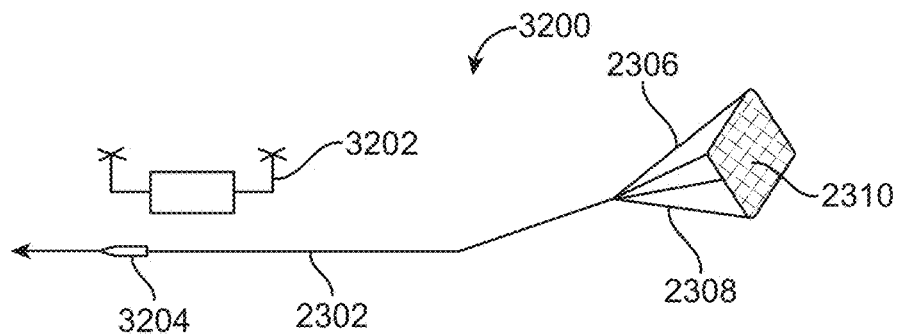
FIG. 32 illustrates a drawstring being provided with tension from a weight fired in an opposite direction.

FIG. 32 illustrates a state 3200 of a drawstring or tether 2032 being provided tension from a bullet 3204 fired in an opposite direction from the direction that the net 2310 was traveling. The bullet or other projectile can be fired by a flying vehicle 3202 such as a drone. The purpose of the tension caused by the bullet 3204 is to pull back on the drawstring branches 2306, 2308 such that the net 2310 closes in on a target device. The drawstring branches 2306, 2308 represent any drawstring structure disclosed herein.

Figure 33:
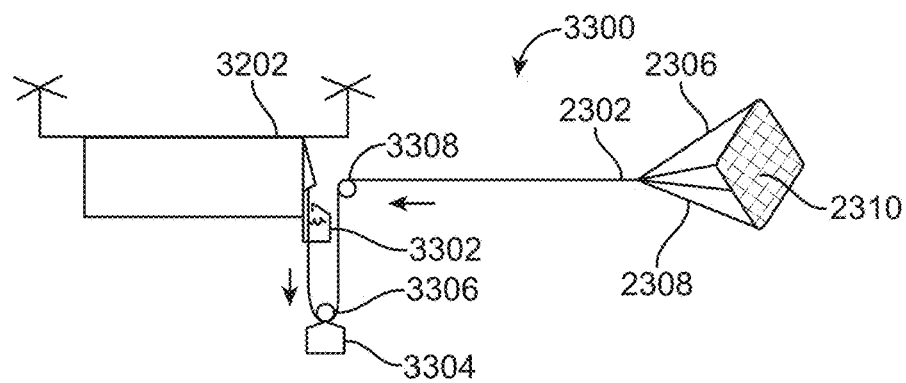
FIG. 33 illustrates an approach to retracting a drawstring.

FIG. 33 illustrates an approach to retracting a drawstring 3300 including a drone 3202, a drawstring or tether 2302, a first and second portion of the drawstring 2306, 2308 connected to the net 2310. The tether 2302 can receive tension after the net 2310 is fired by dropping a weight 3304 from a heightened position 3302 to a lower position as shown where the weight 3304 is in FIG. 33. The drawstring 2302 can be fed through rollers 3308, 3306 such that dropping the weight can cause the tether 2302 to pull back and cause the drawstring 2306, 2308 to close up on the net 2310 and over the target (not shown).

Figure 34:
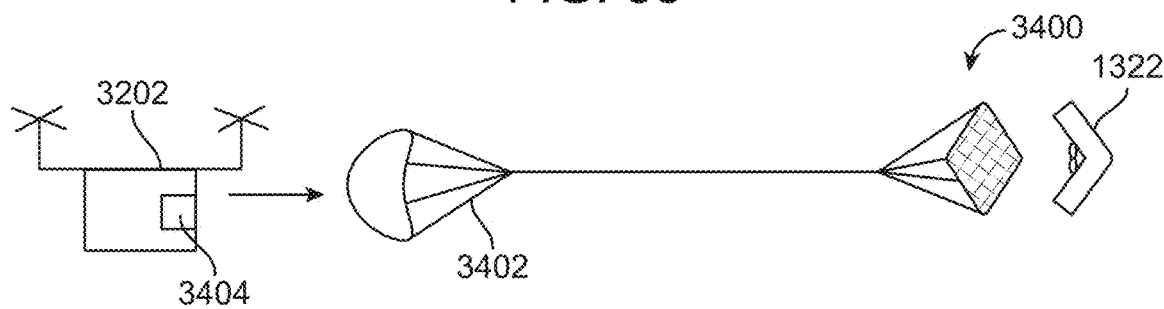
FIG. 34 illustrates another approach to retracting the drawstring.

FIG. 34 illustrates another approach 3400 to retracting the drawstring which includes the drawstring 2302, portions of the drawstring 2306, 2308, the net 2310 and a parachute 3402 that, when deployed, will cause tension on the tether 2302 to pull back on the net 2310 and cause the net to close up around a target (not shown).

Figure 35:
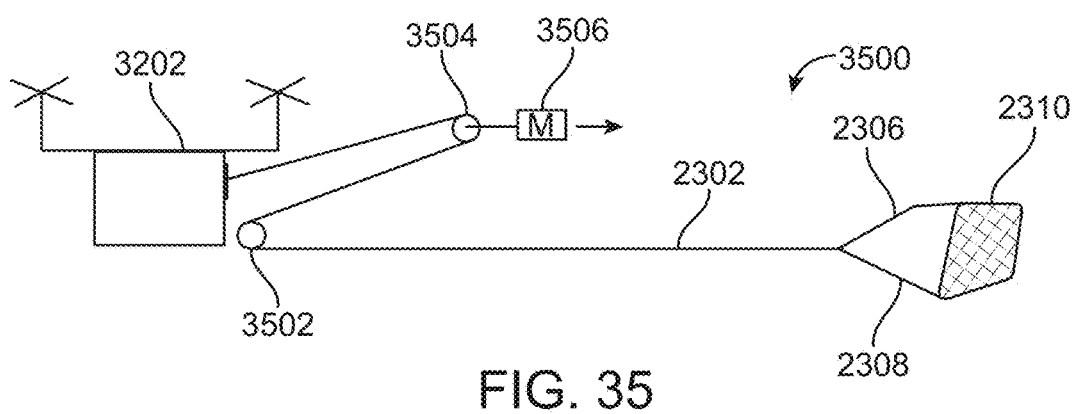
FIG. 35 illustrates another approach to retracting the drawstring with increased velocity.

FIG. 35 illustrates another approach 3500 to retracting the drawstring. In this example, the flying vehicle 3202 will include a feature where the tether 2302 is passed through a first pulley 3502 and a second pulley 3504. The pulley 3504 is attached to a weight 3506. After deployment of the net 2310, and when the time is right to add tension to the tether 2302, the drone 3202 can fire the weight 3506 forward such that the motion of the weight 3506 in the same direction as the fired net 2310 causes the tension on the tether 2302 to pull back towards the drone 3202 via the use of the first pulley 3502.

The above examples of different mechanisms to provide tension on the tether 2302 can be triggered based on a number of different factors. For example, typically the net 2310 is fired at a target device and the tension needs to be initiated on the tether 2302 at a proper time and not too soon or too late. A control system on the flying vehicle 3202 can include in an algorithm initially the timing of when to deploy the net and then when to initiate the tension on the tether 2302. Thus, the timing can be determined in advance of the firing of the net 2310. Or, the system can continue to detect or monitor the movement of the target device 1322, evaluate the position and trajectory of the net 2310, and make a decision based on the monitoring or received data to determine when to initiate the tension on the tether 2302.

In one aspect, the net 2310 can also include a sensor or radar component that can be used to receive feedback on the target device and transmit a signal from the net to the flying device so enable the control system to make a determination on the timing of when to initiate the tension on the tether 2302.

Figure 36:
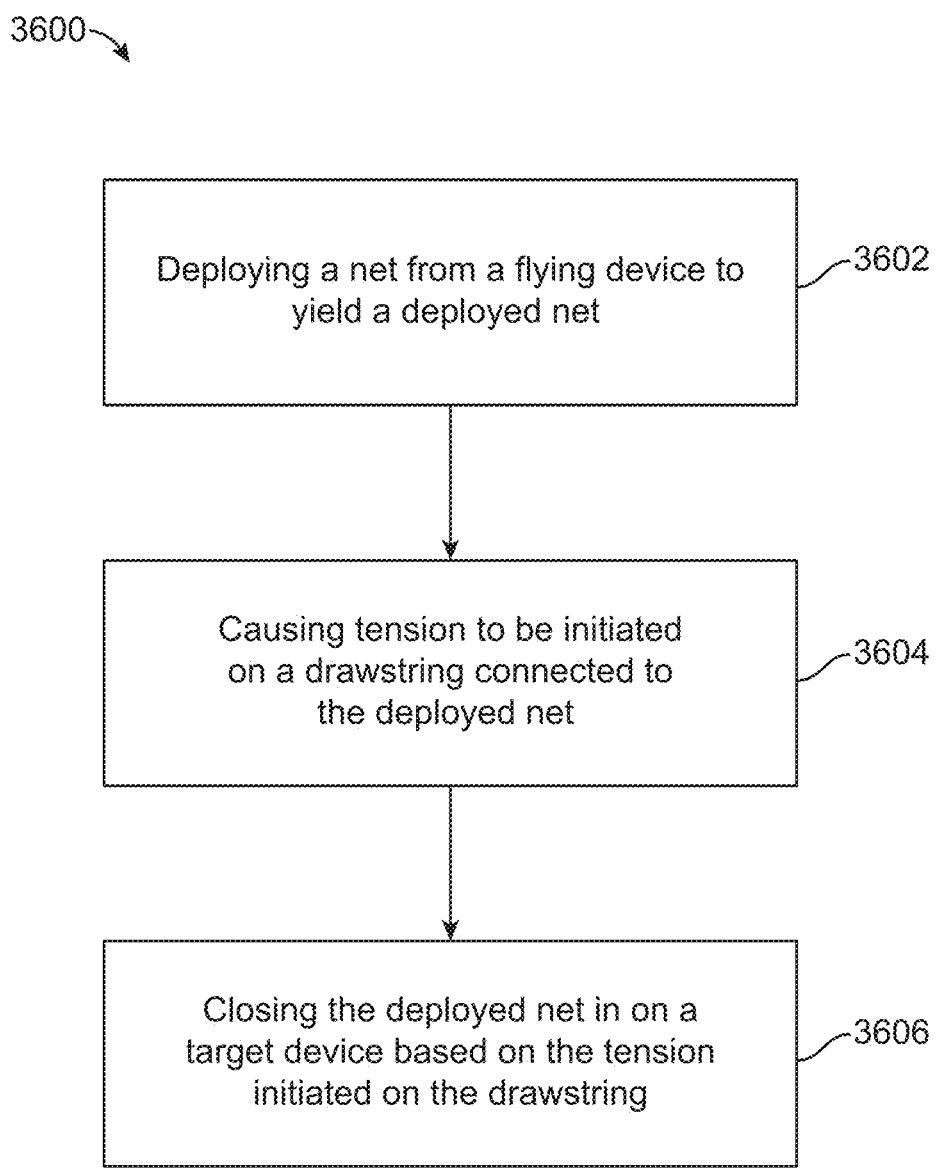
FIG. 36 illustrates a method embodiment.

FIG. 36 illustrates a general method embodiment related to drawstrings. The method 3600 includes deploying a net from a flying device to yield a deployed net (3602), causing tension to be initiated on a drawstring connected to the deployed net (3604), and closing the deployed net in on a target device based on the tension initiated on the drawstring (3606).

In some embodiments, the computer-readable storage devices, mediums, and or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. Any token or structure/function disclosed herein can apply to a tokenized asset offering or a security token offering.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media conveying such instructions, computing resources for executing them, and other structures for supporting such computing resources are means for providing the functions described in these disclosures.

Although a variety of examples and other information were used to explain aspects within the scope of the appended claims, no limitation of the claims should be implied based on particular features or arrangements in such examples, as one of ordinary skill would be able to use these examples to derive a wide variety of implementations.

Further, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features of configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other in any combination.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates the one member of the set or multiple members of the set satisfy the claim. For example, claim language reciting "at least one of A, B, and C" or "at least one of A, B, or C" means A alone, B alone, C alone, A and B together, A and C together, B and C together, or A, B, and C together.

What is claimed is:

1. A system comprising:
   a flying vehicle;
   a projectile cartridge;
   a projectile configured within the projectile cartridge, the projectile cartridge being removably attachable to flying vehicle and the projectile having four locations;
   a respective weight attached to the projectile at each of the four locations; and
   a drawstring configured with the projectile, wherein, after firing the projectile, when tension is applied to the drawstring as the projectile approaches or envelops a target flying vehicle, the tension causes the drawstring to close the projectile down to secure the target flying vehicle, wherein the four locations of the projectile each have configured thereon a respective attachment guide member through which a respective branch of the drawstring is pulled to close the projectile down to secure the target flying vehicle.

2. The system of claim 1, wherein the projectile comprises a net having one of a circular shape, a hexagonal shape, a rectangular shape, a square shape, a first shape having four corners, a second shape having six corners or a third shape having eight corners.

3. The system of claim 2, wherein, when the net comprises the first shape having four corners, each respective branch of the drawstring is attached to a respective corner of the four corners of the net.

4. The system of claim 2, wherein the respective weight comprises a first weight at a first location, a second weight at a second location, a third weight at a third location, and a fourth weight at a fourth location.

5. The system of claim 1, wherein a first attachment guide member is configured at a first location of the projectile, a second attachment guide is configured at a second location of the projectile, a third attachment guide is configured at a third location of the projectile and a fourth attachment guide is configured at a fourth location of the projectile.

6. The system of claim 5, wherein a first branch portion of the drawstring passes through the first attachment guide member and is attached at the first location of the projectile, a second branch portion of the drawstring passes through a second branch attachment guide member and is attached to the second location of the projectile, a third branch portion of the drawstring passes through a third attachment guide member and is attached to the third location of the projectile and a fourth branch portion of the drawstring passes through a fourth attachment guide member and is attached to the fourth location of the projectile.

7. The system of claim 1, the drawstring comprises a first loop that passes through a first attachment guide member at a first location of the projectile, the first loop attached to a tether, a second loop that passes through a second attachment guide member at a second location of the projectile, the second loop attached to the tether, a third loop that passes through a third attachment guide member at a third location of the projectile, the third loop attached to the tether and a fourth loop that passes through a fourth attachment guide member at a fourth location of the projectile, the fourth loop attached to the tether.

8. The system of claim 7, wherein the drawstring further passes through at least a fifth attachment guide member configured at an edge of the projectile and between any two adjacent attachment guide members of the first attachment guide member, the second attachment guide member, the third attachment guide member and the fourth attachment guide member.

9. The system of claim 1, the drawstring having a first branch attached to a first location of the projectile, a second branch attached to a second location of the projectile, a third branch attached to a third location of the projectile and a fourth branch attached to a fourth location of the projectile.

10. The system of claim 9, wherein the first branch, the second branch, the third branch and the fourth branch each pass along a respective edge of the projectile and connect to a tether.

11. The system of claim 1, the system further comprising:
a tension-producing mechanism that provided the tension on the drawstring to cause the drawstring to close the projectile down.

12. The system of claim 11, wherein the tension-producing mechanism comprises one of: a weight that is dropped, a separate weight that is launched, a rewind spool for a tether attached to the drawstring, a parachute attached to the drawstring, a block and tackle structure attached to the drawstring, and a reversal of the flying vehicle.

13. The system of claim 1, where the drawstring is attached to a tether which is attached to the flying vehicle and wherein a momentum of the target flying vehicle upon impacting the projectile causes the tether to pull on the drawstring.

14. A projectile cartridge that is removably attached to a flying vehicle, the projectile cartridge comprising:
a projectile;
a first weight attached to a first location of the projectile, the first weight being configured in a first receiving cavity of the projectile cartridge;
a second weight attached to a second location of the projectile, the second weight being configured in a second receiving cavity of the projectile cartridge;
a third weight attached to a third location of the projectile, the third weight being configured in a third receiving cavity of the projectile cartridge;
a fourth weight attached to a fourth location of the projectile, the fourth weight being configured in a fourth receiving cavity of the projectile cartridge;
a drawstring having a first branch associated with the first location, a second branch associated with the second location of the projectile, a third branch associated with the third location and a fourth branch associated with the fourth location;
a tether that attaches the drawstring to the flying vehicle, wherein upon firing the projectile, tension provided to the drawstring causes the drawstring to close down the projectile and cause the projectile to capture a target flying vehicle, wherein four corners of the projectile have configured thereon a respective attachment guide member through which one of the first branch, the second branch, the third branch and the fourth branch of the drawstring is pulled to close the projectile down to secure the target flying vehicle.

15. The projectile cartridge of claim 14, further comprising:
a drawstring mechanism to initiate tension on the drawstring to capture the target flying vehicle.

16. The projectile cartridge of claim 14, wherein the projectile comprises a net.

17. A projectile cartridge configured to be removably attached to a flying vehicle, the projectile cartridge comprising:
a net;
a weight attached to the net, the weight being configured in a receiving cavity in the projectile cartridge that enables a projection of the weight upon firing via a control system on the flying vehicle; and
a drawstring configured with the net, wherein the drawstring, after the net being fired to capture a target flying vehicle and upon implementation of a drawing operation, draws in to close the net to enable a capture of the target flying vehicle in the net, wherein four corners of the net have configured thereon a respective attachment guide member through which a respective branch the drawstring is pulled to close the net down to secure the target flying vehicle.

18. The projectile cartridge of claim 17, wherein the weight comprises a first weight attached to a first location of the net, and wherein the projectile cartridge further comprises:
a second weight attached to a second location of the net;
a third weight attached to a third location of the net; and
a fourth weight attached to a fourth location of the net, wherein the drawstring is either attached directly to a respective location of the net or slides by the respective location of the net via a sliding mechanism.

* * * * *